(12) United States Patent
Zhou et al.

(10) Patent No.: US 7,818,128 B2
(45) Date of Patent: Oct. 19, 2010

(54) FORWARD MODELS FOR GAMMA RAY MEASUREMENT ANALYSIS OF SUBTERRANEAN FORMATIONS

(75) Inventors: Tong Zhou, Quincy, MA (US); Jeffrey Robert Miles, Cambridge, MA (US)

(73) Assignee: Schlumberger Technology Corporation, Cambridge, MA (US)

( * ) Notice: Subject to any disclaimer, the term of this patent is extended or adjusted under 35 U.S.C. 154(b) by 241 days.

(21) Appl. No.: 12/166,045

(22) Filed: Jul. 1, 2008

(65) Prior Publication Data
US 2010/0004867 A1 Jan. 7, 2010

(51) Int. Cl.
*G06F 19/00* (2006.01)
(52) U.S. Cl. .......................................... 702/8
(58) Field of Classification Search ............... 702/8, 702/14, 182–185
See application file for complete search history.

(56) References Cited

U.S. PATENT DOCUMENTS

| | | | |
|---|---|---|---|
| 5,113,953 A | 5/1992 | Noble | |
| 5,235,185 A * | 8/1993 | Albats et al. | 250/269.5 |
| 5,265,682 A | 11/1993 | Russell et al. | |
| 5,334,833 A | 8/1994 | Case et al. | |
| 5,520,255 A | 5/1996 | Barr et al. | |
| 5,553,678 A | 9/1996 | Barr et al. | |
| 5,553,679 A | 9/1996 | Thorp | |
| 5,582,259 A | 12/1996 | Barr | |
| 5,603,385 A | 2/1997 | Colebrook | |
| 5,673,763 A | 10/1997 | Thorp | |
| 5,685,379 A | 11/1997 | Barr et al. | |
| 5,695,015 A | 12/1997 | Barr et al. | |
| 5,706,905 A | 1/1998 | Barr | |
| 5,778,992 A | 7/1998 | Fuller | |
| 5,803,185 A | 9/1998 | Barr et al. | |
| 5,900,627 A * | 5/1999 | Odom et al. | 250/269.7 |
| 5,971,085 A | 10/1999 | Colebrook | |
| 6,089,332 A | 7/2000 | Berr et al. | |
| 6,092,610 A | 7/2000 | Kosmala et al. | |
| 6,158,529 A | 12/2000 | Dorel | |
| 6,244,361 B1 | 6/2001 | Comeau et al. | |

(Continued)

FOREIGN PATENT DOCUMENTS

EP 0860715 B1 8/1998

OTHER PUBLICATIONS

Mendoza, A., et al., Rapid Simulation of Borehole Nuclear Measurements with Approximate Spatial Flux-Scattering Functions, Society of Petrophysicists and Well Log Analysts 48th Annual Logging Symposium, Austin, TX, Jun. 2007, pp. 1-16.

(Continued)

*Primary Examiner*—Edward Raymond
(74) *Attorney, Agent, or Firm*—James McAleenan; Vincent Loccisano; Brigid Laffey

(57) ABSTRACT

Methods and related systems are described for predicting a response of a gamma ray measurement tool located in a borehole surrounded by a subterranean formation. A response of the tool is calculated according to one or more properties at a plurality of spatial locations in relation to the measurement tool using a forward model that assumes a non-linear relationship between the one or more properties at the plurality of spatial locations and the corresponding response of the tool.

50 Claims, 44 Drawing Sheets

U.S. PATENT DOCUMENTS

| | | |
|---|---|---|
| 6,364,034 B1 | 4/2002 | Schoeffler |
| 6,394,193 B1 | 5/2002 | Askew |
| 2001/0052428 A1 | 12/2001 | Larronde et al. |
| 2002/0011359 A1 | 1/2002 | Webb et al. |
| 2002/0036260 A1 | 3/2002 | Adolph |
| 2003/0009288 A1 | 1/2003 | Mickael |
| 2005/0028586 A1 | 2/2005 | Smits et al. |
| 2007/0185696 A1* | 8/2007 | Moran et al. ............ 703/10 |
| 2008/0314137 A1* | 12/2008 | Proett et al. ............ 73/152.22 |

OTHER PUBLICATIONS

Watson, CC., Monte Carlo Computation of Differential Sensitivity Functions, Transaction of the American Nuclear Society, vol. 42, 1985, pp. 655-657.

Watson, CC., A Spatial Sensitivity Analysis Technique for Neutron and [gamma]-ray Measurements, Second Topical Meeting on Industrial Radiation and Radioisotope Measurement Applications, Raleigh, NC, Sep. 1992, pp. 1-3.

* cited by examiner

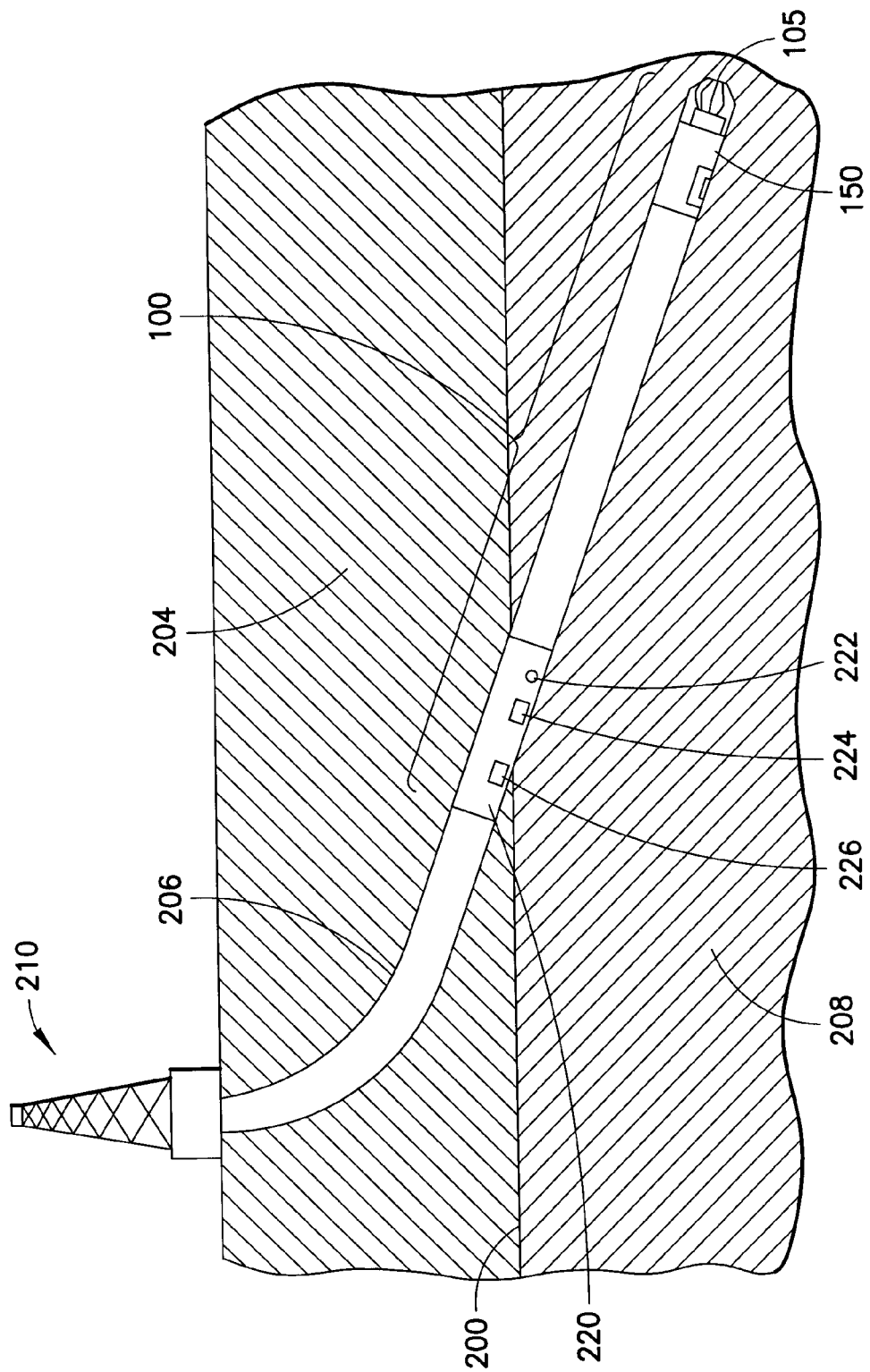

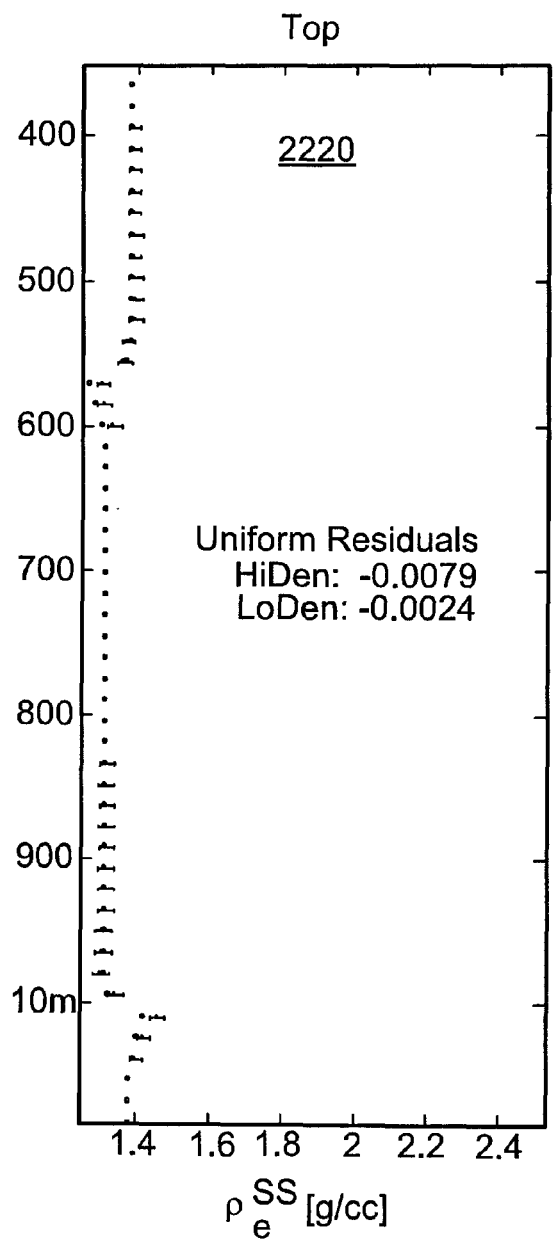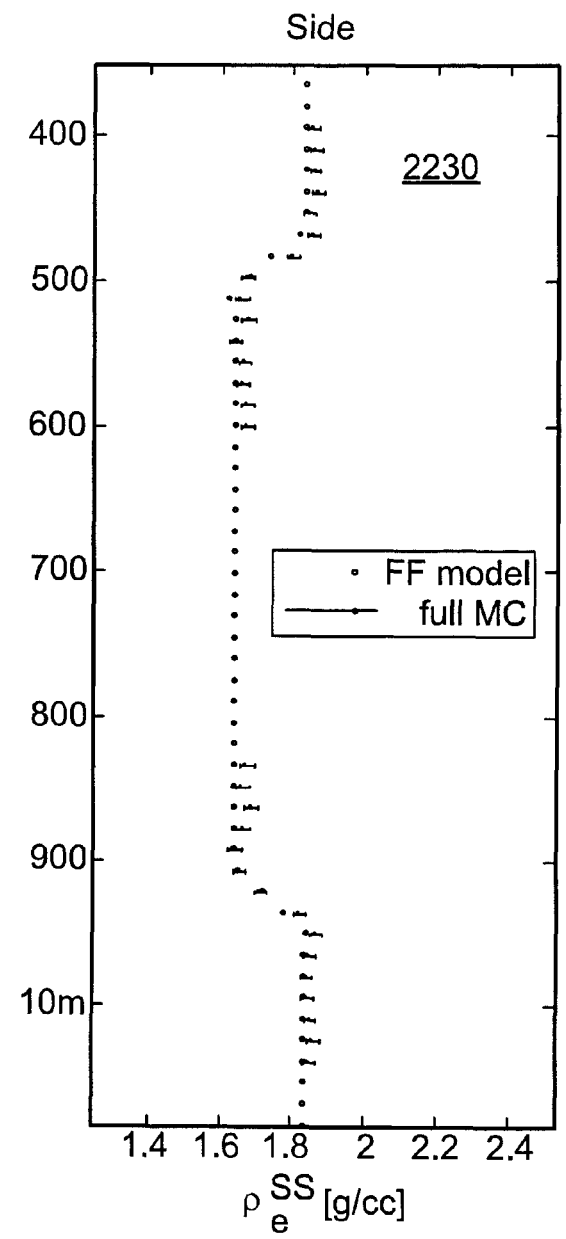
Fig. 22b
Fig. 22c

FORWARD MODELS FOR GAMMA RAY MEASUREMENT ANALYSIS OF SUBTERRANEAN FORMATIONS

BACKGROUND OF THE INVENTION

1. Field of the Invention

This patent specification relates to gamma ray measurements in subterranean formations. More particularly, this patent specification relates to systems and methods for forward modeling for gammy ray measurement analysis of subterranean formations.

2. Background of the Invention

In nuclear logging oilfield applications, Monte Carlo methods are preferred for their accuracy. However, in practice many Monte Carlo methods are unsuitable for real-time log analysis due to the limited computational speed of modern computers.

An example of a conventional linear based forward modeling technique is described in Charles C. Watson, "Monte Carlo Computation of Differential Sensitivity Functions", Trans. Am. Nucl. Soc., vol. 46, page 655, 1984, and Charles C. Watson, "A Spatial Sensitivity Analysis Technique for Neutron and Gamma-Ray Measurements", Trans. Am. Nucl. Soc., vol. 65 (Suppl.1), pp. 3-4, 1992 both of which are incorporated herein by reference, and hereinafter referred to as "the Watson Papers." By modeling the dominant gamma-ray interactions of Compton scattering and photoelectric absorption, this technique can be used to predict the detector response of a density logging tool. The primary advantage of the density sensitivity method is its very fast computational speed, in that it can provide answers on a sub-second scale. Its basic premise assumes a linear relationship between the detector response and changes in the density and Pe properties of the formation. The space around the tool is divided into a grid of cells, each of which is assigned a sensitivity. The contribution of each cell for the response estimate comes from pre-calculated spatial sensitivity maps. Further details of the density sensitivity function technique are disclosed in U.S. Pat. No. 5,334,833, incorporated herein by reference. The performance of this linear technique is modest, with relative accuracies of a few percent in count space which must then be converted to density space. For example, when applying the method to the LWD Vision 475 density tool from Schlumberger, the modeling error in comparison to experimental data was found to be as much as 0.1 g/cc within 1" water standoff when covering typical spatial variations in density from 1 to 3 g/cc. The limited nature of the $1^{st}$-order method is also apparent in that the density sensitivity functions are not identical when calculated using different reference formations. Some improvement in accuracy can be realized by modifying the sensitivity functions on a case-by-case basis, but such adjustments are not fully general. A. Mendoza, C. Torres-Verdin, and W. Preeg, "Rapid Simulation of Borehole Nuclear Measurements With Approximate Spatial Flux-Scattering Functions", SPWLA 48th Annual Logging Symposium, Jun. 3-6, 2007 proposes a spatial flux-scattering functions (FSFs) technique to rapidly simulate neutron and (gamma-gamma) density porosity logs. This technique is very similar to Watson's sensitivity technique described above. As a result, the speed of the FSF model is comparable to Watson's model. However, the accuracy achieved by the FSF model is only 10%, which is not a significant improvement over the older models.

SUMMARY OF THE INVENTION

According to embodiments, a method is provided for predicting a response of a gamma ray measurement tool located in a borehole surrounded by a subterranean formation. The method includes calculating a response of the tool according to one or more properties at a plurality of spatial locations in relation to the measurement tool using a forward model that assumes a non-linear relationship between the one or more properties at the plurality of spatial locations and the corresponding response of the tool.

According to further embodiments a system is provided for estimating properties of a subterranean formation surrounding a borehole. The system includes a tool deployable in a borehole; a gamma ray source mounted on a tool, adapted and positioned to transmit gamma radiation into the formation; and one or more gamma ray detectors mounted on the tool each at a predetermined spacing from the source, the detectors adapted and positioned to detect gamma radiation. A processing system is adapted to receive data representing radiation detected by the detectors. The processing system is configured and programmed to calculate a response of the tool according to one or more properties at a plurality of spatial locations in relation to the tool using a forward model that assumes a non-linear relationship between the one or more properties at the plurality of spatial locations and the corresponding response of the tool unit.

According to yet further embodiments, a method is provided for estimating properties of a subterranean formation surrounding a borehole. The method includes drilling into the formation with a drill bit to extend the borehole according to a predetermined drilling trajectory; generating gamma radiation using a gamma ray source mounted on a tool located in the borehole; and detecting gamma radiation using one or more gamma ray detectors mounted on the tool. A response of the tool is iteratively calculated according to one or more properties at a plurality of spatial locations in relation to the tool using a forward model, such that one or more of the properties for at least some of the plurality of spatial locations is estimated in accordance with the detected gamma radiation. The predetermined drilling trajectory is altered based at least in part on the estimated properties.

Further features and advantages of the invention will become more readily apparent from the following detailed description when taken in conjunction with the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 2 illustrates further detail of a wellsite system according to embodiments of the invention, surface system 210 is shown in FIG. 2 that has equipment identical or similar to the surface system described with respect to FIG. 1;

FIGS. 21a-c, 22a-c and 23a-c show the log comparisons for the LS, SS, and compensated densities for a dip angle of 80° and ¾" of water standoff, according to embodiments of the invention;

FIG. 24b is a histogram showing the overall distribution of residuals shown in the image of FIG. 24a;

DETAILED DESCRIPTION OF THE PREFERRED EMBODIMENTS

In the following detailed description of the preferred embodiments, reference is made to accompanying drawings, which form a part hereof, and within which are shown by way of illustration specific embodiments by which the invention may be practiced. It is to be understood that other embodiments may be utilized and structural changes may be made without departing from the scope of the invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice. Further, like reference numbers and designations in the various drawings indicated like elements.

Figure 1:
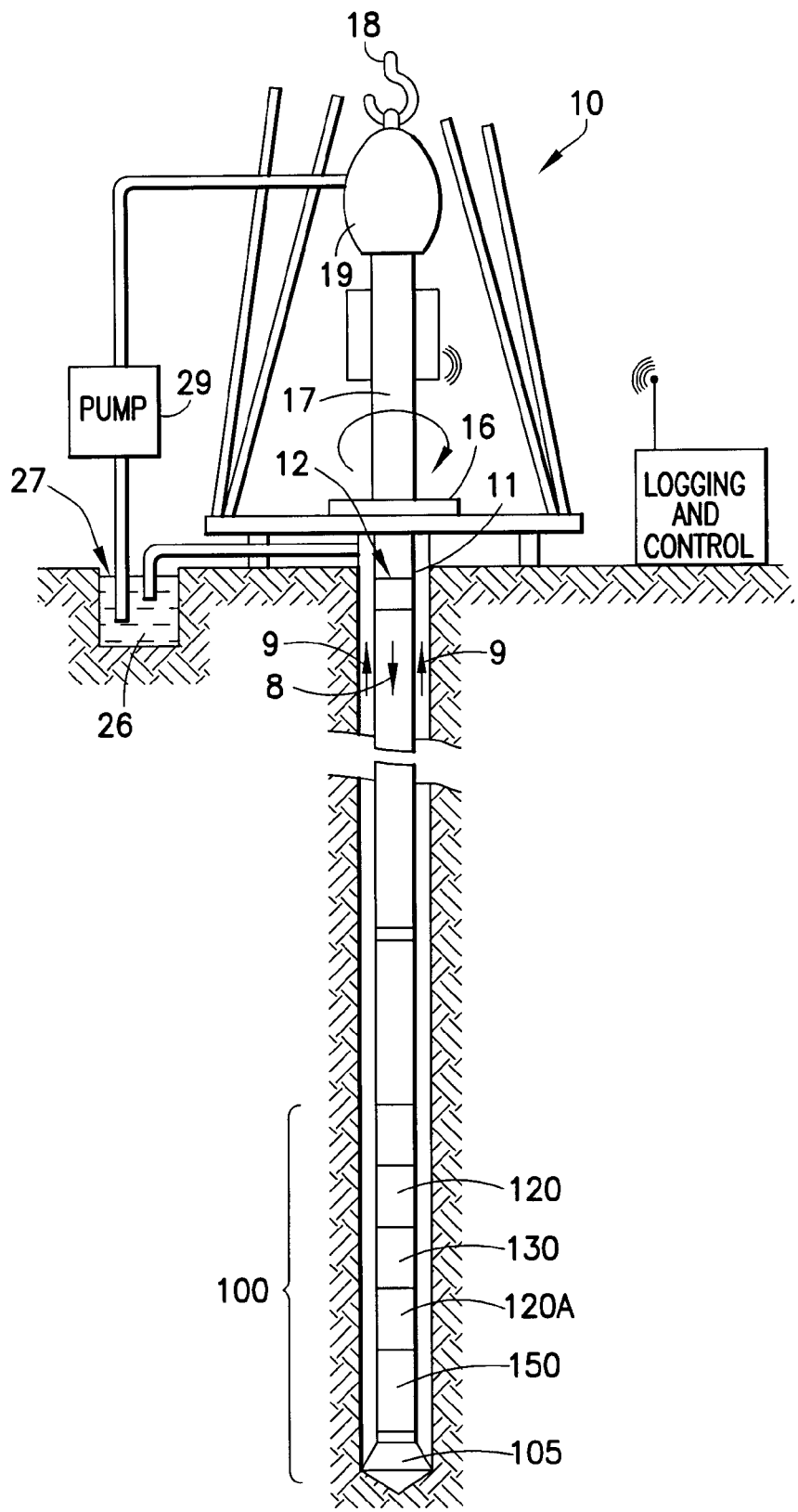
FIG. 1 illustrates a wellsite system in which the present invention can be employed.

FIG. 1 illustrates a wellsite system in which the present invention can be employed. The wellsite can be onshore or offshore. In this exemplary system, a borehole 11 is formed in subsurface formations by rotary drilling in a manner that is well known. Embodiments of the invention can also use directional drilling, as will be described hereinafter.

A drill string 12 is suspended within the borehole 11 and has a bottom hole assembly 100 which includes a drill bit 105 at its lower end. The surface system includes platform and derrick assembly 10 positioned over the borehole 11, the assembly 10 including a rotary table 16, kelly 17, hook 18 and rotary swivel 19. The drill string 12 is rotated by the rotary table 16, energized by means not shown, which engages the kelly 17 at the upper end of the drill string. The drill string 12 is suspended from a hook 18, attached to a traveling block (also not shown), through the kelly 17 and a rotary swivel 19 which permits rotation of the drill string relative to the hook. It is possible, a top drive system could alternatively be used.

In the example of this embodiment, the surface system further includes drilling fluid or mud 26 stored in a pit 27 formed at the well site. A pump 29 delivers the drilling fluid 26 to the interior of the drill string 12 via a port in the swivel 19, causing the drilling fluid to flow downwardly through the drill string 12 as indicated by the directional arrow 8. The drilling fluid exits the drill string 12 via ports in the drill bit 105, and then circulates upwardly through the annulus region between the outside of the drill string and the wall of the borehole, as indicated by the directional arrows 9. In this well known manner, the drilling fluid lubricates the drill bit 105 and carries formation cuttings up to the surface as it is returned to the pit 27 for recirculation.

The bottom hole assembly 100 of the illustrated embodiment a logging-while-drilling (LWD) module 120, a measuring-while-drilling (MWD) module 130, a roto-steerable system and motor, and drill bit 105.

The LWD module 120 is housed in a special type of drill collar, as is known in the art, and can contain one or a plurality of known types of logging tools. It will also be understood that more than one LWD and/or MWD module can be employed, e.g. as represented at 120A. (References, throughout, to a module at the position of 120 can alternatively mean a module at the position of 120A as well.) The LWD module includes capabilities for measuring, processing, and storing information, as well as for communicating with the surface equipment. In the present embodiment, the LWD module includes pressure, sonic and gamma ray measuring devices.

The MWD module 130 is also housed in a special type of drill collar, as is known in the art, and can contain one or more devices for measuring characteristics of the drill string and drill bit. The MWD tool further includes an apparatus (not shown) for generating electrical power to the downhole system. This may typically include a mud turbine generator powered by the flow of the drilling fluid, it being understood that other power and/or battery systems may be employed. In the present embodiment, the MWD module includes one or more of the following types of measuring devices: a weight-on-bit measuring device, a torque measuring device, a vibration measuring device, a shock measuring device, a stick slip measuring device, a direction measuring device, and an inclination measuring device.

A particularly advantageous use of the system hereof is in conjunction with controlled steering or "directional drilling." In this embodiment, a roto-steerable subsystem 150 (FIG. 1) is provided. Directional drilling is the intentional deviation of the wellbore from the path it would naturally take. In other words, directional drilling is the steering of the drill string so that it travels in a desired direction. Directional drilling is, for example, advantageous in offshore drilling because it enables many wells to be drilled from a single platform. Directional drilling also enables horizontal drilling through a reservoir. Horizontal drilling enables a longer length of the wellbore to traverse the reservoir, which increases the production rate from the well. A directional drilling system may also be used in vertical drilling operation as well. Often the drill bit will veer off of a planned drilling trajectory because of the unpredictable nature of the formations being penetrated or the varying forces that the drill bit experiences or the geology may not be where it is expected to be. When such a deviation occurs, a directional drilling system may be used to put the drill bit back on course. A known method of directional drilling includes the use of a rotary steerable system ("RSS"). In an RSS, the drill string is rotated from the surface, and downhole devices cause the drill bit to drill in the desired direction. Rotating the drill string greatly reduces the occurrences of the drill string getting hung up or stuck during drilling. Rotary steerable drilling systems for drilling deviated boreholes into the earth may be generally classified as either "point-the-bit" systems or "push-the-bit" systems. In the point-the-bit system, the axis of rotation of the drill bit is deviated from the local axis of the bottom hole assembly in the general direction of the new hole. The hole is propagated in accordance with the customary three point geometry defined by upper and lower stabilizer touch points and the drill bit. The angle of deviation of the drill bit axis coupled with a finite distance between the drill bit and lower stabilizer results in the non-collinear condition required for a curve to be generated. There are many ways in which this may be achieved including a fixed bend at a point in the bottom hole assembly close to the lower stabilizer or a flexure of the drill bit drive shaft distributed between the upper and lower stabilizer. In its idealized form, the drill bit is not required to cut sideways because the bit axis is continually rotated in the direction of the curved hole. Examples of point-the-bit type rotary steerable systems, and how they operate are described in U.S. Patent Application Publication Nos. 2002/0011359; 2001/0052428 and U.S. Pat. Nos. 6,394,193; 6,364,034; 6,244,361; 6,158,529; 6,092,610; and 5,113,953 all herein incorporated by reference. In the push-the-bit rotary steerable system there is usually no specially identified mechanism to deviate the bit axis from the local bottom hole assembly axis; instead, the requisite non-collinear condition is achieved by causing either or both of the upper or lower stabilizers to apply an eccentric force or displacement in a direction that is preferentially orientated with respect to the direction of hole propagation. Again, there are many ways in which this may be achieved, including non-rotating (with respect to the hole) eccentric stabilizers (displacement based approaches) and eccentric actuators that apply force to the drill bit in the desired steering direction. Again, steering is achieved by creating non co-linearity between the drill bit and at least two other touch points. In its idealized form the drill bit is required to cut sideways in order to generate a curved hole. Examples of push-the-bit type rotary steerable systems, and how they operate are described in U.S. Pat. Nos. 5,265,682; 5,553,678; 5,803,185; 6,089,332; 5,695,015; 5,685,379; 5,706,905; 5,553,679; 5,673,763; 5,520,255; 5,603,385; 5,582,259; 5,778,992; 5,971,085 all herein incorporated by reference. Alternatively, directional drilling could be accomplished using a downhole drilling motor such as a mud motor which is driven by hydraulic power of drilling mud. A piece of bent pipe known as a "bent sub" is included near the top of the mud motor to allow trajectory adjustments.

FIG. 2 illustrates further detail of a wellsite system according to embodiments of the invention. Surface system 210 is shown in FIG. 2 that has equipment identical or similar to the surface system described with respect to FIG. 1. In this case bottom hole assembly 100 is shown deployed in a high angle/horizontal well 206 through subterranean rock formation 200. Rock formation 200 comprises two distinct layers, namely upper layer 204 and lower layer 208. Assembly 100 includes a gamma-gamma density LWD unit 220. Gamma-gamma density LWD unit includes a gamma ray source 222, a short spacing gamma ray detector 224 and a long spacing gamma ray detector 226. Assembly 100 also includes a directional drilling system in the form of a roto-steerable subsystem 150 near drill bit 105. Assembly 100 also includes modules and equipment at described with respect to FIG. 1. According to embodiments of the invention, measurements from gamma-gamma density LWD unit 220 can be processed in real-time such that the information can be used to steer drill bit 105 using roto-steerable subsystem 150. As will be described more fully below, a relatively fast and accurate model allows for such real-time geosteering. For example, assembly 100 passes through the boundary between upper layer 204 and lower layer 208, measurements from gamma-gamma density LWD unit 220 are interpreted real-time using a fast forward model as described herein to detect the boundary. The detection of the boundary and the characteristic response of the gamma-gamma density unit can then be used for navigation, to alter the predetermined trajectory of drill bit 105 using roto-steerable subsystem 150. The measurements can be interpreted manually by a driller at the surface, for example by visually comparing the predicted tool response from the forward model with images from the direct gamma-gamma density measurement. Alternatively, the measurements from the gamma-gamma density LWD unit can be interpreted automatically using an inversion algorithm as described herein to generate sets of conditions that are consistent with the direct measurements. This automatic inversion technique can be carried out on the surface, but can also be carried out by a processing unit downhole as part of unit 220 or elsewhere within assembly 100.

According to another embodiment, gamma-gamma density unit 220 is adapted and mounted on a wireline toolstring deployed in wellbore 206 in formation 200. According to this embodiment, data reflecting measurements from unit 220 are transmitted to the surface via a wireline cable and interpreted using a fast forward model and inversion techniques as described herein.

Further detail will now be provided for developing a fast and accurate forward model for gamma ray density logging tools, according to embodiments of the invention. A fundamental limitation of the known gamma ray density sensitivity function techniques described above is the assumption of linear ($1^{st}$-order) dependences. An expansion of the technique to a $2^{nd}$-order approximation is provided. The advantages of the $2^{nd}$-order method can among other things include: (1) accuracy, producing a dramatic improvement in density predictions; (2) simplicity, because it requires no adjustment to the sensitivity functions on a case-by-case basis; (3) versatility, as it can be applied to the complete realistic range of formation densities, Pe factors, and drilling mud standoff conditions; and (4) speed, in that the difference in computing time with respect to the linear method is negligible.

Based on this expanded non-linear approach, a fast forward (FF) model for gamma-gamma density measurements is provided. As used herein the term "model" refers to a representation, mathematical or otherwise, used to describe a physical system. According to an embodiment, a fast forward model for gamma-gamma density measurements is provided for use with an 8¼" stabilizer EcoScope tool from Schlumberger. LWD tools such as EcoScope yield gamma-gamma density measurements in the form of logs and azimuthal images. Embedded within an inversion framework, a forward density model of sufficient speed and accuracy provides the ability to infer the true formation geometry and composition that produced the observed data. Reliable access to this information would provide a necessary component to HA/HZ formation evaluation.

Further details of the expansion of the sensitivity function technique will now be provided. In a two-dimensional cylindrical coordinate system, we divide the space outside a density logging tool into many cells with radial and axial boundaries of $r=r_0, r_1, \ldots r_{N_r}$ and $z=z_0, z_1, \ldots z_{N_z}$, where $r_0$ is the tool radius. The tool's detector response is a function of the formation density and U of each cell, $$R = R(\rho_{r,z}, U_{r,z}) \quad (1)$$

where $\rho_{r,z}$ and $U_{r,z} (=\rho_{r,z} \cdot P_{r,z})$ are the electron density and U of the cell at location (r,z). As is discussed in further detail below, the azimuthal variation of the formation can be largely neglected.

If we assume the reference point is a uniform formation of cells with parameters $\rho_0$ and $U_0$, to which the tool response is $R_0 = R(\rho_0, U_0)$, the $1^{st}$-order Taylor series expansion of the response is $$R = R_0 + \sum_{r,z} \left( \frac{\partial R}{\partial \rho_{r,z}} \Big|_{\rho=\rho_0, U=U_0} \Delta \rho_{r,z} \right) + \sum_{r,z} \left( \frac{\partial R}{\partial U_{r,z}} \Big|_{\rho=\rho_0, U=U_0} \Delta U_{r,z} \right). \quad (2)$$

Since $\rho \propto \ln R$, the corresponding expansion of density is $$\rho = \rho_0 + \frac{1}{R_0} \cdot \sum_{r,z} \left( \frac{\partial R}{\partial \rho_{r,z}} \Big|_{\rho=\rho_0, U=U_0} \Delta \rho_{r,z} \right) + \frac{1}{R_0} \cdot \sum_{r,z} \left( \frac{\partial R}{\partial U_{r,z}} \Big|_{\rho=\rho_0, U=U_0} \Delta U_{r,z} \right). \quad (3)$$

If we define the $1^{st}$-order sensitivity maps for the Compton and photoelectric interactions as, respectively, $$S_{C_{r,z}} = \frac{\frac{\partial R}{\partial \rho_{r,z}} \Big|_{\rho=\rho_0, U=U_0}}{\sum_{r,z} \left( \frac{\partial R}{\partial \rho_{r,z}} \Big|_{\rho=\rho_0, U=U_0} \right)} \quad \left( \sum_{r,z} S_{C_{r,z}} = 1 \right) \quad (4)$$

and $$S_{\tau_{r,z}} = \frac{\frac{\partial R}{\partial U_{r,z}} \Big|_{\rho=\rho_0, U=U_0}}{\sum_{r,z} \left( \frac{\partial R}{\partial U_{r,z}} \Big|_{\rho=\rho_0, U=U_0} \right)} \quad \left( \sum_{r,z} S_{\tau_{r,z}} = 1 \right), \quad (5)$$

then the expansion of the density response in Equation (3) may be written more simply as $$\rho = \rho_0 + a_1 \cdot \sum_{r,z} (S_{C_{r,z}} \Delta \rho_{r,z}) + a_2 \cdot \sum_{r,z} (S_{\tau_{r,z}} \Delta U_{r,z}). \quad (6)$$

The coefficients $a_1$ and $a_2$ can be determined in a fit to experimental data. In the several-hundred-keV energy regime of gamma-gamma density tools, the $a_1$ Compton term dominates the detector response and the photoelectric coefficient $a_2$ is at the percent level or less. This $1^{st}$-order approximation is the essence of the linear sensitivity function method discussed in the Watson Papers.

According to embodiments of the invention, further details of the $2^{nd}$-order approximation will now be provided. Expanding the sensitivity method to a $2^{nd}$-order approximation is straightforward in the mathematical sense, although implementing it on a practical level requires some intuition and experience. As noted above, the $1^{st}$-order photoelectric contribution to the detector response is generally at the level of a small correction. In adapting the Taylor expansion as a usable model, we can therefore neglect the $2^{nd}$-order Pe terms as well as the cross-terms between Pe and density interactions. Adding only the $2^{nd}$-order Compton terms, the Taylor series for detector response is $$R = R_0 + \sum_{r,z} \left( \frac{\partial R}{\partial \rho_{r,z}} \Big|_{\rho=\rho_0, U=U_0} \Delta \rho_{r,z} \right) + \sum_{r,z} \left( \frac{\partial R}{\partial U_{r,z}} \Big|_{\rho=\rho_0, U=U_0} \Delta U_{r,z} \right) + \quad (7)$$
$$\frac{1}{2} \sum_{r,z} \sum_{r',z'} \left( \frac{\partial^2 R}{\partial \rho_{r,z} \partial \rho_{r',z'}} \Big|_{\rho=\rho_0, U=U_0} \Delta \rho_{r,z} \Delta \rho_{r',z'} \right)$$

In terms of density $\rho = a \cdot \ln R + b$, the $2^{nd}$-order approximation is $$\rho = \rho_0 + \frac{a}{R_0} \cdot \sum_{r,z} \left( \frac{\partial R}{\partial \rho_{r,z}} \Big|_{\rho=\rho_0, U=U_0} \Delta \rho_{r,z} \right) + \quad (8)$$
$$\frac{a}{R_0} \cdot \sum_{r,z} \left( \frac{\partial R}{\partial U_{r,z}} \Big|_{\rho=\rho_0, U=U_0} \Delta U_{r,z} \right) +$$

-continued $$\frac{1}{2} \cdot \sum_{r,z} \sum_{r',z'} \left[ \left( \begin{array}{c} \frac{a}{R} \cdot \frac{\partial^2 R}{\partial \rho_{r,z} \partial \rho_{r',z'}} - \\ \frac{a}{R^2} \cdot \frac{\partial R}{\partial \rho_{r,z}} \cdot \frac{\partial R}{\partial \rho_{r',z'}} \end{array} \right) \bigg|_{\rho=\rho_0, U=U_0} \Delta\rho_{r,z} \Delta\rho_{r',z'} \right]$$

Again applying the sensitivity map definitions of Equations (4) and (5) and consolidating the constant factors, the density response can be redefined as $$\rho = \rho_0 + b_1 \cdot \sum_{r,z} (S_{c_{r,z}} \Delta\rho_{r,z}) + b_2 \cdot \sum_{r,z} (S_{\tau_{r,z}} \Delta U_{r,z}) + \quad (9)$$

$$b_3 \cdot \sum_{r,z} \sum_{r',z'} \left[ \left( \frac{\partial^2 R}{\partial \rho_{r,z} \partial \rho_{r',z'}} \right) \bigg|_{\rho=\rho_0, U=U_0} \Delta\rho_{r,z} \Delta\rho_{r',z'} \right] +$$

$$b_4 \cdot \sum_{r,z} \sum_{r',z'} \left[ \left( \frac{\partial R}{\partial \rho_{r,z}} \cdot \frac{\partial R}{\partial \rho_{r',z'}} \right) \bigg|_{\rho=\rho_0, U=U_0} \Delta\rho_{r,z} \Delta\rho_{r',z'} \right]$$

which has contributions from $1^{st}$- and $2^{nd}$-order derivatives. The final ($b_4$) term is simply the double-sum over all spatial elements in the $1^{st}$-order Compton term:

$$\sum_{r,z} \sum_{r',z'} \left[ \left( \frac{\partial R}{\partial \rho_{r,z}} \cdot \frac{\partial R}{\partial \rho_{r',z'}} \right) \bigg|_{\rho=\rho_0, U=U_0} \Delta\rho_{r,z} \Delta\rho_{r',z'} \right] = \quad (10)$$

$$\sum_{r,z} \left( \frac{\partial R}{\partial \rho_{r,z}} \bigg|_{\rho=\rho_0, U=U_0} \Delta\rho_{r,z} \right) \cdot \sum_{r',z'} \left( \frac{\partial R}{\partial \rho_{r',z'}} \bigg|_{\rho=\rho_0, U=U_0} \Delta\rho_{r',z'} \right) \propto$$

$$\left[ \sum_{r,z} (S_{c_{r,z}} \Delta\rho_{r,z}) \right]^2$$

The $b_3$ term in Equation (9) can be addressed if we assume that for different cells i and j (i≠y), the detector response is separable and can be written as $$R \propto R_i(\rho_i) \cdot R_j(\rho_j). \quad (11)$$

By definition, the derivative behavior is $$\frac{\partial^2 R}{\partial \rho_i \partial \rho_j} \propto \frac{\partial R}{\partial \rho_i} \cdot \frac{\partial R}{\partial \rho_j} \text{ when } i \neq j, \quad (12)$$

and the $b_3$ term can be written as $$\sum_{r,z} \sum_{r',z'} \left[ \left( \frac{\partial^2 R}{\partial \rho_{r,z} \partial \rho_{r',z'}} \right) \bigg|_{\rho=\rho_0, U=U_0} \Delta\rho_{r,z} \Delta\rho_{r',z'} \right] = \quad (13)$$

$$c_0 \cdot \sum_{r,z} \sum_{(r',z') \neq (r,z)} \left[ \left( \frac{\partial R}{\partial \rho_{r,z}} \cdot \frac{\partial R}{\partial \rho_{r',z'}} \right) \bigg|_{\rho=\rho_0, U=U_0} \Delta\rho_{r,z} \Delta\rho_{r',z'} \right] +$$

$$\sum_{r,z} \left( \frac{\partial^2 R}{\partial \rho_{r,z}^2} \bigg|_{\rho=\rho_0, U=U_0} \Delta^2\rho_{r,z} \right)$$

where the diagonal "i=j" terms of the double sum are explicitly separated into the second line. Using a complete double sum, the same equation can be recast as $$\sum_{r,z} \left[ \left( \frac{\partial^2 R}{\partial \rho_{r,z} \partial} \right) \bigg|_{\rho=\rho_0, U=U_0} \Delta\rho_{r,z} \Delta\rho_{r',z'} \right] = \quad (14)$$

$$c_0 \cdot \sum_{r,z} \sum_{r',z'} \left[ \left( \frac{\partial R}{\partial \rho_{r,z}} \cdot \frac{\partial R}{\partial \rho_{r',z'}} \right) \bigg|_{\rho=\rho_0, U=U_0} \Delta\rho_{r,z} \Delta\rho_{r',z'} \right] +$$

$$\sum_{r,z} \left( \frac{\partial^2 R}{\partial \rho_{r,z}^2} \bigg|_{\rho=\rho_0, U=U_0} \Delta^2\rho_{r,z} \right) - c_0 \cdot \sum_{r,z} \left( \frac{\partial R}{\partial \rho_{r,z}} \bigg|_{\rho=\rho_0, U=U_0}^2 \Delta^2\rho_{r,z} \right)$$

where the squared $1^{st}$ derivatives are subtracted appropriately. By substituting the Compton sensitivity map of Equation (4), applying the separability condition of Equation (10), and redefining the coefficients, the total sum is equivalent to $$\sum_{r,z} \sum_{r',z'} \left[ \left( \frac{\partial^2 R}{\partial \rho_{r,z} \partial \rho_{r',z'}} \right) \bigg|_{\rho=\rho_0, U=U_0} \Delta\rho_{r,z} \Delta\rho_{r',z'} \right] = \quad (15)$$

$$c_1 \cdot \left[ \sum_{r,z} (S_{c_{r,z}} \Delta\rho_{r,z}) \right]^2 +$$

$$\sum_{r,z} \left( \frac{\partial^2 R}{\partial \rho_{r,z}^2} \bigg|_{\rho=\rho_0, U=U_0} \Delta^2\rho_{r,z} \right) - c_2 \cdot \sum_{r,z} (S_{c_{r,z}}^2 \Delta^2\rho_{r,z})$$

Inserting the manipulated sums of Equations (10) and (15), the overall density response of Equation (9) is $$\rho = \rho_0 b_1 \cdot \sum_{r,z} (S_{c_{r,z}} \Delta\rho_{r,z}) + b_2 \cdot \sum_{r,z} (S_{\tau_{r,z}} \Delta U_{r,z}) + \quad (16)$$

$$b_3 \cdot c_1 \cdot \left[ \sum_{r,z} (S_{c_{r,z}} \Delta\rho_{r,z}) \right]^2 + b_3 \cdot \sum_{r,z} \left( \frac{\partial^2 R}{\partial \rho_{r,z}^2} \bigg|_{\rho=\rho_0, U=U_0} \Delta^2\rho_{r,z} \right) -$$

$$b_3 \cdot c_2 \cdot \sum_{r,z} (S_{c_{r,z}}^2 \Delta^2\rho_{r,z}) + b_4 \cdot \left[ \sum_{r,z} (S_{c_{r,z}} \Delta\rho_{r,z}) \right]^2$$

By combining like terms and redefining the coefficients, the response simplifies to $$\rho = \rho_0 + a_1 \cdot \sum_{r,z} (S_{c_{r,z}} \Delta\rho_{r,z}) + \quad (17)$$

$$a_2 \cdot \sum_{r,z} (S_{\tau_{r,z}} \Delta U_{r,z}) + a_3 \cdot \left[ \sum_{r,z} (S_{c_{r,z}} \Delta\rho_{r,z}) \right]^2 +$$

$$a_4 \cdot \sum_{r,z} \left( \frac{\partial^2 R}{\partial \rho_{r,z}^2} \bigg|_{\rho=\rho_0, U=U_0} \Delta^2\rho_{r,z} \right) - a_5 \cdot \sum_{r,z} (S_{c_{r,z}}^2 \Delta^2\rho_{r,z})$$

In analogy to the $1^{st}$-order sensitivity maps, the $2^{nd}$ order Compton map is defined as $$S_{c2_{r,z}} = \frac{\frac{\partial^2 R}{\partial \rho_{r,z}^2} \bigg|_{\rho=\rho_0, U=U_0}}{\sum_{r,z} \left( \frac{\partial^2 R}{\partial \rho_{r,z}^2} \bigg|_{\rho=\rho_0, U=U_0} \right)} \quad \left( \sum_{r,z} S_{c2_{r,z}} = 1 \right). \quad (18)$$

Finally, applying this definition to the density response of Equation (17) yields $$\rho = \rho_0 + a_1 \cdot \sum_{r,z}(S_{c_{r,z}}\Delta\rho_{r,z}) + a_2 \cdot \sum_{r,z}(s_{\tau_{r,z}}\Delta U_{r,z}) + \quad (19)$$
$$a_3 \cdot \left[\sum_{r,z}(S_{c_{r,z}}\Delta\rho_{r,z})\right]^2 + a_4 \cdot \sum_{r,z}(S_{c2_{r,z}}\Delta^2\rho_{r,z}) - a_5 \cdot \sum_{r,z}(S_{c_{r,z}}^2\Delta^2\rho_{r,z})$$

This equation represents a $2^{nd}$-order expansion of the sensitivity function technique, and it only relies on the assumption of a separable detector response with respect to different cell densities. The $a_5$ term, which subtracts the diagonal elements from the double sum of separable derivatives, amounts to a small correction; studies with a forward model of this structure show that this term's presence causes a negligible difference in the overall accuracy of the model. We therefore neglect the $a_5$ term in order to simplify the model.

The $2^{nd}$-order fast forward model can be written most compactly as $$\rho = \rho_0 + a_1 \cdot \sum_{r,z}(S_{c_{r,z}}\Delta\rho_{r,z}) + a_2 \cdot \sum_{r,z}(S_{\tau_{r,z}}\Delta U_{r,z}) + \quad (20)$$
$$a_3 \cdot \left[\sum_{r,z}(S_{c_{r,z}2}\Delta\rho_{r,z})\right]^2 + a_4 \cdot \sum_{r,z}(S_{c2_{r,z}}\Delta^2\rho_{r,z}).$$

For each detector response, this model requires three sensitivity functions which describe its spatial dependence on formation properties: the $1^{st}$-order Compton map, the $1^{st}$-order Pe map, and the $2^{nd}$-order Compton map. All of the maps can be calculated using the perturbation feature in the MCNP5 code. See, X-5 Monte Carlo Team, "MCNP—A General Monte Carlo N-Particle Transport Code, Version 5," LA-CP-03-0245, Los Alamos National Laboratory (2003), herein after referred to as the "MCNP Manual." The additional $a_3$ term encompasses the correlation of each cell's Compton response to the densities of the other cells. In this sense, we sometimes refer to the $a_3$ component as the "density cross-terms", while the $2^{nd}$-order response to individual cell densities are "diagonal" sensitivities. The coefficients $a_1$, $a_2$, $a_3$, $a_4$ and $\rho_0$ can be determined by fitting the model to match Monte Carlo calculations or experimental data.

A different perspective may be gained for the $2^{nd}$-order fast forward model by rearranging Equation (20) in a fashion similar to the original $1^{st}$-order model:

$$\rho = \rho_0 + a_1 \cdot \sum_{r,z}\left[\left(S_{c_{r,z}} + \frac{a_3}{a_1}\cdot S_{c_{r,z}}\cdot\sum_{r,z}(S_{c_{r,z}}\Delta\rho_{r,z}) + \frac{a_4}{a_1}\cdot S_{c2_{r,z}}\Delta\rho_{r,z}\right)\cdot\Delta\rho_{r,z}\right] + \quad (21)$$
$$a_2 \cdot \sum_{r,z}(S_{\tau_{r,z}}\Delta U_{r,z}).$$

In this interpretation, the $2^{nd}$-order model is structured much like the linear approximation except that the $1^{st}$-order Compton sensitivity map is modified according to a weighted average density.

Further detail will now be provided for generating the sensitivity maps, according to embodiments of the invention. MCNP5 provides a perturbation feature, which we use in a straightforward manner to generate the sensitivity maps at both $1^{st}$ and $2^{nd}$ orders. See, the MCNP Manual. All of the maps can be calculated using the mean track length per detector volume ("MCNP Tally 4") as a proportional estimate of the detector response. For the derivation of each map corresponding to the dominant Compton scattering or photoelectric absorption interactions, the appropriate gamma-ray macroscopic cross section is perturbed sequentially within each of the spatial cells described above. The change in the detector response for each of these spatially dependent perturbations is read from the output of the MCNP code and collected into the maps shown below. In each case, the map is normalized such that the sum of all its spatial elements is one.

Figure 3A:
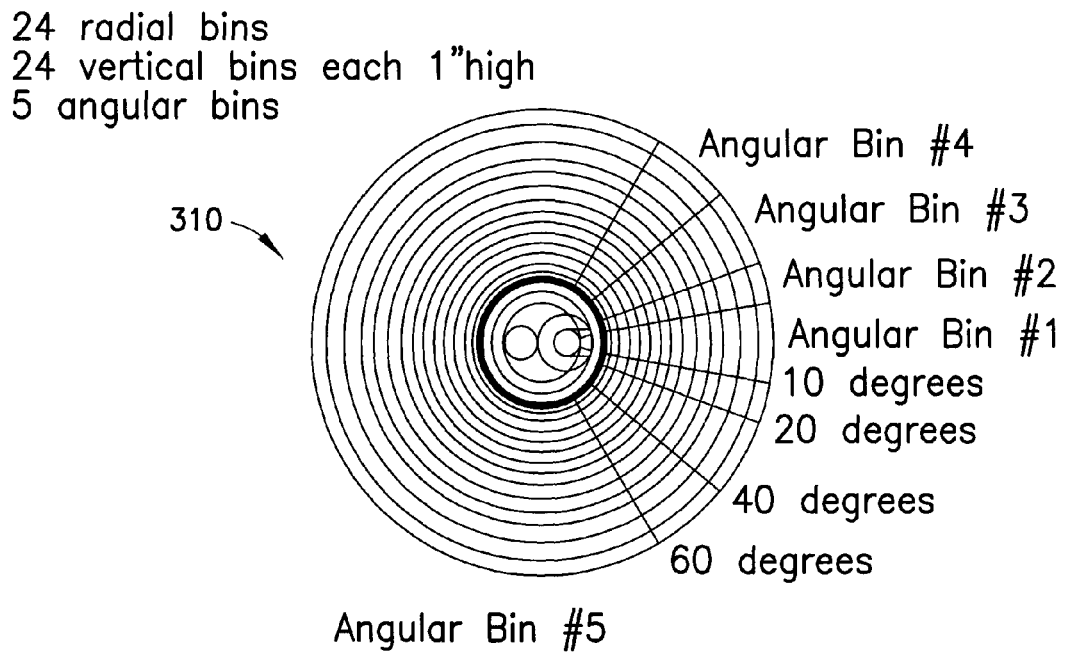
FIGS. 3a and 3b illustrate two different definitions of a spatial mesh, according to embodiments of the invention.
Figure 3B:
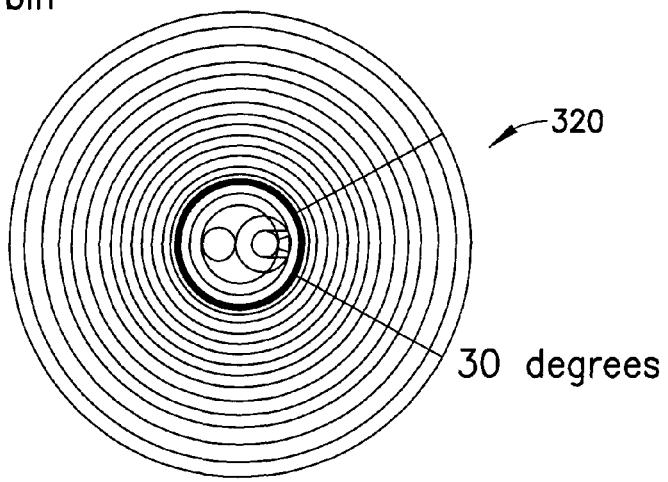

An accurate forward model preferably has maps with adequate spatial resolution. A very fine spatial mesh is expected to provide better accuracy, but it would need longer computing time both for the initial generation of the maps and for the repeated predictions of the fast forward model. As a result, the definition of cells in the three-dimensional space around the tool is important. Inner radii are more important for the density response than are deeper formation features. The mesh is therefore divided into ⅛" fine radial bins in the first 1" around the tool, surrounded by bins of increasing coarseness with radial depth. We divide the axial mesh into constant increments of 1". A basic question for the spatial mesh is whether an azimuthal dependence is even necessary; the forward model would be simpler and correspondingly faster if its calculations were reduced to only the radial and axial dimensions. To study the importance of a third dimension, $1^{st}$-order Compton sensitivity maps were generated with 5 angular bins. FIGS. 3a and 3b illustrate two different definitions of a spatial mesh, according to embodiments of the invention. FIG. 3a shows spatial mesh 310 having 5 angular bins. A spatial mesh having several azimuthal bins was used for exploratory maps. FIG. 3b shows spatial mesh 320 having only a single angular bin. A spatial mesh having a single angular bin was found to be suitable for all sensitivity maps. When applied to a linear forward model, we find that a multi-angular binning provides diminishing returns on accuracy with respect to this increased complexity.

Figure 4:
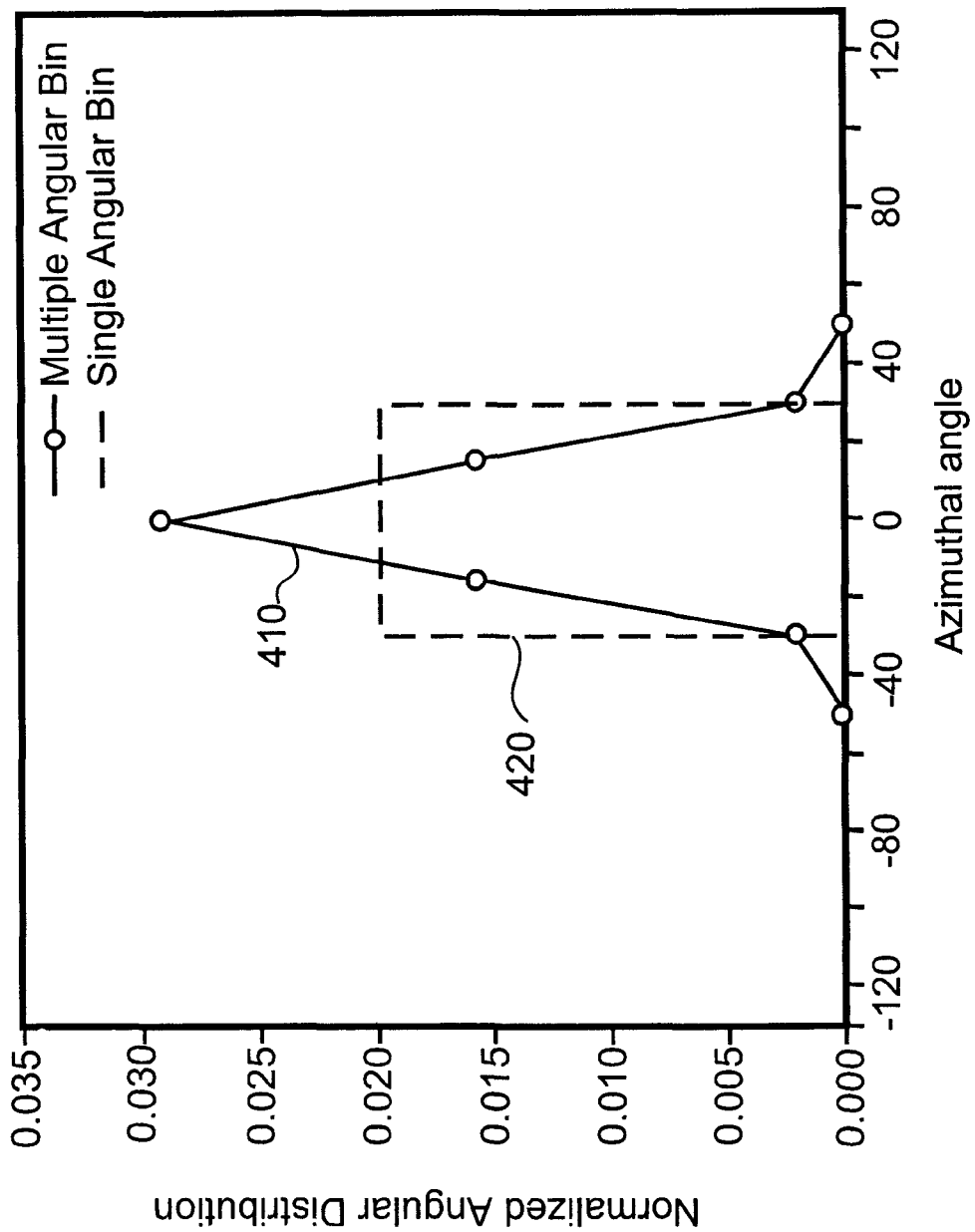
FIG. 4 is a plot illustrating azimuthal distribution of sensitivities integrated over the radial and axial dimensions.

FIG. 4 is a plot illustrating the azimuthal distribution of sensitivities integrated over the radial and axial dimensions. Curve 410 is a plot of the integrated sensitivities as a function of azimuthal angle using a spatial mesh having multiple angular bins, such as spatial mesh 310 shown in FIG. 3a. Curve 420 is a plot of the integrated sensitivities using a spatial mesh having a single azimuthal bin with a range of approximately ±30° with respect to the detector's direction of focus, such as spatial mesh 320 shown in FIG. 3b. As can be seen from FIG. 4, the single angular bin mesh provides a good approximation of the sharply peaked distribution, capturing over 95% of the integrated sensitivity. In order to maintain a simple model with good accuracy, we therefore collapse the spatial dependence of the maps into only the radial and axial dimensions, with the sensitivity calculations performed in the approximate ±30° range as depicted in FIG. 3b. To provide additional angular sensitivity, for example in modeling the response of the tool with varying orientations in a HA/HZ bed interface, we perform the forward model calculation with densities averaged over three points in this angular window.

We use the MCNP5 code to generate the six maps for the 8¼" EcoScope gamma-gamma tool from Schlumberger for the model developed as described above. These maps consist of, for each of the long-spacing (LS) and short-spacing (SS) detectors: the $1^{st}$-order Compton map, the $1^{st}$-order photoelectric map, and the $2^{nd}$-order Compton map.

Figure 5A:
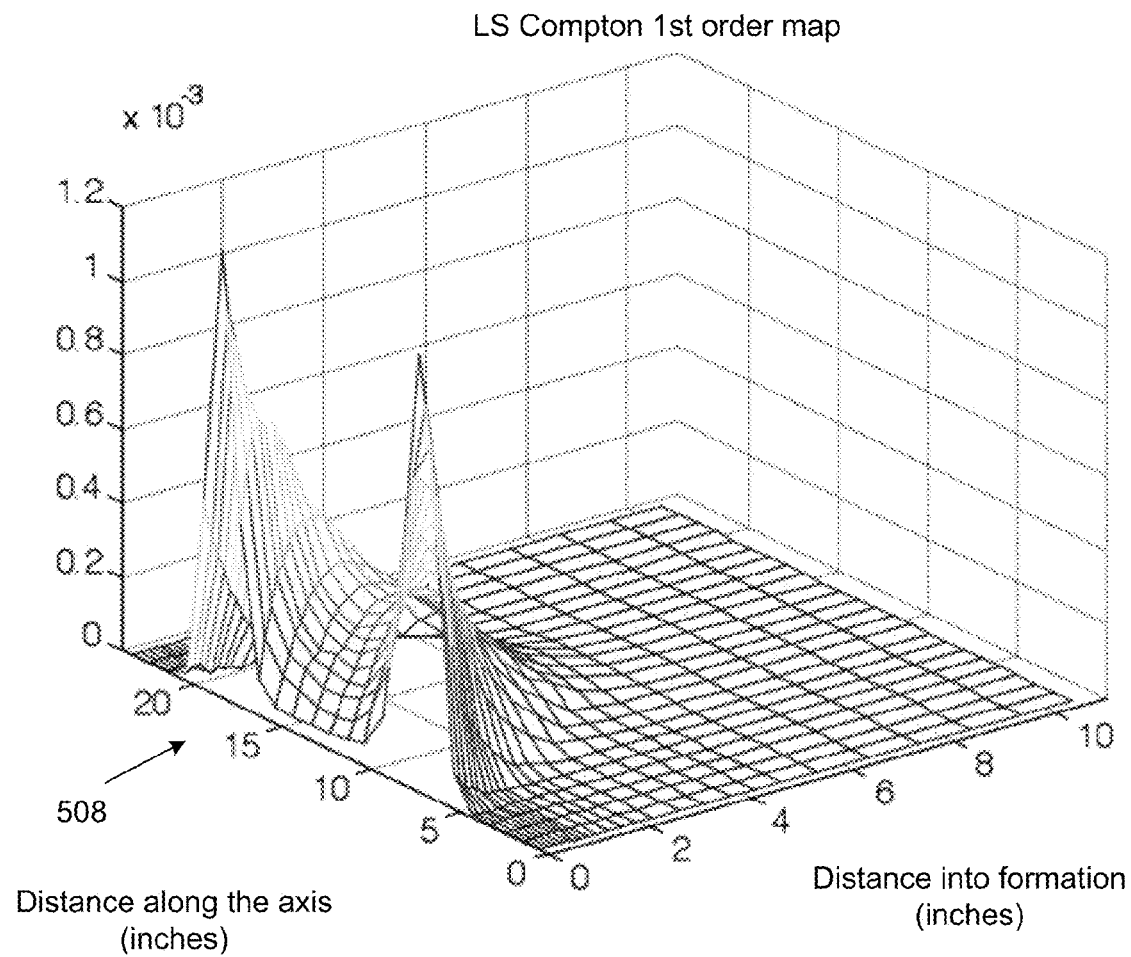
FIGS. 5a and 5b are surface plots showing $1^{st}$-order Compton sensitivity maps for Compton scattering for the LS and SS detectors, according to embodiments of the invention.
Figure 5B:
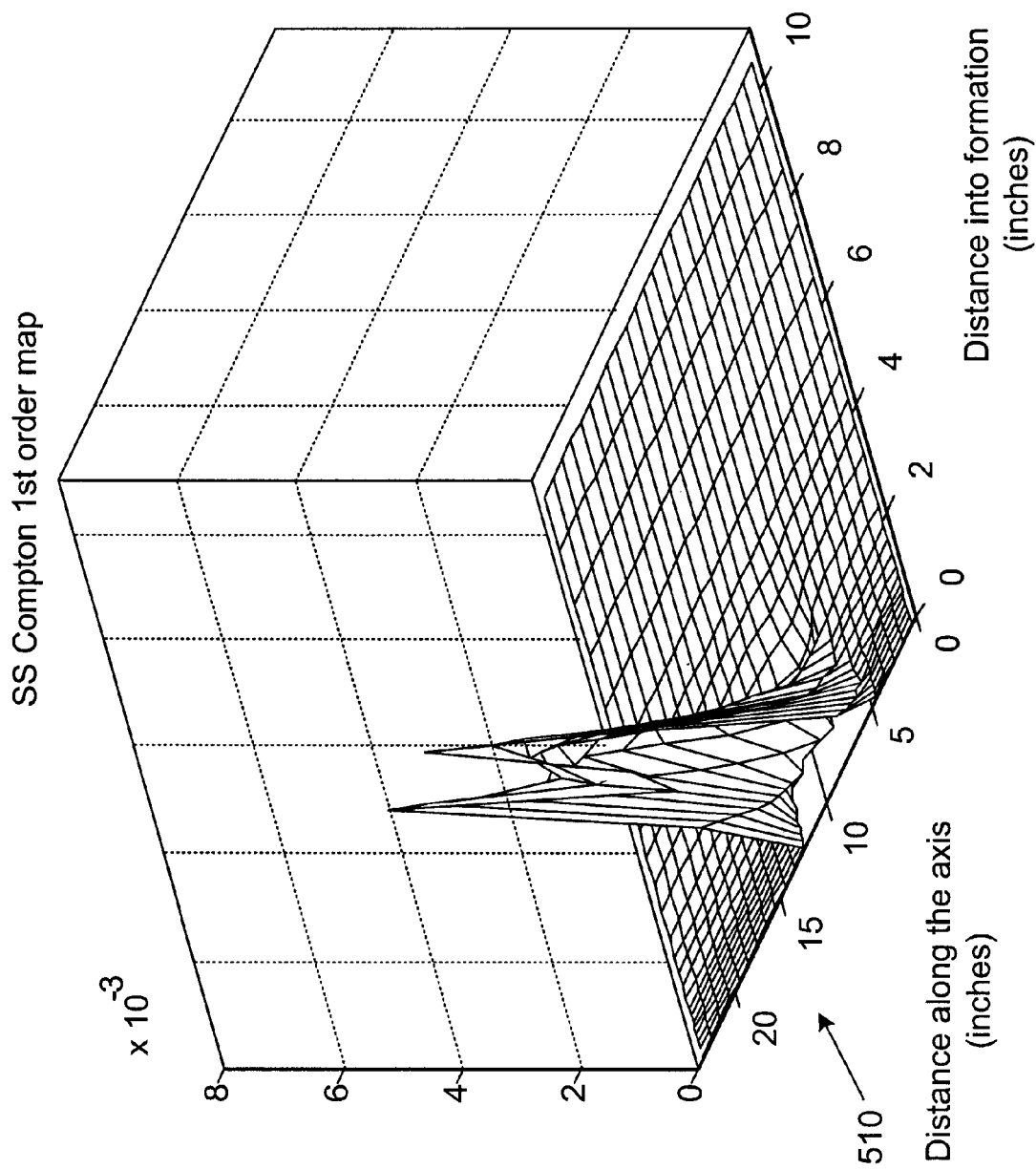
Figure 6:
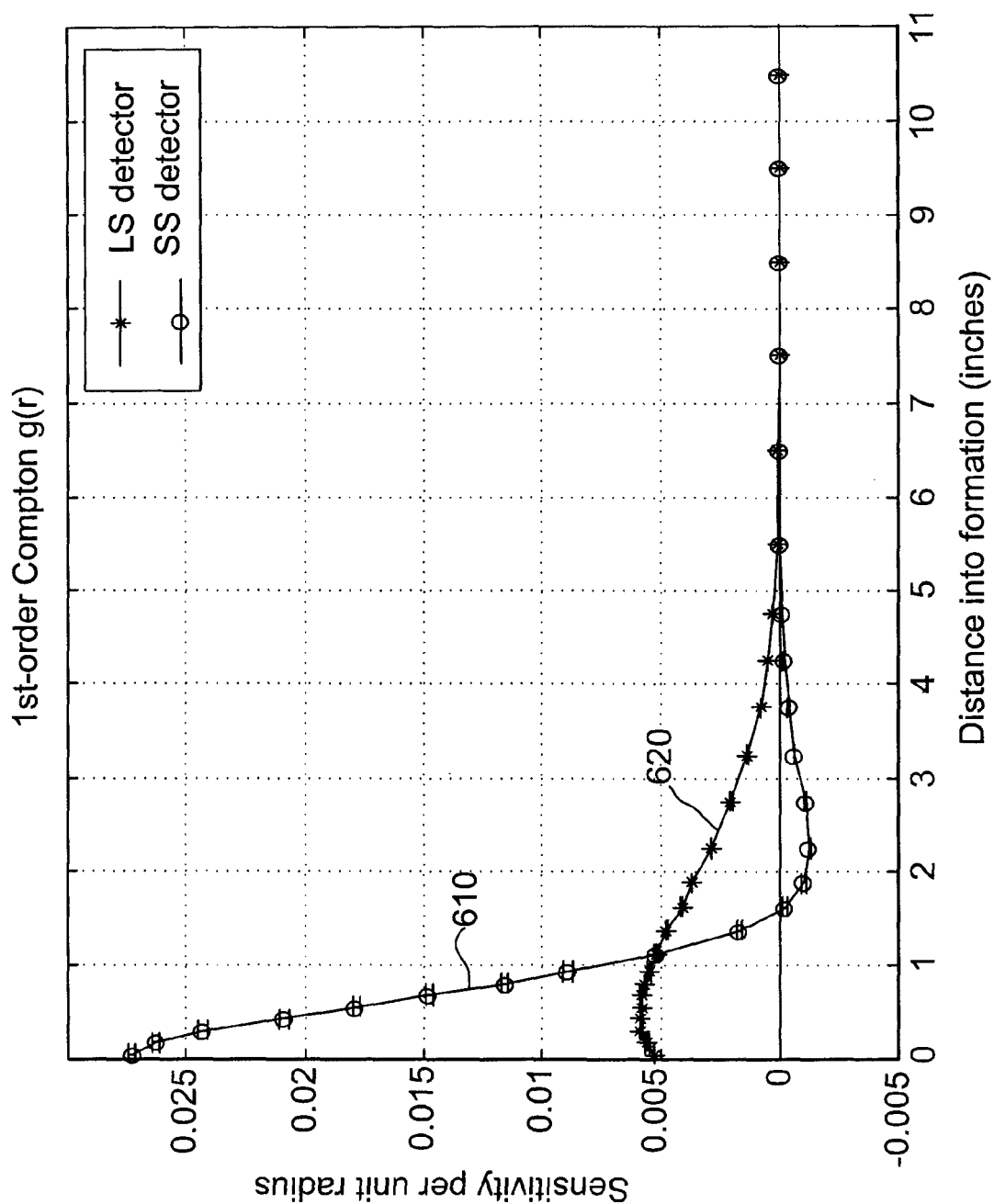
FIG. 6 plots the integrated sensitivity per unit radius of the $1^{st}$-order Compton response of the LS and SS detectors, according to embodiments of the invention.

FIGS. 5a and 5b are surface plots showing $1^{st}$-order Compton maps for long and short spacing detectors, according to embodiments of the invention. Map 508 of FIG. 5*a* is for the LS detector spacing, and map 510 of FIG. 5*b* is for the SS detector spacing. Map 510 has two dominant peaks that highlight the density sensitivity of the regions immediately in front of the source and the detector. These are the regions through which photons that register in the detector are most likely to be scattered. The peaks are spaced correspondingly closer together for the SS map 510. The radial sensitivity of the SS detector is also shallower than that of the LS map, as should be expected. A clearer picture of the radial dependence is made available by integrating the sensitivities over the tool's full axial range. We define the radial sensitivity as $$g(r) = \sum_z S(r, z), \quad (22)$$

where $S(r, z)$ can be $S_c(r, z)$ or $S_{c2}(r, z)$ or $S_\tau(r, z)$, which is overlaid for the LS and SS maps in FIG. 6. FIG. 6 plots the integrated sensitivity per unit radius of the $1^{st}$-order Compton response of the LS and SS detectors, according to embodiments of the invention. Curve 610 corresponds to the SS detector and curve 620 corresponds to the LS detector. A distinctive feature of the SS Compton map is its "negative lobe", which models the region in which the density response is anti-correlated with the density of the formation. Such a response exists due to single-scattered photons being deflected directly into the detector: as the formation density increases, more gamma rays from this region are detected, causing an decrease in the overall apparent density. In contrast, the LS response is entirely dominated by multiple-scattering and attenuation, where an increase in true density causes fewer counts to be registered and a simpler positive response. The SS detector's negative lobe is one of the most challenging features of the tool response to model.

Figure 7:
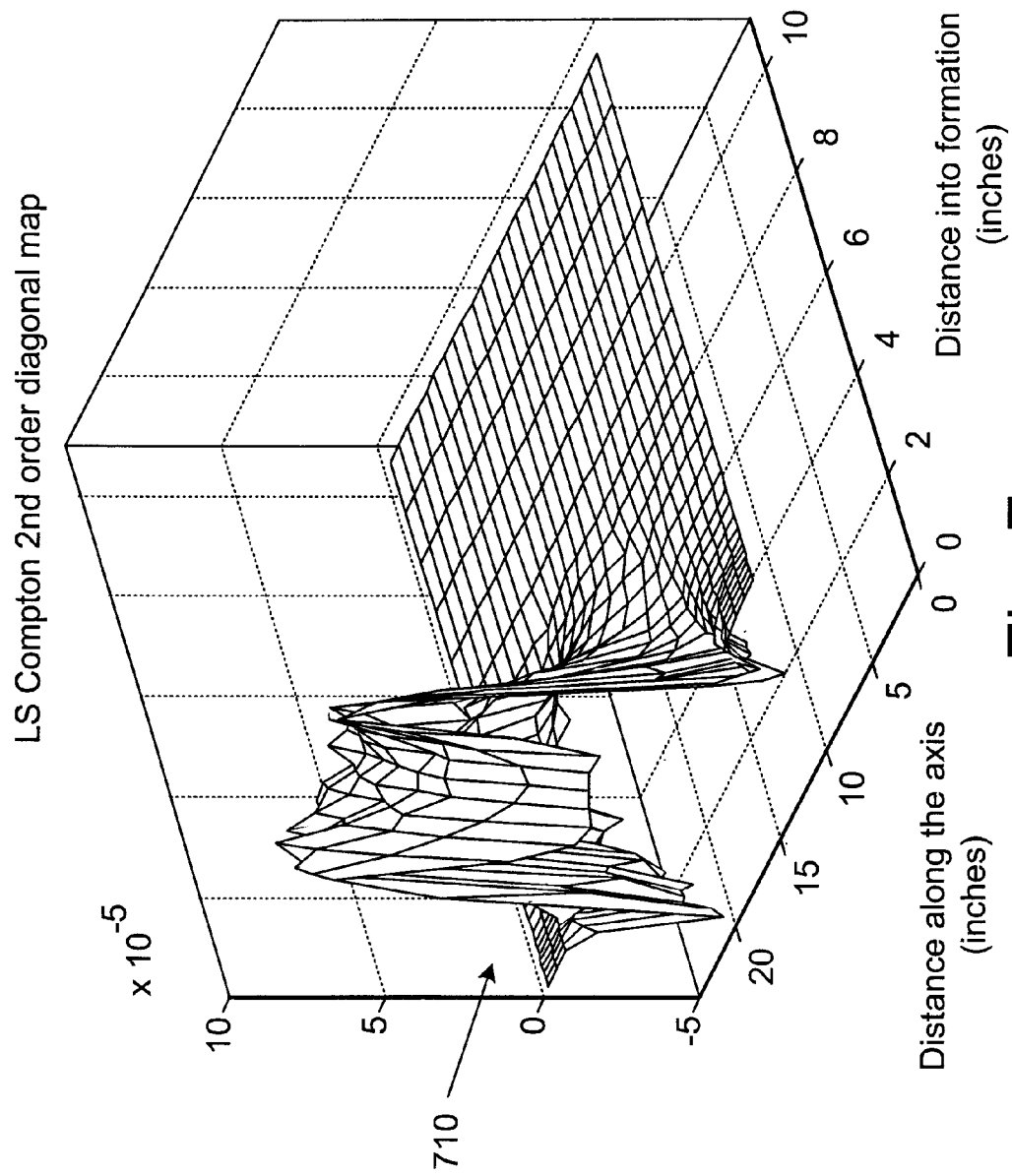
FIGS. 7-8 are surface plots showing the $2^{nd}$-order Compton sensitivity maps for the LS and SS detectors, according to embodiments of the invention.
Figure 8:
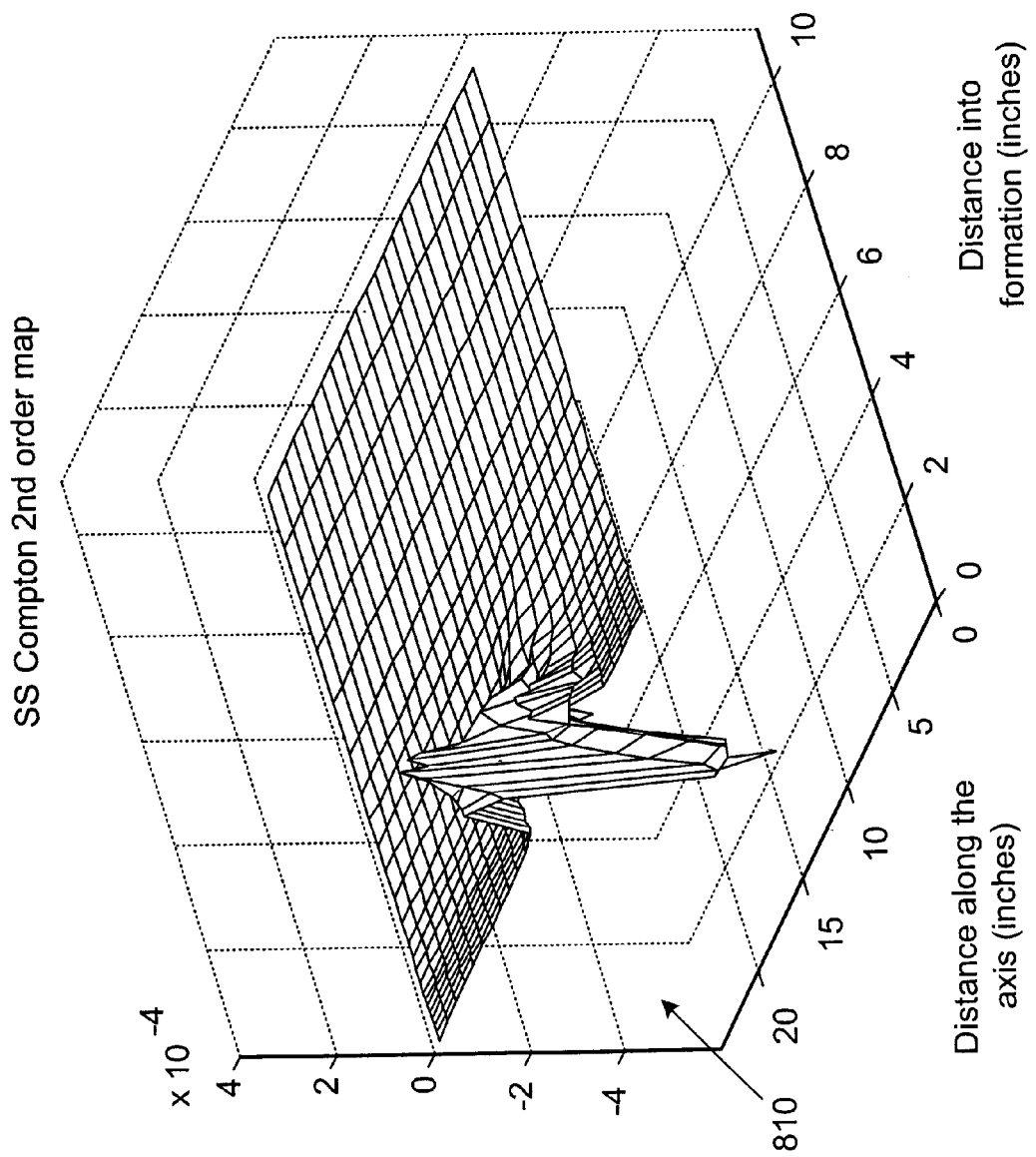
Figure 9:
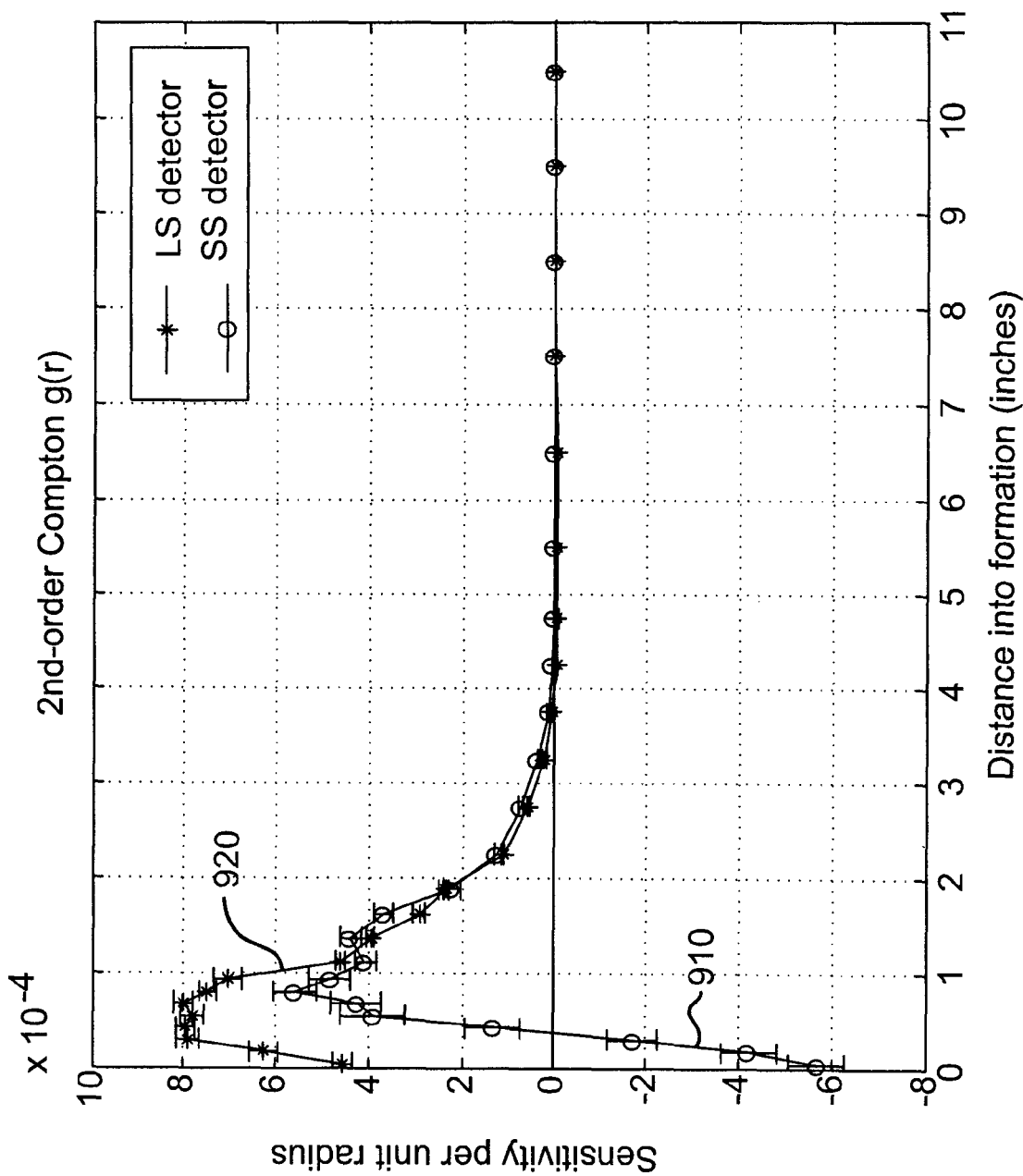
FIG. 9 plots the integrated sensitivity per unit radius for the $2^{nd}$-order Compton response of the LS and SS detectors, according to embodiments of the invention.

FIGS. 7-8 are surface plots showing the $2^{nd}$-order Compton sensitivity maps for the LS and SS detectors, according to embodiments of the invention. Sensitivity map 710 of FIG. 7 is the $2^{nd}$-order Compton sensitivity map the LS detector, and map 810 of FIG. 8 is the $2^{nd}$-order Compton sensitivity map for the SS detector. These maps are more difficult to interpret on a purely physical basis than the $1^{st}$-order dependences. In the most direct sense, the maps 710 and 810 represent the $2^{nd}$ derivative of the tool response with respect to deviations from the reference density. FIG. 9 plots the integrated sensitivity per unit radius for the $2^{nd}$-order Compton response of the LS and SS detectors, according to embodiments of the invention. Curve 910 plots the integrated sensitivity for the SS detector and curve 920 plots the integrated sensitivity for the LS detector. It can be seen from curve 910 that the $1^{st}$-order sensitivity of the SS response decreases with increasing density in the shallow-radius region, and it exhibits the opposite behavior in the deep radial region. As before, the LS curve 920 is simpler with entirely positive derivatives.

Figure 10:
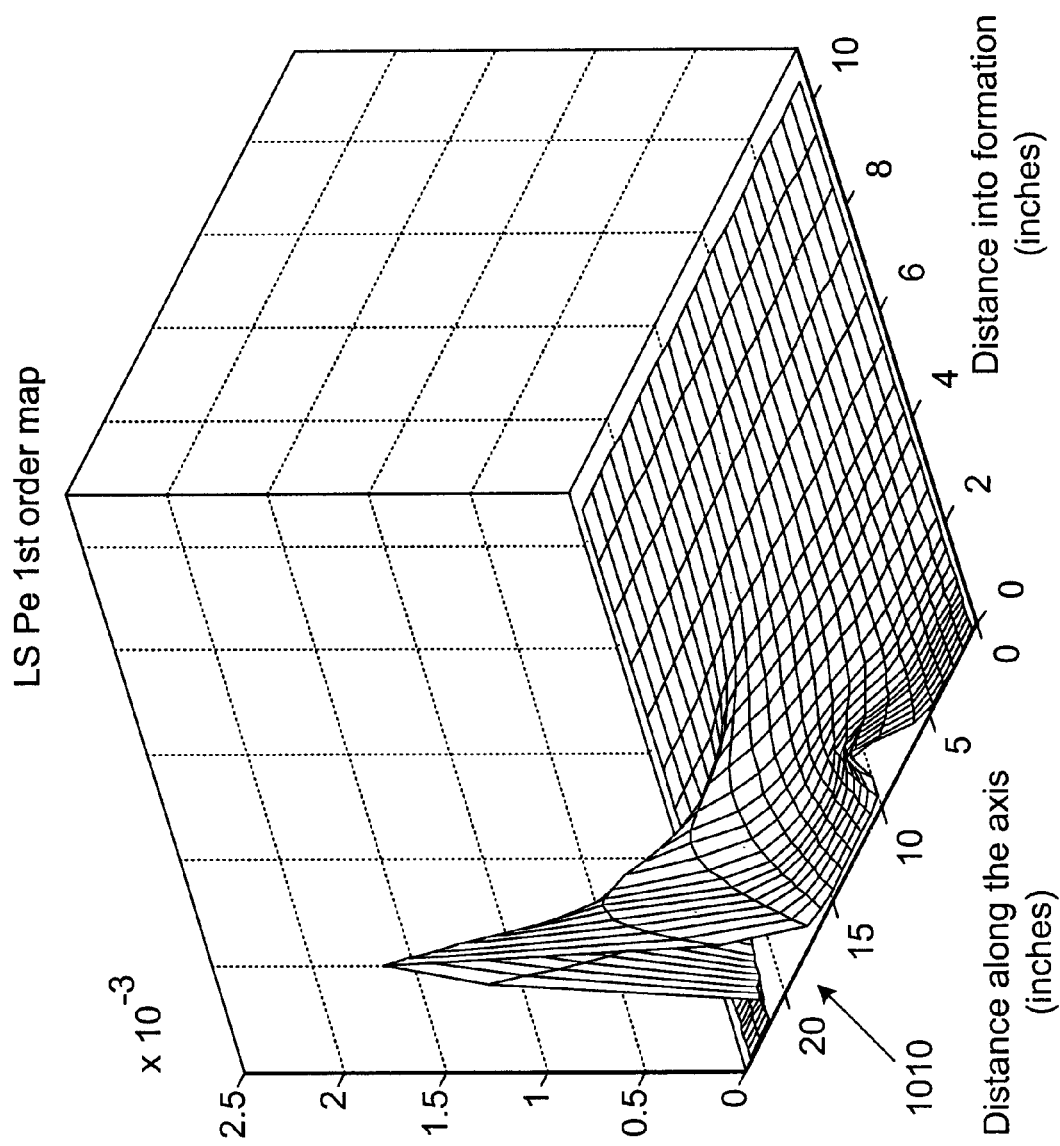
FIGS. 10 and 11 show the $1^{st}$-order photoelectric maps, according to embodiments of the invention.
Figure 11:
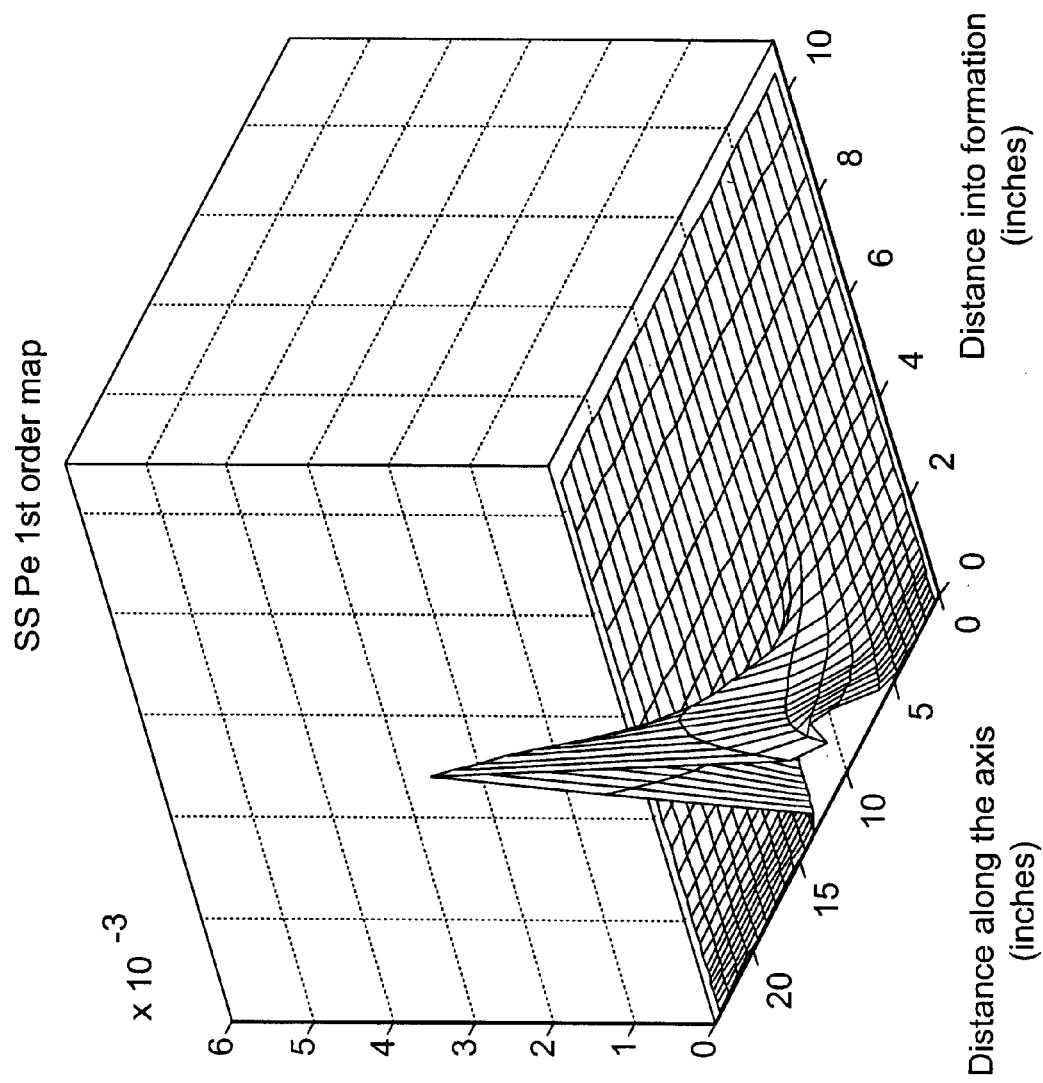
Figure 12:
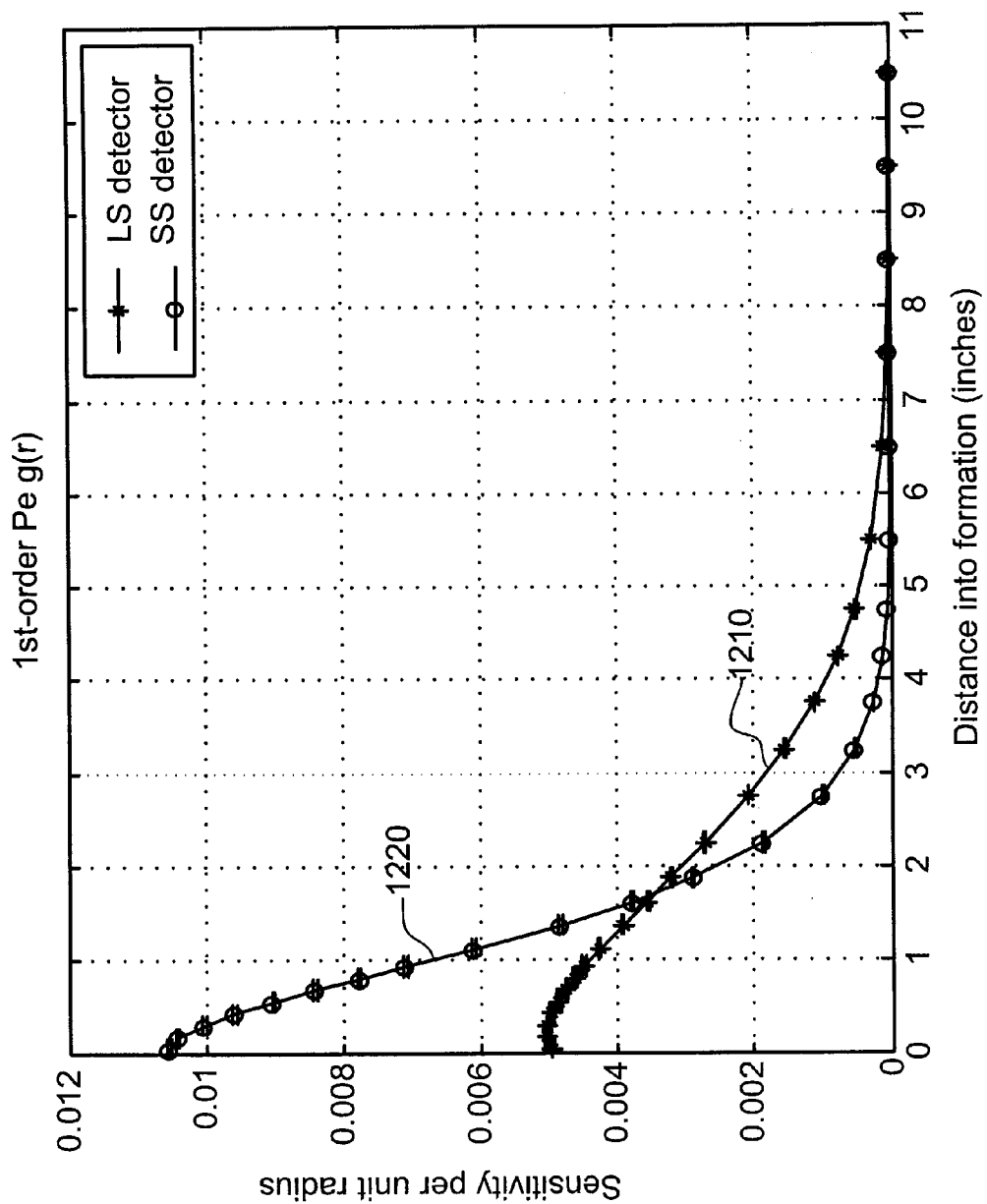
FIG. 12 is a plot showing integrated sensitivity per unit radius of the $1^{st}$ order photoelectric response of the LS and SS detectors, according to embodiments of the invention.

FIGS. 10 and 11 show the $1^{st}$-order photoelectric maps, according to embodiments of the invention. Map 1010 in FIG. 10 is the $1^{st}$-order photoelectric sensitivity map of the LS detector. Map 1110 in FIG. 11 is the $1^{st}$-order photoelectric sensitivity map of the SS detector. As can be seen from the detailed discussion below, the terms corresponding to these maps serve only as small corrections to the density response. In both cases, the sensitivities are peaked much more strongly in front of the detectors, where low-energy gamma rays may be absorbed instead of scattered. FIG. 12 is a plot showing integrated sensitivity per unit radius of the $1^{st}$ order photoelectric response of the LS and SS detectors, according to embodiments of the invention. Curve 1210 shows the integrated sensitivity for the LS detector, and curve 1220 shows the integrated sensitivity for the SS detector. The radial dependences shown in curves 1210 and 1220 indicate that the response for both detectors is always positive, with the increased probability of absorption in a high-Pe formation causing a larger apparent density. As expected, the SS detector has a shallower depth of investigation.

According to embodiments of the invention, further detail on calibration of the forward model in a database of full Monte Carlo and benchmarking of predictions in various HA/HZ well geometries will now be provided. The performance of the fast forward (FF) model is first explored in full Monte Carlo simulations from MCNP5. In contrast to available experimental databases, this approach provides the advantage that arbitrary conditions of geometry and formation materials can be explored at will. Additionally, because the sensitivity maps must be calculated using track length flux (MCNP's "Tally 4") as an approximation of detector response, the study of FF performance in the same quantity allows for separation of possible detector effects from the inherent goodness of the FF model. The agreement of MCNP simulation with experimental data is revisited later in this detailed disclosure.

First, the free parameters of the model are derived from a least-squares fit to a standard set of uniform formations and mudcakes with various standoff values. The quality of the fit is evaluated in terms of the model's accuracy in density space. We then benchmark the performance of the forward model against Monte Carlo simulations of density logs and images from high-angle/horizontal (HA/HZ) bed interfaces.

The coefficients $\{a_1, a_2, a_3, a_4, \rho_0\}$ of the forward model are derived from a Monte Carlo database of uniform formations and mudcakes chosen to cover the complete $\rho$ and Pe phase space of realistic logging environments. Table 1 shows a list of materials that can be used for the "infinite" formation and for the borehole fluid. A subset of the possible combinations is modeled with various standoff values, while other formations are used as single no-standoff points. The use of limestones as "mud" is intended to examine the performance of the FF model in HA/HZ scenarios, in which the beds appear as thin wedges in front of one another. The full set of formation/mud combinations is shown clearly in figures which will be described later.

TABLE 1

|  | Density g/cc | Electron Density g/cc | Pef |
| --- | --- | --- | --- |
| Formation materials |  |  |  |
| Water | 1 | 1.1101 | 0.36 |
| Delrin | 1.41 | 1.5026 | 0.28 |
| Magnesium | 1.78 | 1.7529 | 2.5 |
| sandstone 30 pu | 2.1578 | 2.1881 | 1.59 |
| limestone 30 pu | 2.197 | 2.2283 | 4.38 |
| sandstone | 2.654 | 2.65 | 1.81 |
| limestone | 2.71 | 2.7075 | 5.08 |
| dolomite | 2.87 | 2.8634 | 3.14 |
| Anhydrite | 2.96 | 2.9568 | 5.05 |
| Diabase | 3.0536 | 3.0263 | 4.4 |
| Light mud | 1.1588 | 1.258 | 0.65 |
| Barite mud (12 lb/gal) | 1.438 | 1.4726 | 91.45 |
| Barite mud (16 lb/gal) | 1.9173 | 1.8693 | 150.65 |
| Borehole Fluid |  |  |  |

TABLE 1-continued

|  | Density g/cc | Electron Density g/cc | Pef |
|---|---|---|---|
| Fresh water | 1 | 1.1101 | 0.36 |
| Light mud | 1.1588 | 1.258 | 0.65 |
| Barite mud (12 lb/gal) | 1.438 | 1.4726 | 91.45 |
| Barite mud (16 lb/gal) | 1.9173 | 1.8693 | 150.65 |
| 0 pu Limestone | 2.71 | 2.7075 | 5.08 |
| 40 pu Limestone | 2.026 | 2.0686 | 4.07 |

The analysis is performed in electron-density-space, and we use a simple spine-and-ribs algorithm to convert the MCNP track length fluxes to apparent densities in the long-spacing (LS) and short-spacing (SS) detectors. The algorithm uses flux tallied in an energy window with range [150, 300] keV for the long-spacing detector and [200, 300] keV for the short-spacing detector. The relative statistical uncertainties of the MCNP calculations are less than 0.3% for LS flux and less than 1.0% for SS flux.

Figure 13A:
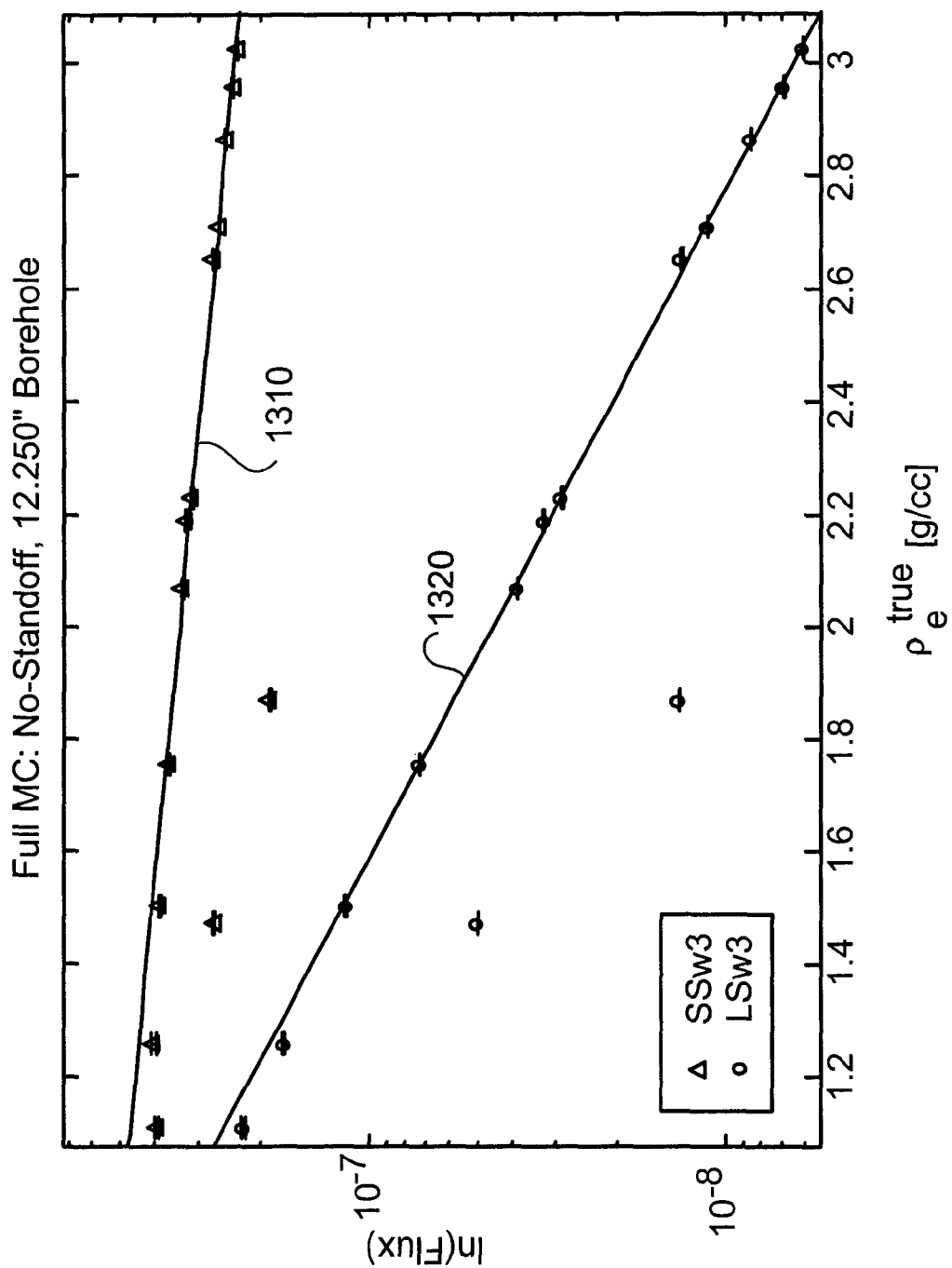
FIGS. 13a-b are plots showing the fits of detector flux to density for no-standoff configurations and the Δρ compensation for the presence of standoff, according to embodiments of the invention.
Figure 13B:
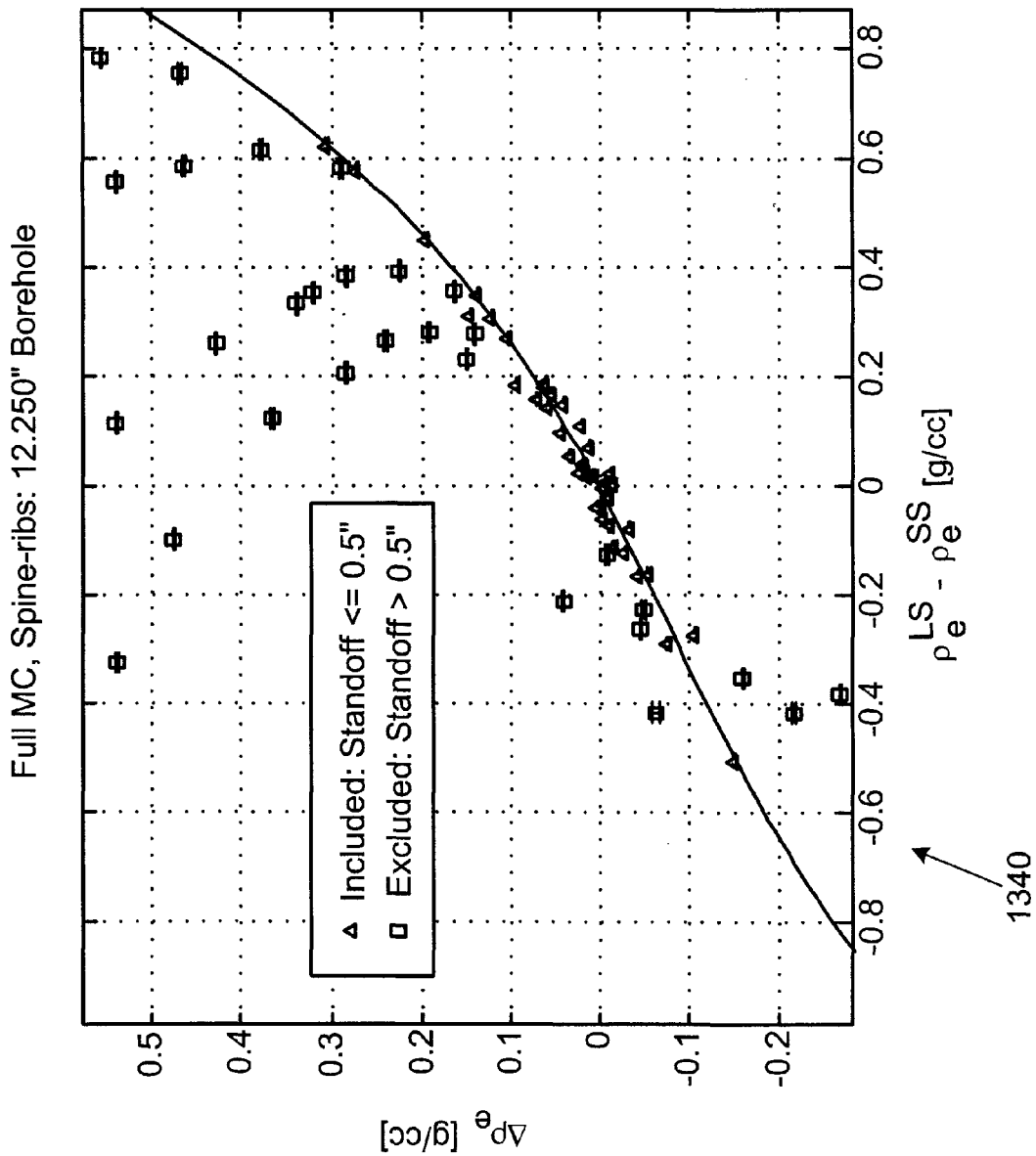

FIGS. 13a-b are plots showing the fits of flux to density for no-standoff configurations and the $\Delta\rho$ compensation for the presence of standoff, according to embodiments of the invention. FIG. 13a shows the no-standoff "spine" for the two detectors, where the fit excludes the non-linear points below $\rho_e^{true}=1.6$ g/cc and the solid formations of high-Pe Barite mud lying far from the curves. Curves 1310, 1320 in FIG. 13a are the spines. FIG. 13b, chart 1340 shows the cubic polynomial for $\Delta\rho$ compensation, fitted for standoffs through ½". The error bars represent the MCNP statistical uncertainties.

The nominal sensitivity maps described above are calculated in MCNP as perturbations with respect to a reference formation of 40 pu limestone. This material is chosen as the reference for its roughly central position ($\rho_e=2.0686$ g/cc, $U=\rho_e \cdot Pe=8.4192$ g/cc) in the desired measurement space. However, experience with applying the FF model across this relatively wide range has shown that the overall accuracy of the model is improved by a minor one-time adjustment to the radial dependence of the $1^{st}$-order Compton maps.

The use of such a modification remains consistent with the underlying theory of the FF model: the $1^{st}$-order Taylor approximation is valid only for small variations from the reference point in a non-linear system, while the $2^{nd}$-order expansion increases the model's range of accuracy and accounts for some of the non-linearity of the detector response. Nevertheless, some of the most important logging environments have large differences in density within the sensitive geometry (e.g. water standoff in front of a limestone formation), which pushes the limits of the perturbation calculation. The map adjustment serves to improve the FF model performance in such important cases while preserving acceptable accuracy in less challenging ones. Because the $1^{st}$-order Compton map dominates the response of both detectors, the $1^{st}$-order photoelectric and $2^{nd}$-order Compton maps do not receive this fine-tuning.

For both the LS and SS maps, the weights of the first several radial elements are scaled by a vector of constant factors and the overall map is renormalized to unity. The radial modification is applied in the same way along the entire axial direction, and the axial dependence of the maps is assumed to be correct and remains unmodified. This treatment is qualitatively similar to the procedure described in earlier efforts at forward modeling. The modification to maps may vary when applying the FF model to other gamma-gamma density tools.

Figure 14A:
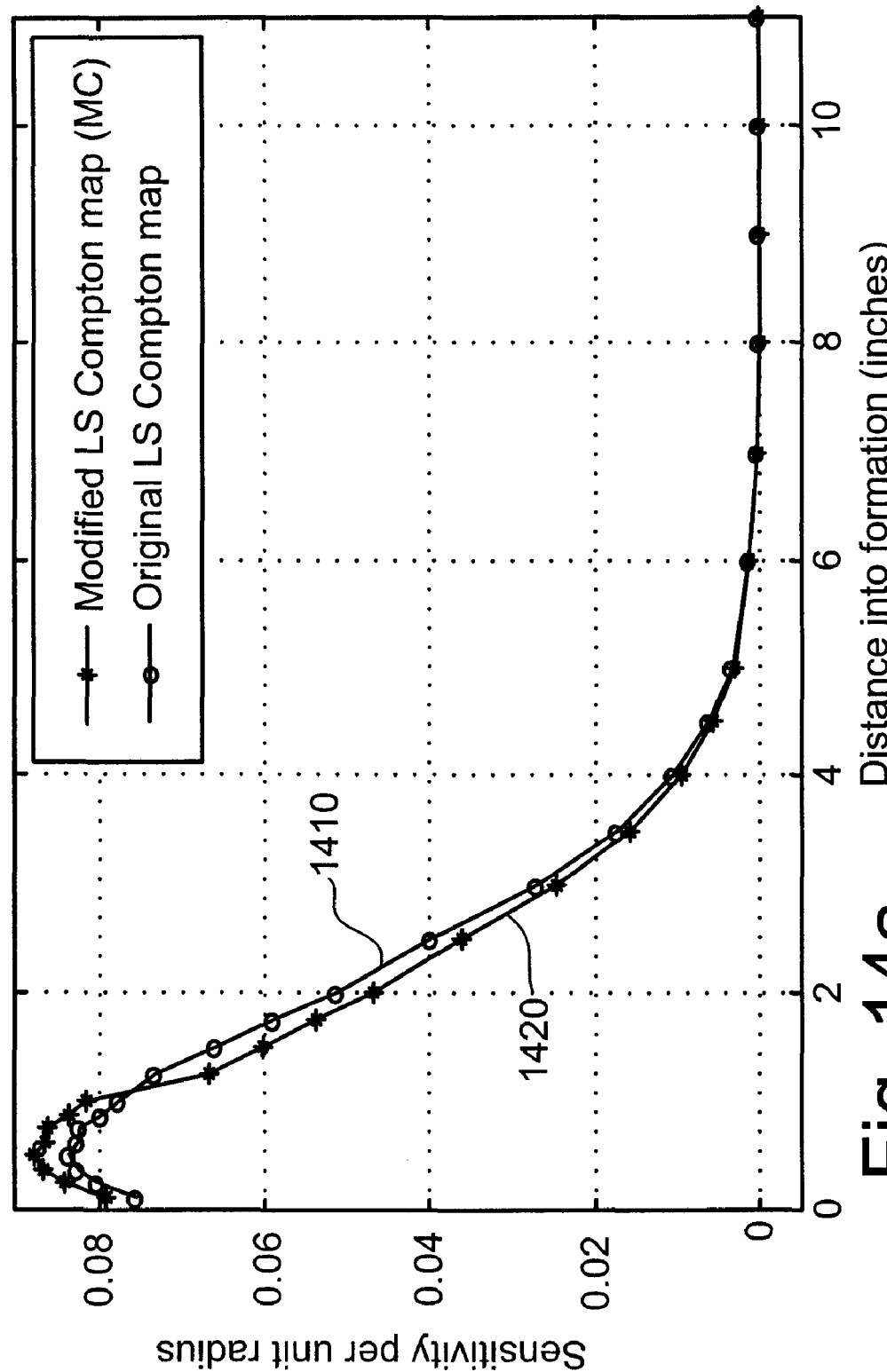
FIGS. 14a-b and 15a-b are plots showing the results of modifying the LS and SS maps, according to embodiments of the invention.
Figure 14B:
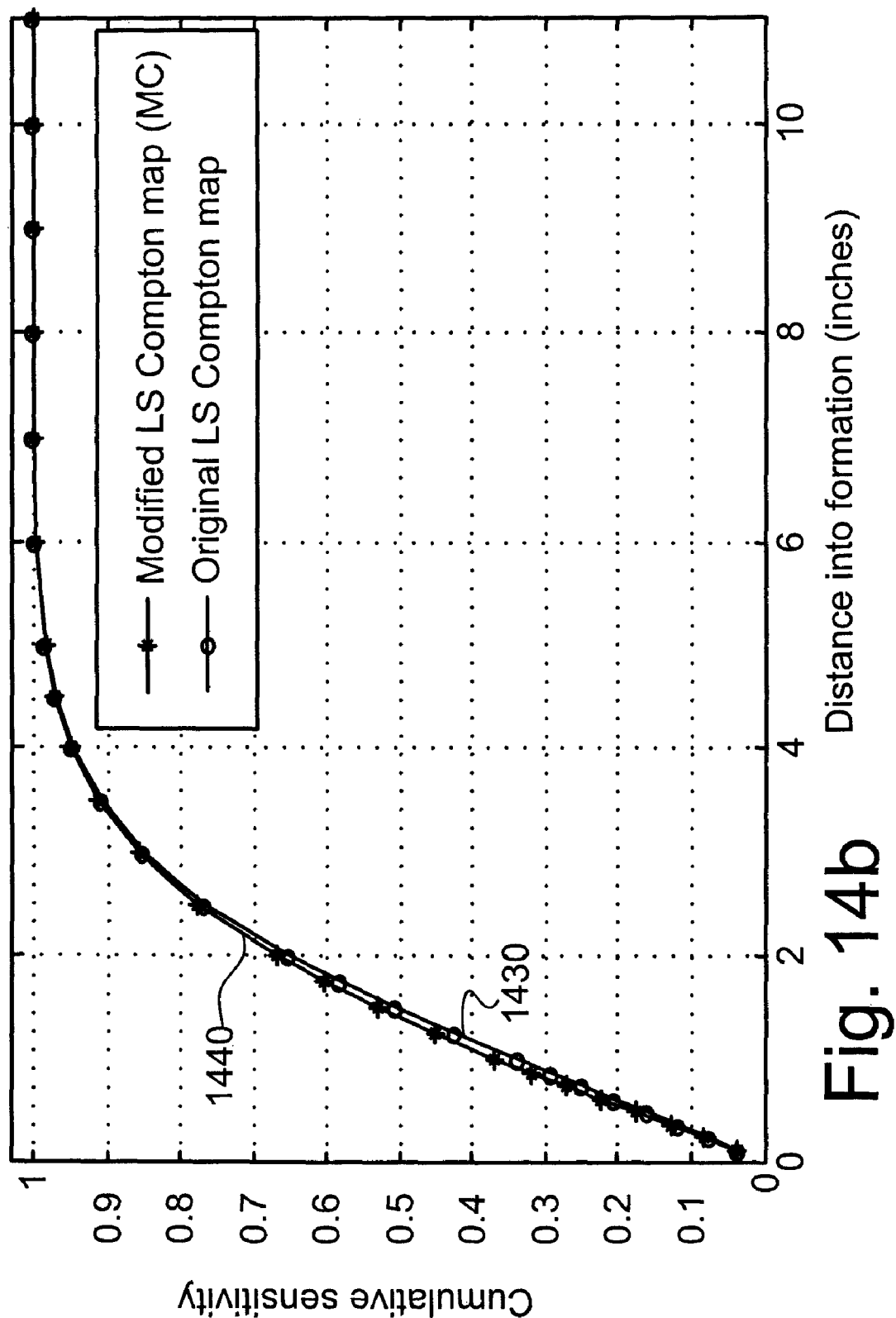

FIGS. 14a-b and 15a-b are plots showing the results of modifying the $1^{st}$-order LS and SS Compton maps, according to embodiments of the invention. In FIG. 14a, the sensitivity per unit radius (integrated over the axial direction) is shown with curve 1410 representing the original LS Compton map, and curve 1420 representing the modified LS Compton map. In FIG. 14b, the cumulative radial sensitivity is shown with curve 1430 representing the original LS Compton map, and curve 1440 representing the modified LS Compton map. For the LS map, we scale the first 8 radial elements along the entire axial direction by 1.15 and renormalize the overall map. This adjustment increases the importance of the first 1.0 radial inch in the predicted apparent LS density.

Figure 15A:
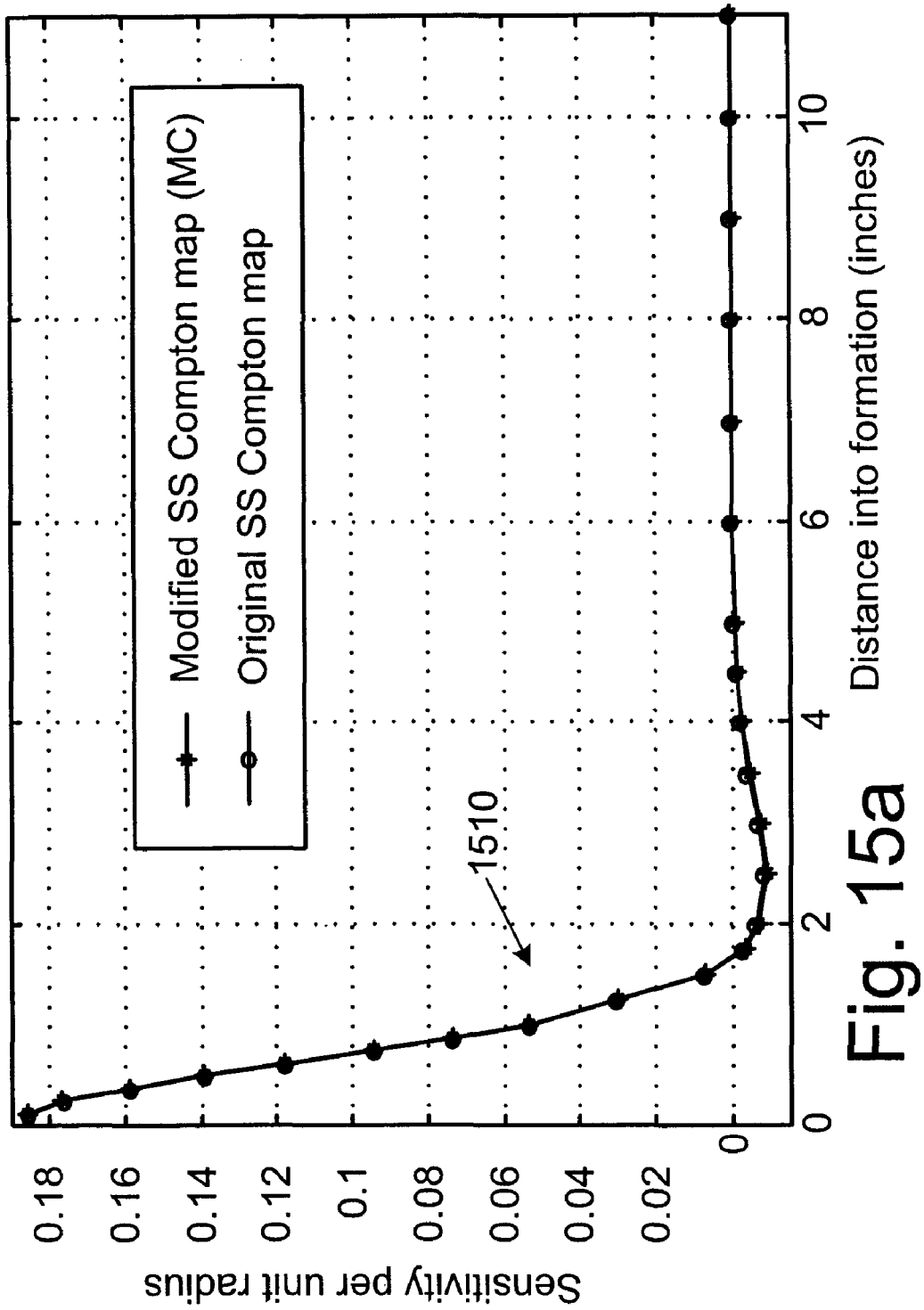
Figure 15B:
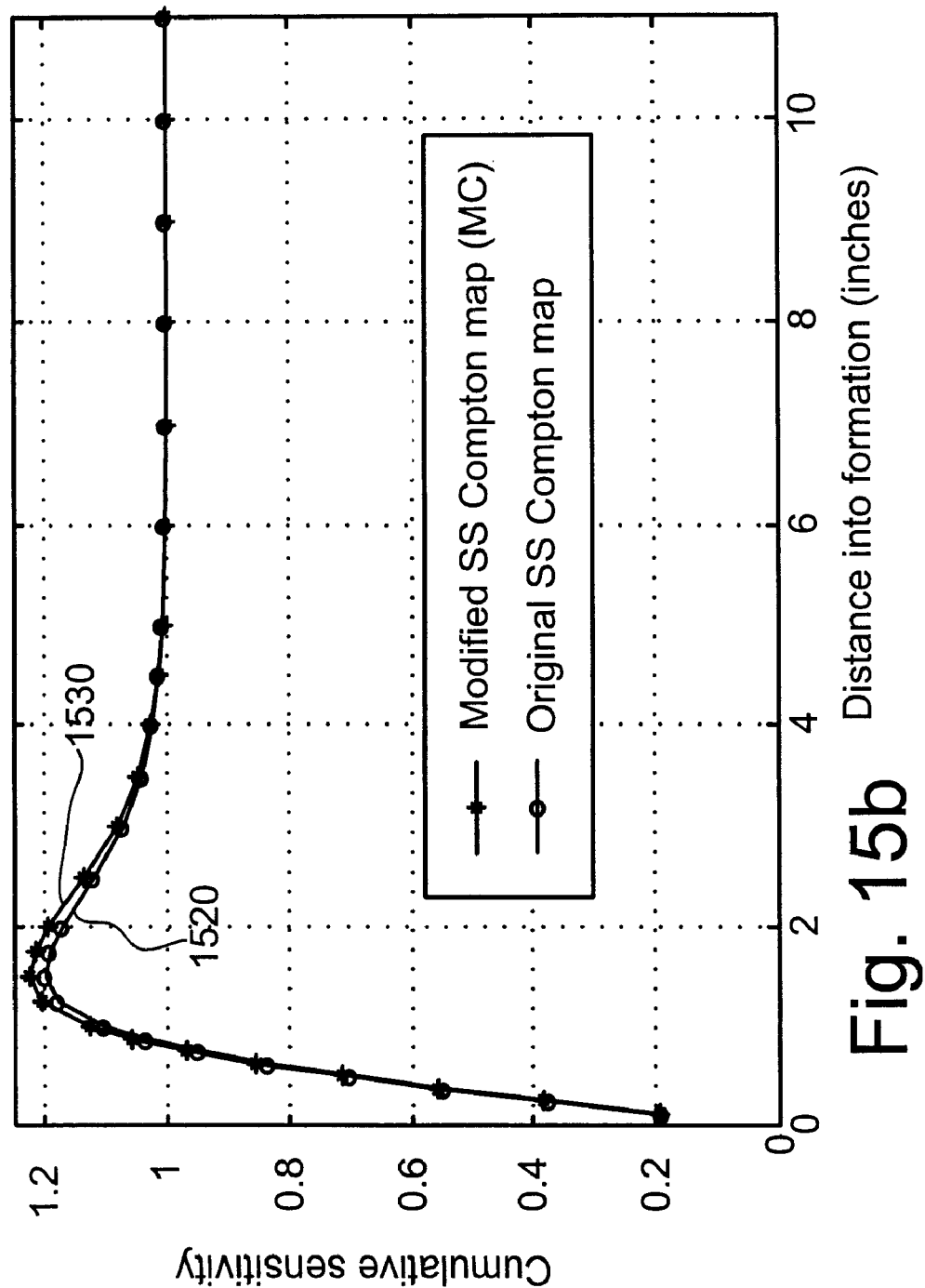

In FIG. 15a, the curves 1510 the sensitivity per unit radius (integrated over the axial direction) for both the original and modified $1^{st}$-order SS Compton map. In FIG. 15b the cumulative radial sensitivity is shown with curve 1520 representing the original SS Compton map and curve 1530 representing the modified SS Compton map. For the SS map, which consists of both positive and negative values, we scale all positive elements by 0.9 and renormalize the map. This modification in the first 1.5 radial inches serves to accentuate the presence of the negative lobe, thus increasing the importance of single back-scattered photons for the SS response. In practice, the derivation of these adjustments is iterative and empirical; the FF model with unmodified maps is fitted in the database, followed by incremental map modifications, followed by further parameter fits, etc., until acceptable accuracy is achieved.

The coefficients of the FF model are derived from a least-squares fit to Monte Carlo data points with standoff up to 1.5". Optimizing the model for this data range allows a compromise between accuracy in deep standoff while maintaining excellent performance with little to no standoff, which is the dominant configuration of the LWD environment.

Table 2 lists the fitted coefficients of the FF model. Of note is that for both detectors, the $1^{st}$-order Compton term is dominant while the $1^{st}$-order photoelectric contribution is treated as a small correction. In the SS model, the complexity of its attenuation and single-scattering contributions makes the $2^{nd}$-order sensitivity of the individual elements ($a_4$) much more important than for the LS detector. In both models, the fit prefers a relatively small value for the $a_3$ coefficient of the cross-terms; this may be interpreted as evidence that the correlation of the density sensitivities is weak, or possibly that the assumption of a completely separable detector response is flawed. In either case, the accuracy of the forward model is shown below to be good, which supports the existing structure.

TABLE 2

| FF coeff. | LS | SS |
|---|---|---|
| $a_1$ | 0.9510 ± 0.0037 | 0.7932 ± 0.0100 |
| $a_2$ | 0.0029 ± 0.0001 | 0.0066 ± 0.0001 |
| $a_3$ | 0.0877 ± 0.0121 | −0.0197 ± 0.0142 |
| $a_4$ | −0.0409 ± 0.0122 | 0.2375 ± 0.0213 |
| $r_0$ | 2.0746 ± 0.0032 | 2.0792 ± 0.0077 |

Figure 16A:
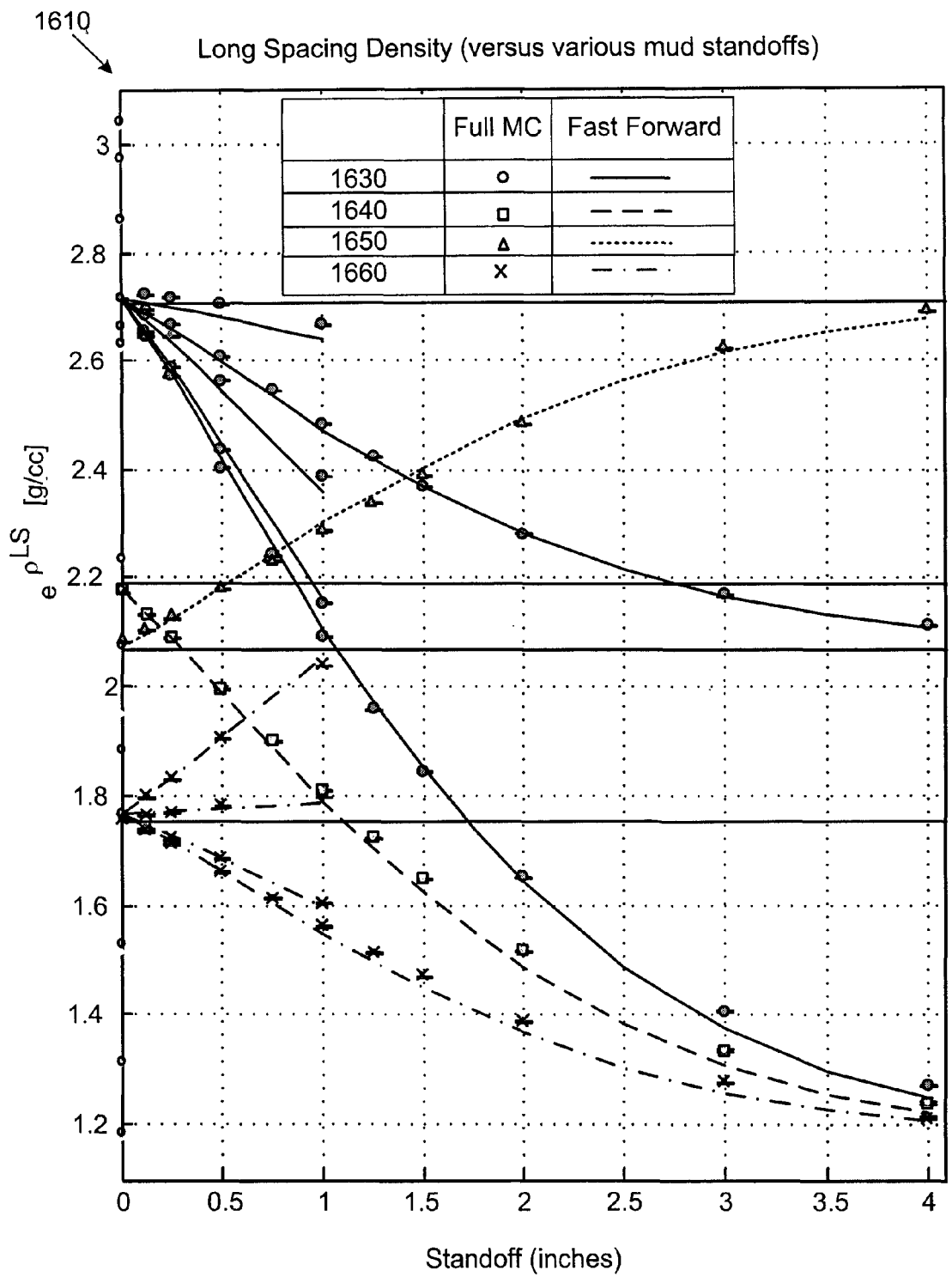
FIGS. 16a-b are fan charts comparing the calibrated Fast Forward (FF) model predictions to the MCNP-calculated densities for the two detectors, according to embodiments of the invention.
Figure 16B:
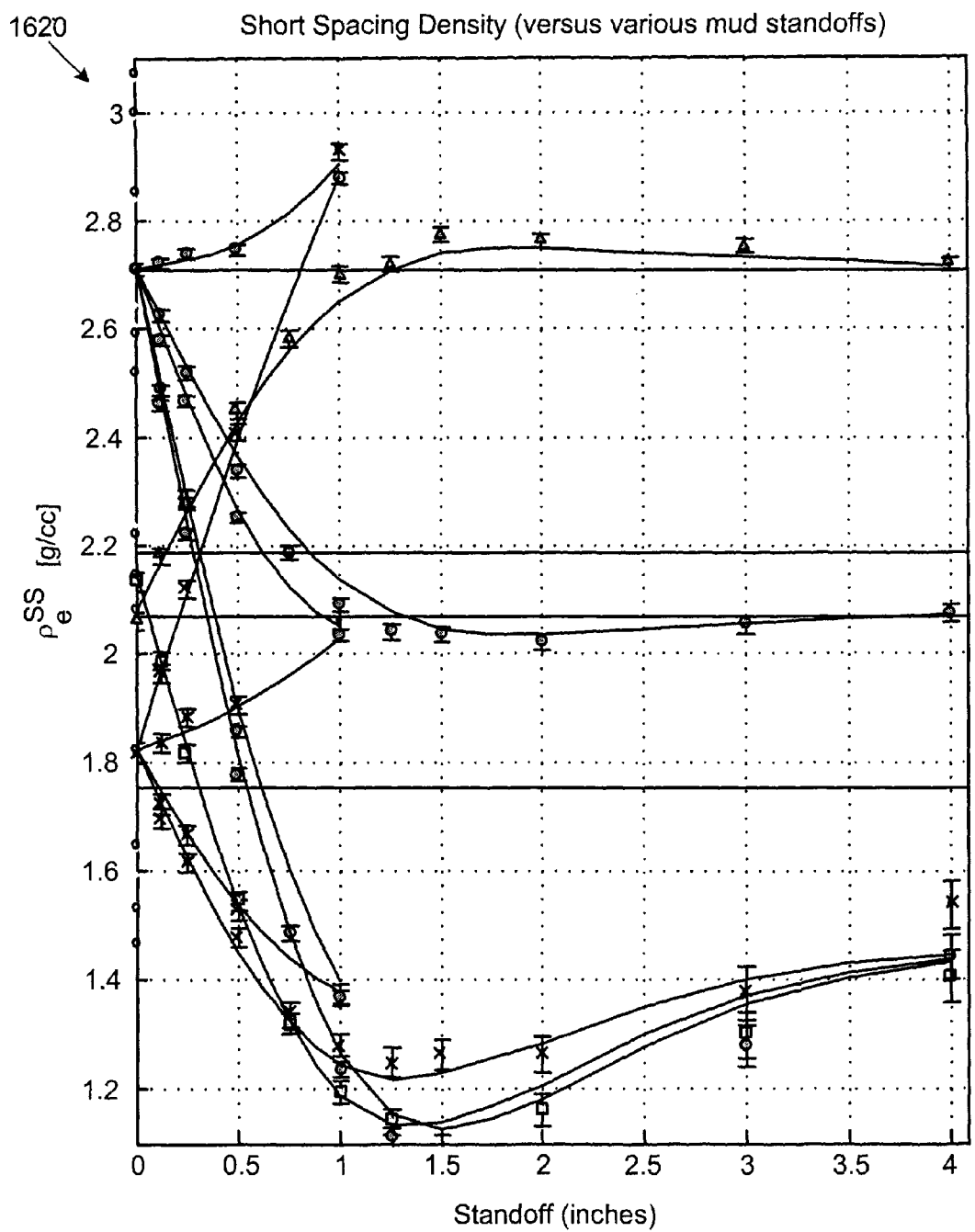

FIGS. 16a-b are fan charts comparing the calibrated FF model predictions to the MCNP-calculated densities for the two detectors, according to embodiments of the invention. In FIG. 16a, charts 1610 plot apparent long spacing density against standoff for a variety of formation materials and muds. An inset chart in FIG. 16a indicates the various conditions represented in the fan charts of FIGS. 16a and 16b. The circles and solid lines, in case 1630 represent limestone with the muds of Table 1. The squares and broken lines, in case 1640, represent 30 pu sandstone with water standoff. The triangles and dotted lines, in case 1650, represent 40 pu limestone with 0 pu limestone "mud." The x-marks and broken-dotted lines, in case 1660, represent magnesium with various muds. In FIG. 16*b*, charts 1620 plot apparent short spacing density against standoff for a variety of formation materials and muds. In both of these charts, the extreme 4" standoff range is used to explore the deep performance of the forward model, but the critical regime of interest is under 1" of standoff. The deepest curves are for fresh water mud, which converge toward a common apparent density, and for the limestone standoff which is used to investigate how the model will perform with wedges of a HA/HZ bed interface. The simple monotonic behavior of the LS response is due to its being dominated by attenuation of multiply-scattered photons, while the effect of single-scattering in the SS response is especially clear in the water curves near 1.5" of standoff.

Figure 17A:
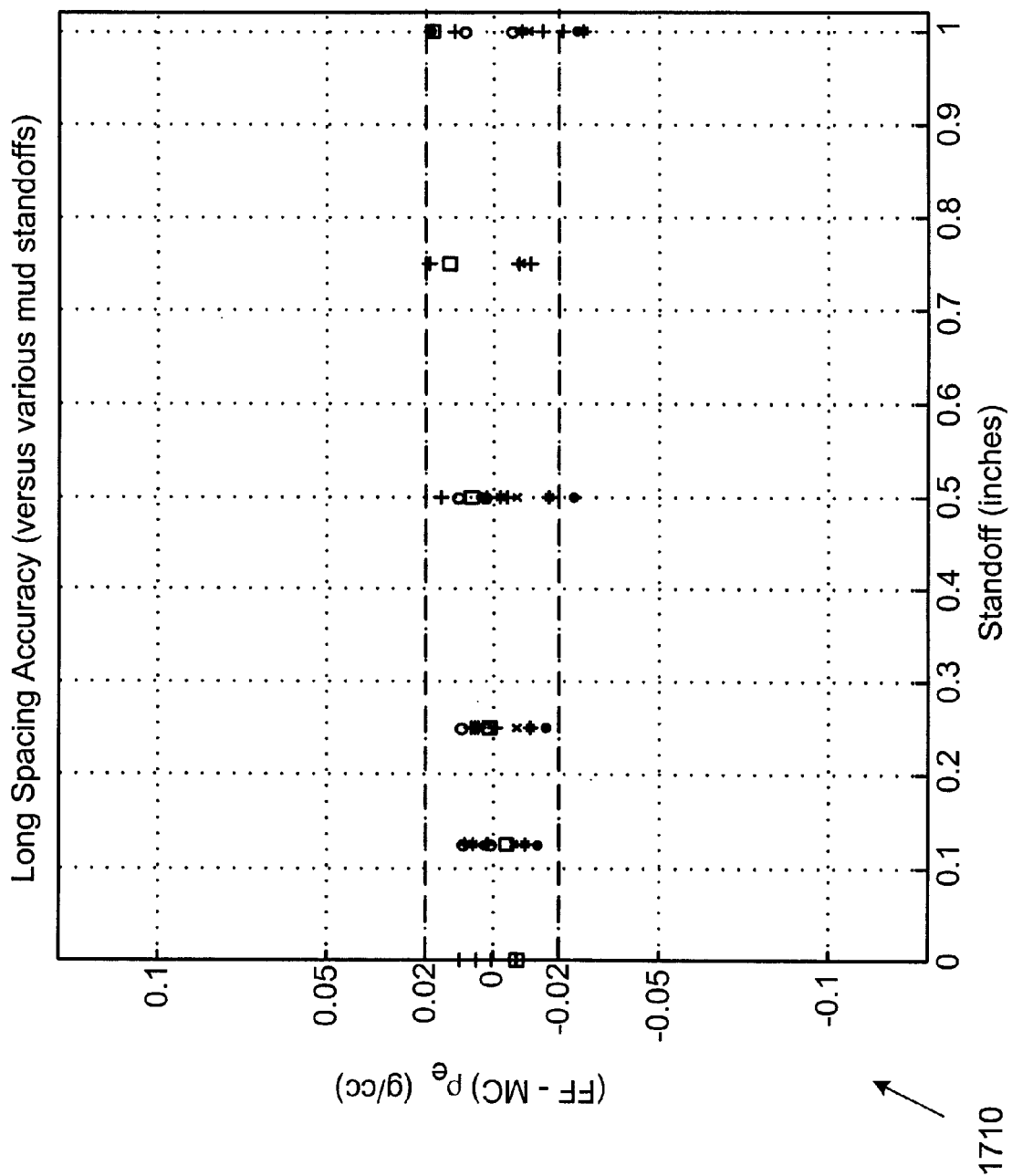
FIGS. 17a-c are plots summarizing the accuracy of the FF model, according to embodiments of the invention, taken simply as its residuals with respect to the MCNP densities in the fan charts shown in FIGS. 16a-b.
Figure 17B:
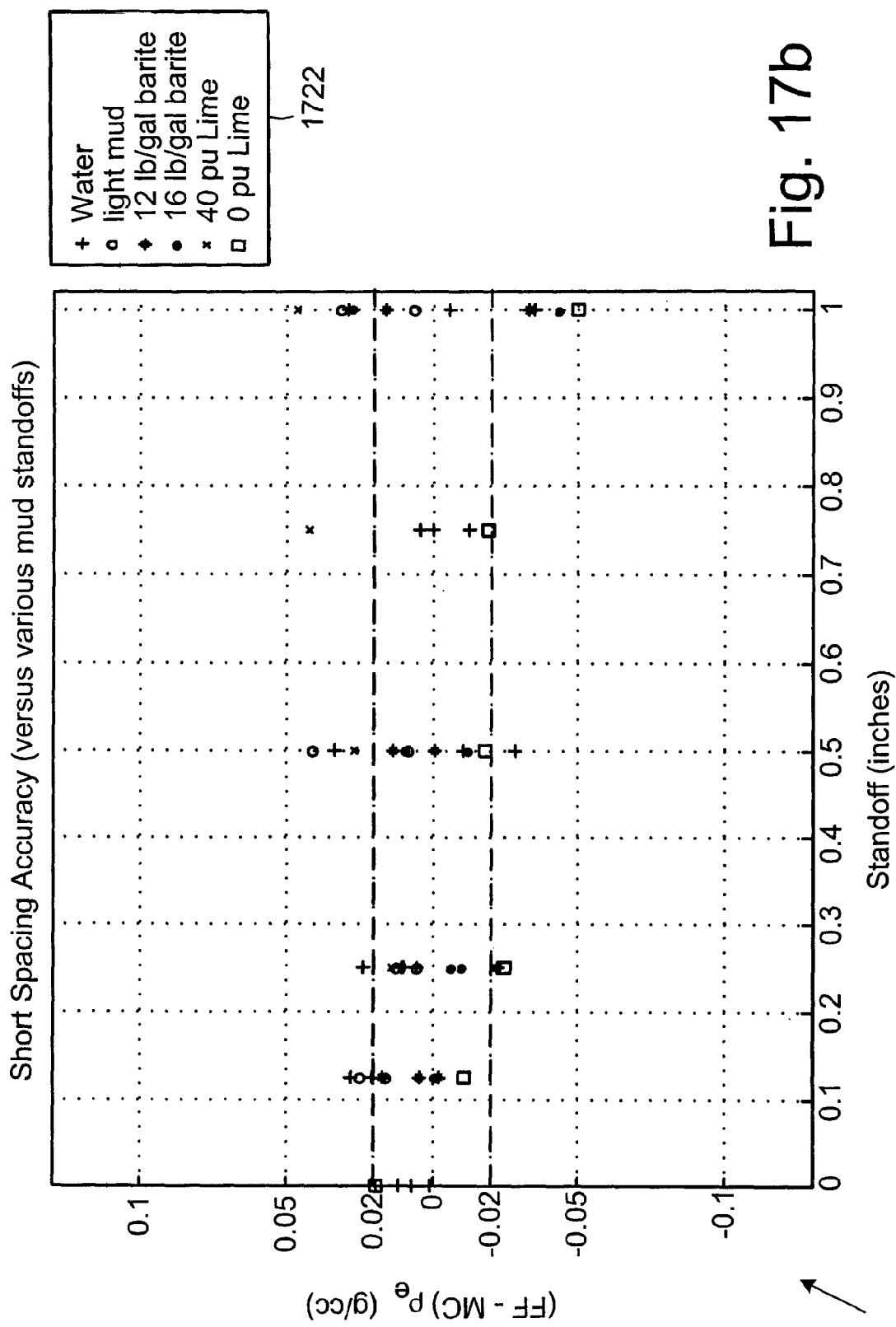
Figure 17C:
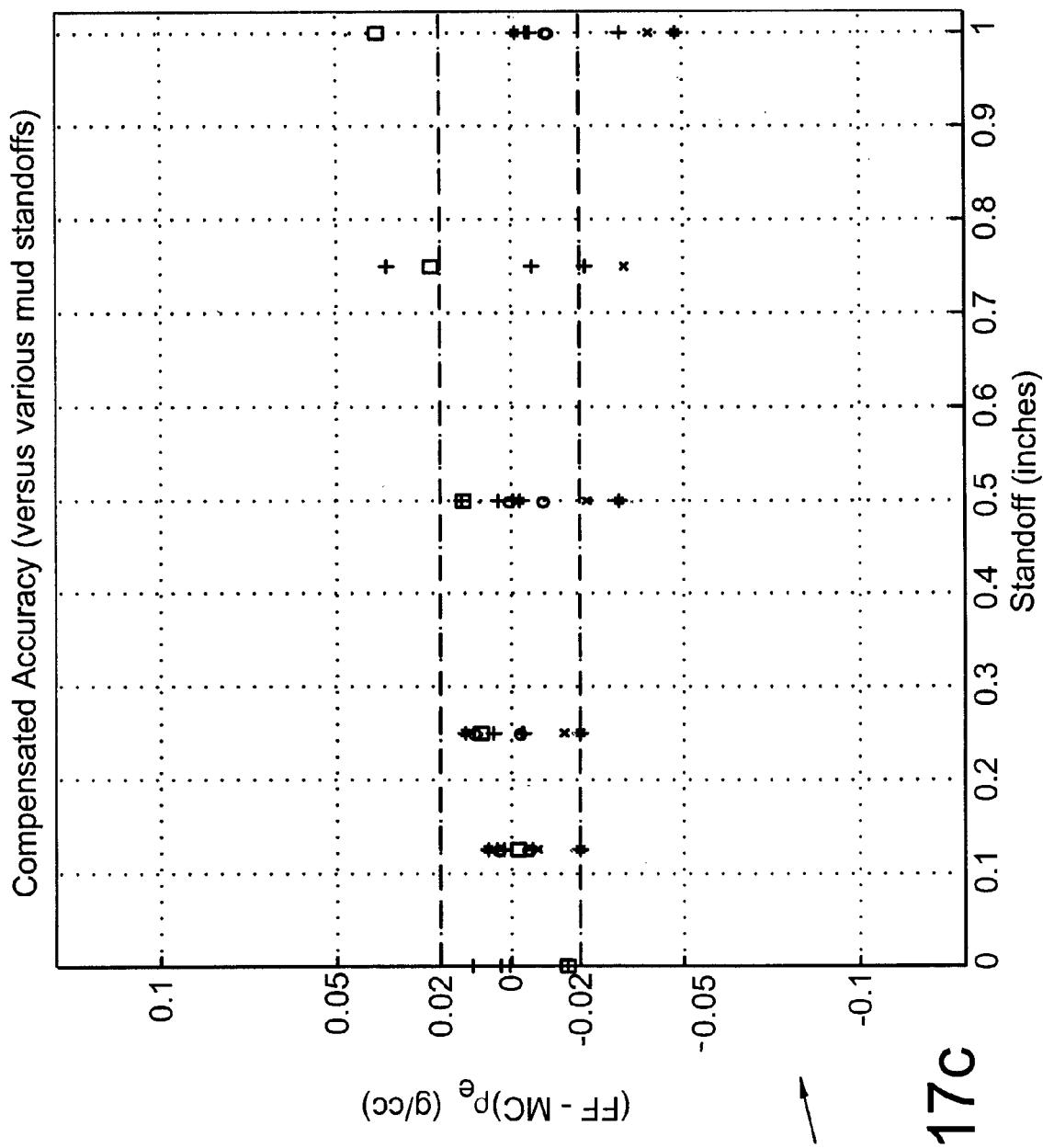

FIGS. 17*a-c* are plots summarizing the accuracy of the FF model, according to embodiments of the invention, taken simply as its residuals with respect to the MCNP densities in the fan charts shown in FIGS. 16*a-b*. The chart 1710 in FIG. 17*a* plots the accuracy of the FF model for the long spacing detector. The chart 1720 in FIG. 17*b* plots the accuracy of the FF model for the short spacing detector. The plots of FIGS. 17*a-c* are truncated at 1" of standoff to emphasize the upper limit of realistic values for which the FF model is intended. In such cases, the performance of the model is impressive, with electron density accuracies to within 0.02 g/cc for the LS detector and 0.05 g/cc for the SS detector. The various mud types are listed in table 1722 of FIG. 17*b*. In addition, the data plotted in FIGS. 17*a*-17*c* represent four different formation materials: Mg, 30 pu Sandstone, Limestone, and 40 pu Limestone.

A compensated density comparison can be made by applying the same $\Delta\rho$ polynomial to the FF densities as derived in the calibration Monte Carlo. Chart 1730 of FIG. 17*c* shows the resulting accuracy plot. The accuracy is within 0.04 g/cc for all realistic scenarios of less than 1" of standoff.

Figure 18:
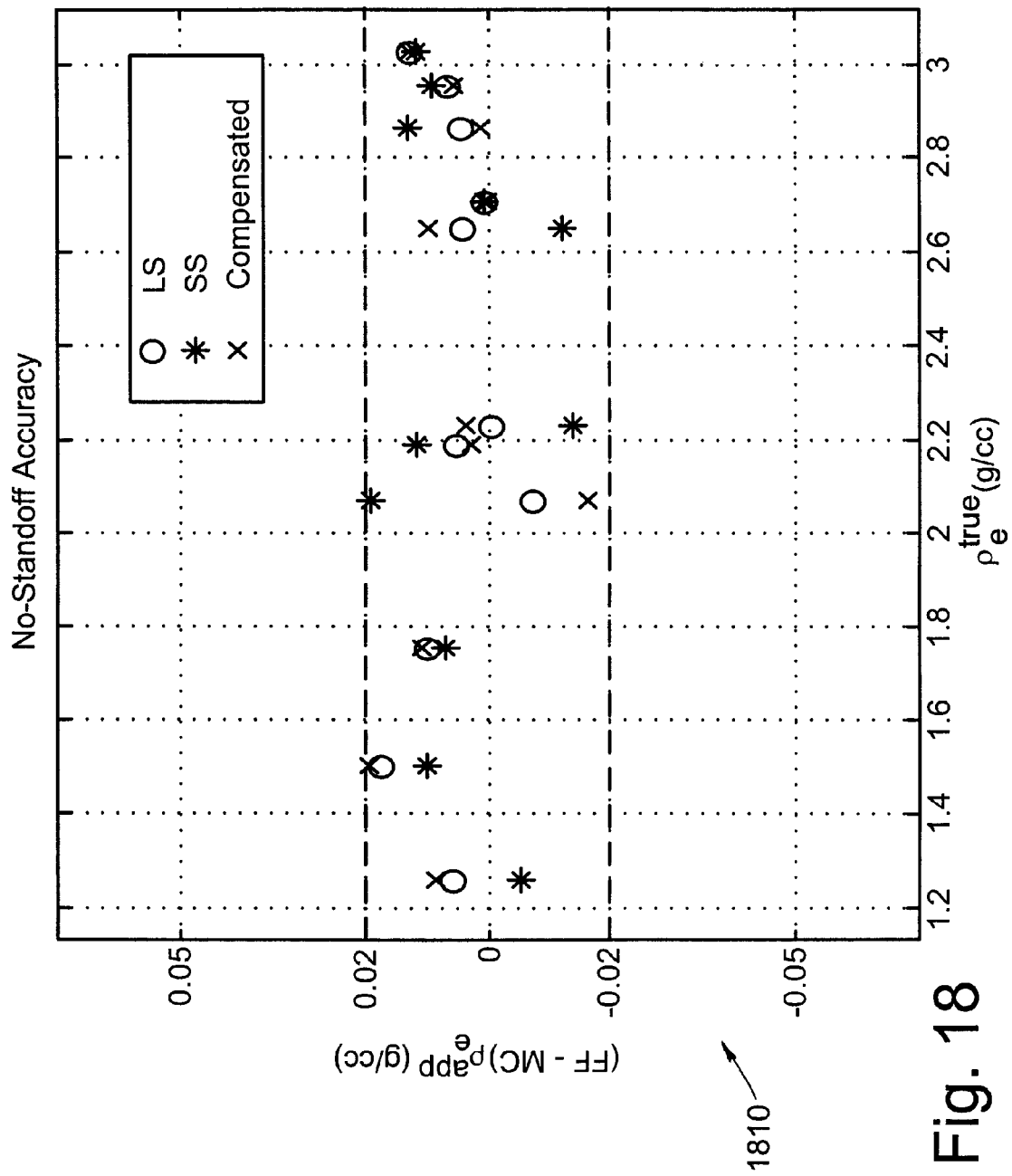
FIG. 18 compiles the accuracy of the FF model for all cases of no standoff.

FIG. 18 compiles the accuracy of the FF model for all cases of no standoff. From chart 1810 it can be seen that, excluding the outliers from infinite borehole fluid, the forward model is accurate to within 0.02 g/cc for all apparent and compensated densities for this most commercially important configuration. Table 3 summarizes the overall accuracy of the FF model as compared to full Monte Carlo, which it achieves in several orders of magnitude less computing time.

TABLE 3

| Density | Accuracy [g/cc] | |
|---|---|---|
| | Standoff <1" | No Standoff |
| LS | 0.02 | 0.02 |
| SS | 0.05 | 0.02 |
| Compensated | 0.04 | 0.02 |

Benchmarking in simulated HA/HZ wells will now be provided. A fundamental demonstration of the potential of this work for model inversion is to benchmark its predictions with Monte Carlo simulations of HA/HZ wells. To do so, we generate a database consisting of density logs and images for thick-bed interfaces with large dip angles.

Figure 19:
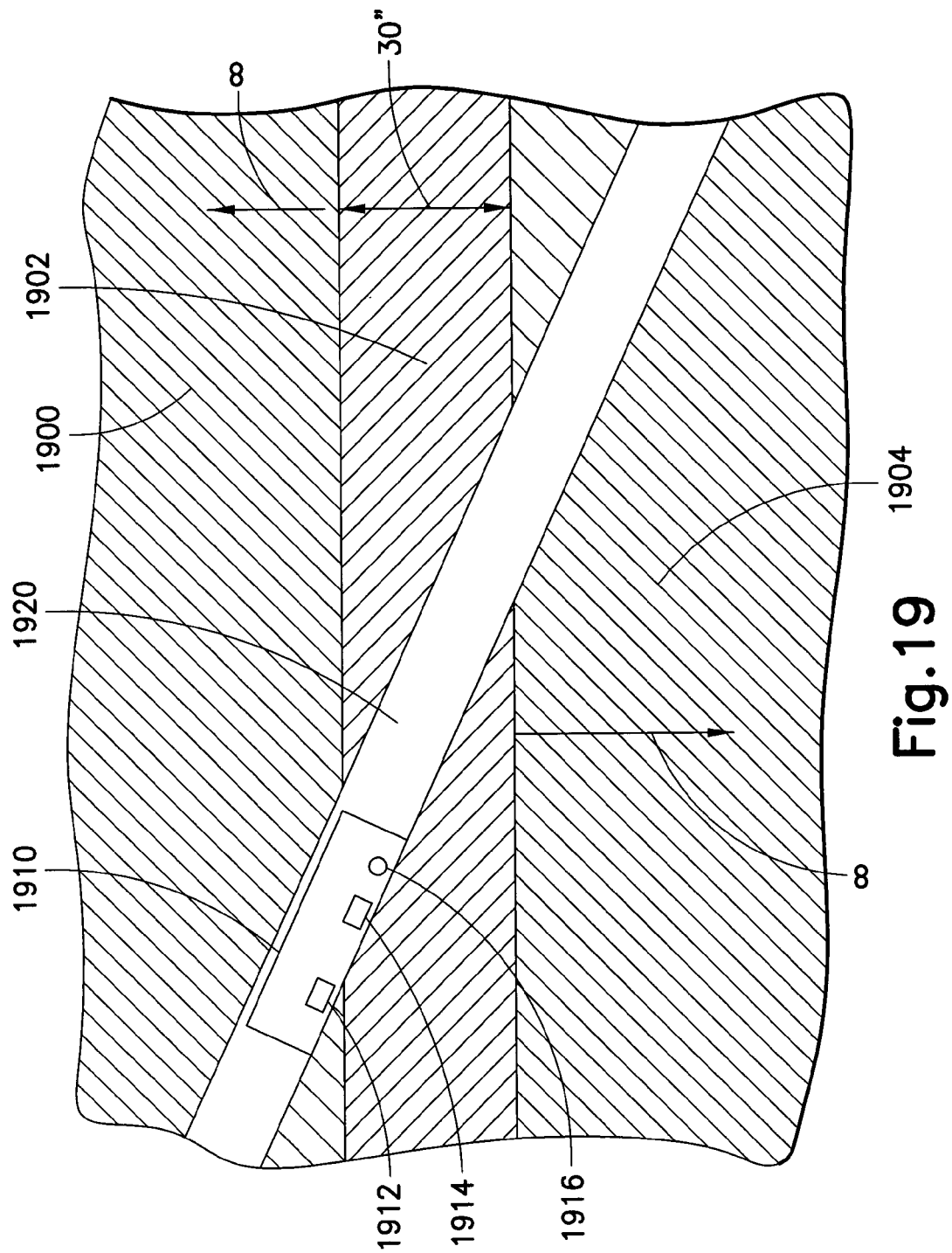
FIG. 19 illustrates the geometry used in the simulation.

FIG. 19 illustrates the geometry used in the simulation. Borehole 1920 passes through subterranean rock formation having three distinct layers 1900, 1902 and 1904. The upper layer 1900 has density of $\rho^{upper}$ and has infinite thickness. Lower layer 1902 has a density of $\rho^{lower}$ and has a thickness of 30 inches. Gamma-gamma LWD tool 1910 is disposed in borehole 1920, and has a gamma ray source 1916, short spacing detector 1914 and long spacing detector 1912. The parameters of the database are compiled in Table 4.

TABLE 4

| | "Low contrast" | "High Contrast" |
|---|---|---|
| $r_c^{upper}$ [g/cc]/Pe | 2.4960/1.74 | 2.9568/5.05 |
| $r_c^{lower}$ [g/cc]/Pe | 2.1111/1.54 | 2.0730/4.93 |
| Standoff (water) [in] | 0, ¾ | 0 |
| Dip Angle [deg] | 80, 85, 89 | 0, 80, 85, 89 |
| Azimuthal Orientations | Full image | Top & bottom logs only |

The database is divided into "low contrast" layers of 10 pu and 35 pu sandstone formations, for which comprehensive density images are generated, and "high contrast" layers of Anhydrite and 30 pu gas-filled limestone, for which only simple logs with no standoff are generated. The sandstone images consist of azimuthal tool rotation in 22.5° increments (over half of the symmetrical circle) and are divided further into cases with no standoff or ¾" of water standoff at the top of the borehole. All of the simulations are run in 1" increments of true vertical depth in the vicinity of the bed interfaces. The full database consists of 2313 Monte Carlo runs, each requiring about 12 hours on a 2.4 GHz CPU running Red Hat Linux. By contrast, images of the size and resolution discussed below are generated by the forward model code in less than one second, at least 6 orders of magnitude faster than the associated Monte Carlo.

In assessing the performance in low-contrast images and logs, we first examine the predictions of the FF model in HA/HZ scenarios with no standoff.

Figure 20A:
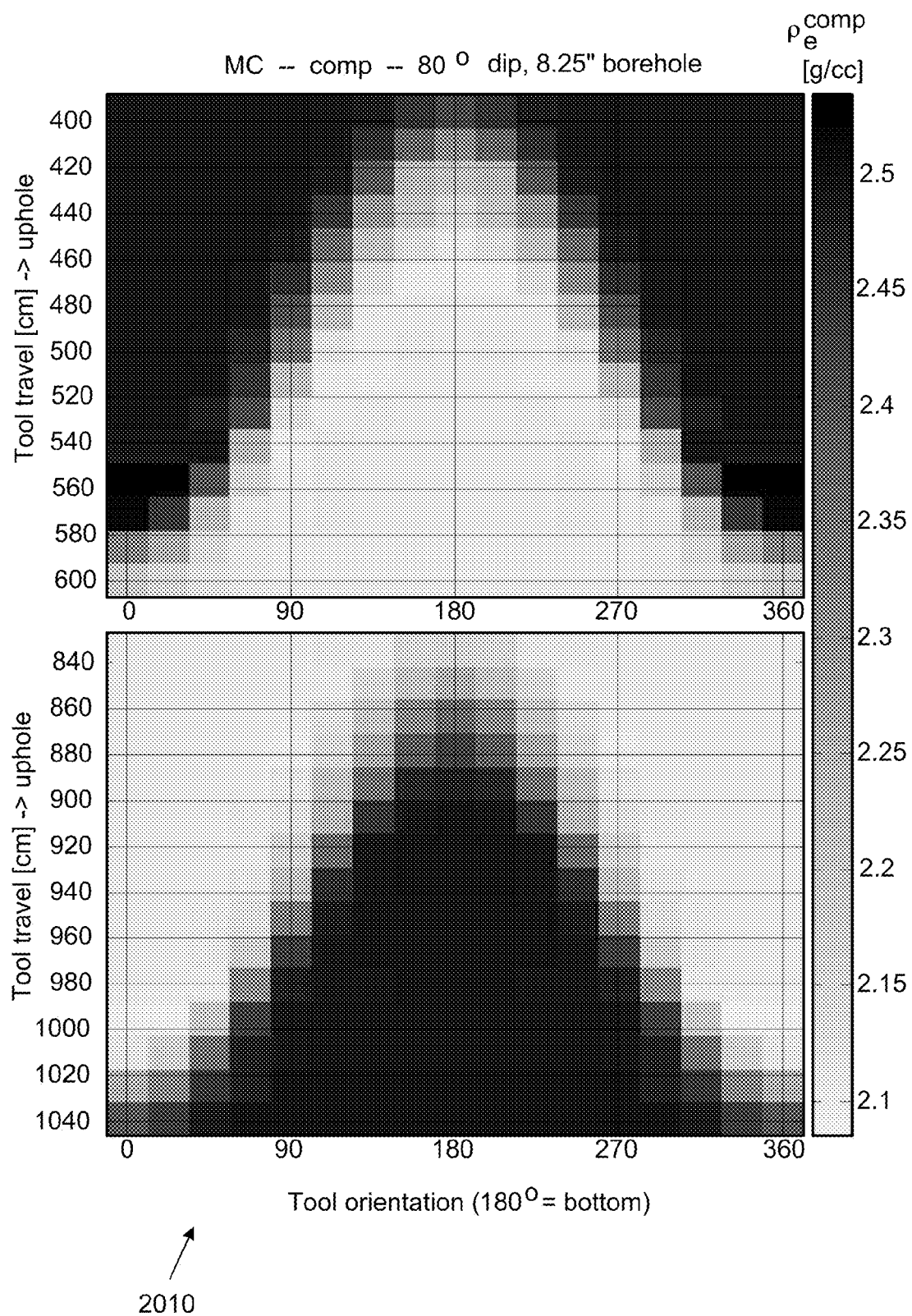
FIGS. 20a and 20b are density images from Monte Carlo and the FF model, according to embodiments of the invention, of the sandstone beds with an approximate 80 degree dip angle and no standoff at the top of the borehole.
Figure 20B:
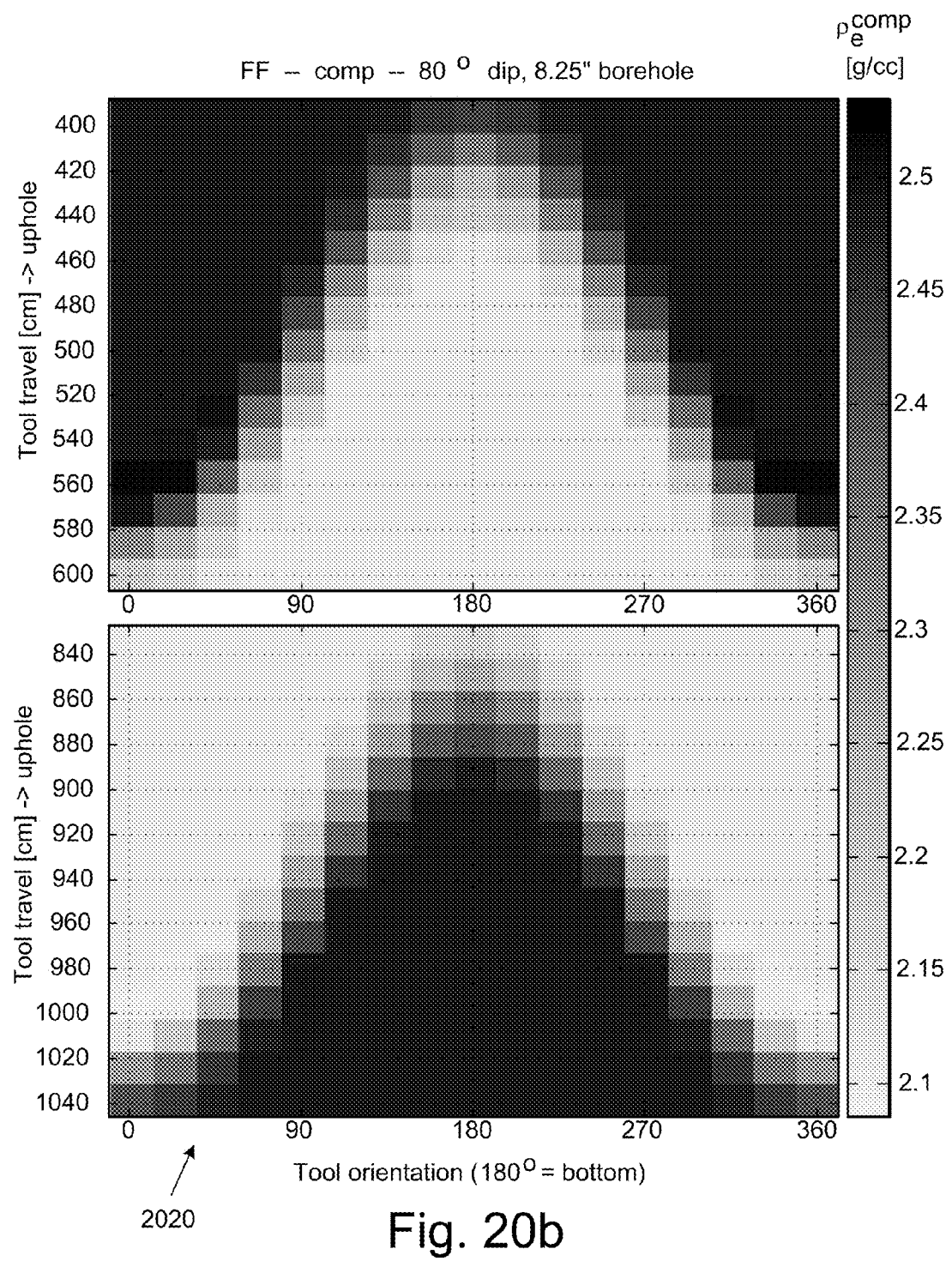

FIGS. 20*a* and 20*b* are images from Monte Carlo and the FF model, according to embodiments of the invention, of the sandstone beds with an 80 degree dip angle and no standoff. Compensated density images 2010 in FIG. 20*a* are from two sandstone bed interfaces using Monte Carlo, and compensated density images 2020 in FIG. 20*b* are from the two sandstone bed interfaces using the FF model. The modeled geometry has a dip angle of 80 degrees in both cases. The measurements at the bottom of the borehole record the bed transition first, and the tool's movement through the angled interface is observed as a sinusoidal variation with azimuthal orientation. Because our benchmarking database is constructed in increments of true vertical depth, the images for higher dip angles look very similar except that the length of the tool travel axis is stretched to match a larger sinusoidal amplitude. In comparing the images of FIGS. 20*a* and 20*b*, the most salient observation is that they are indistinguishable by eye. Other plots are shown below to reveal the small differences. The separate apparent densities of the LS and SS detectors are also examined below.

Figure 21A:
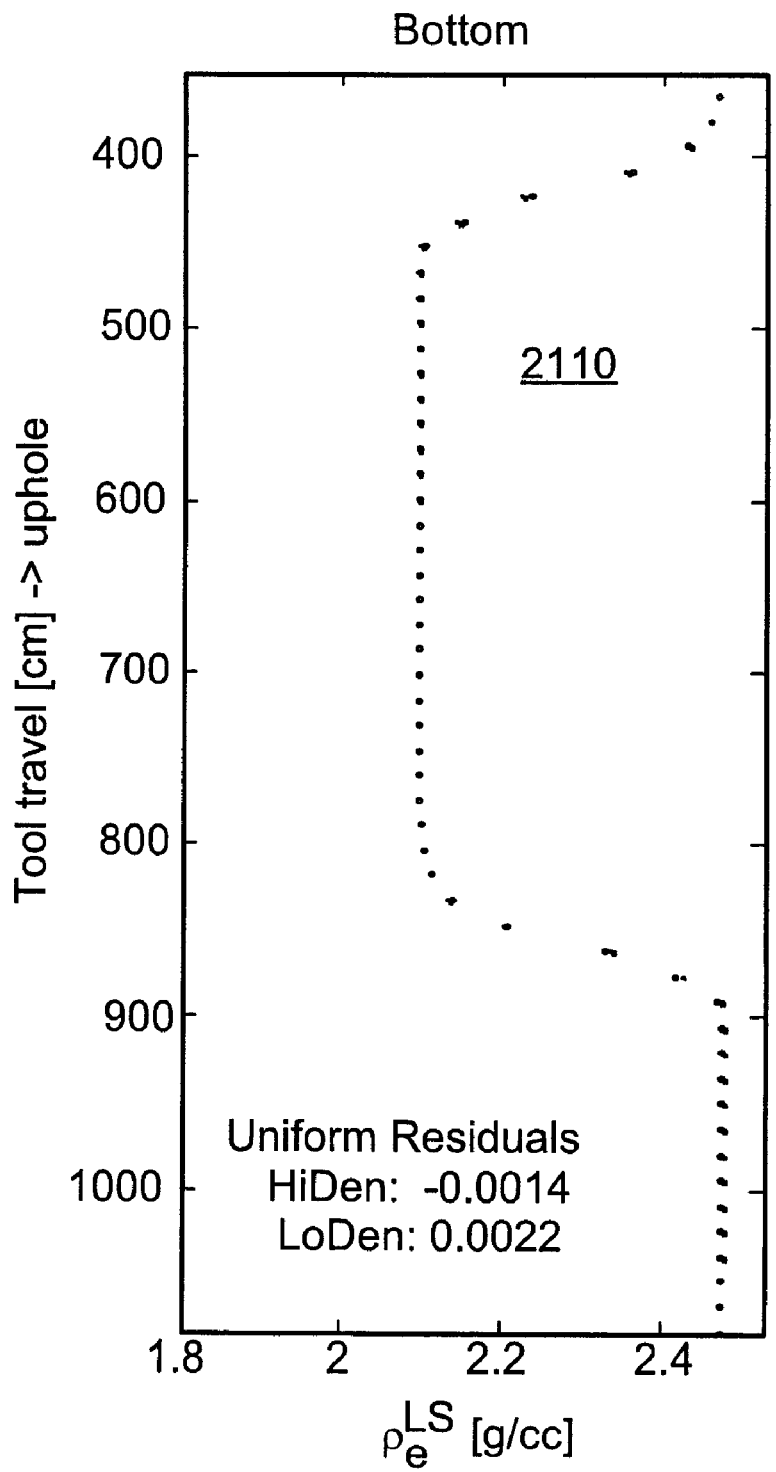
Figures 21B, 21C:
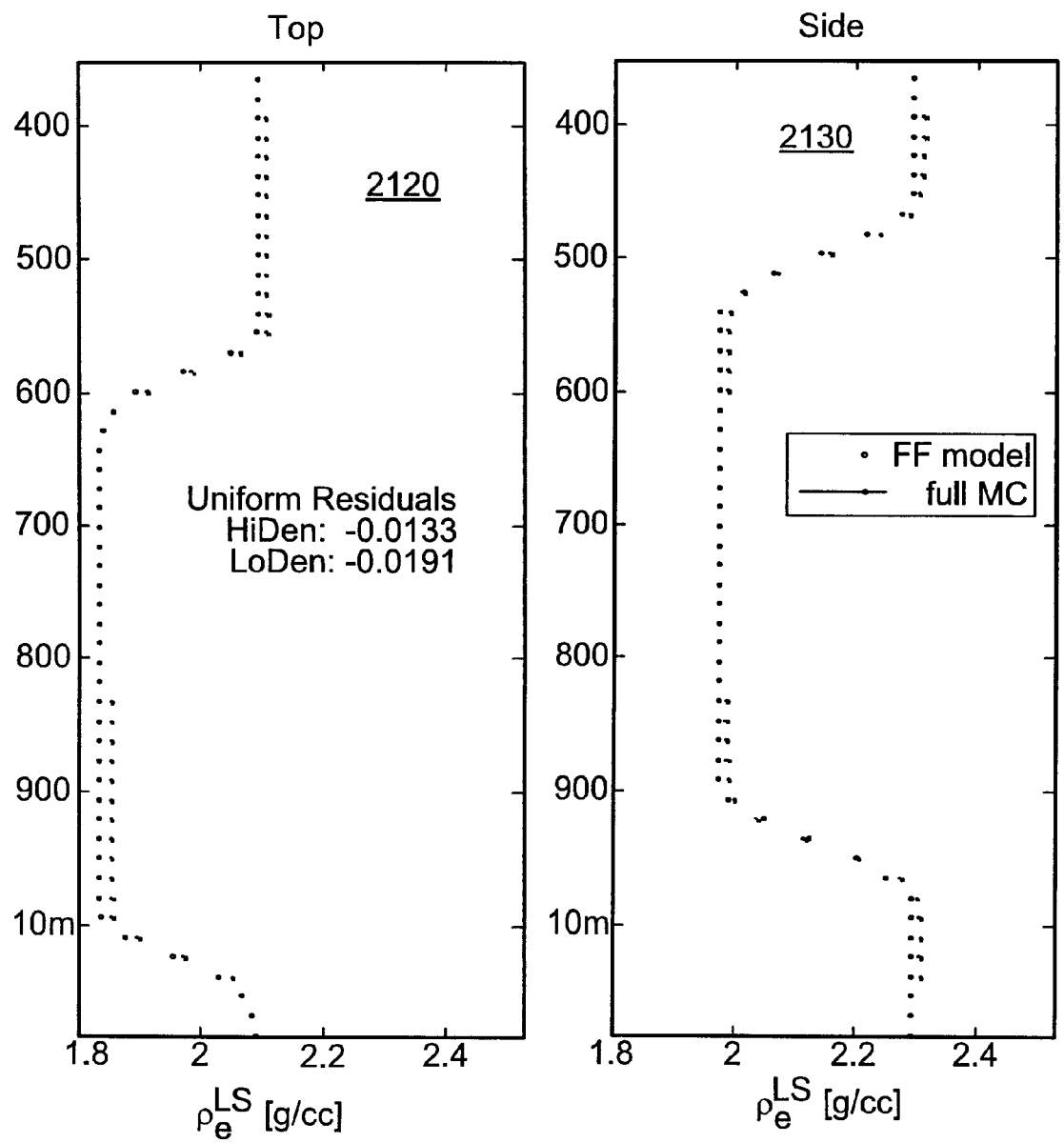
Figure 22A:
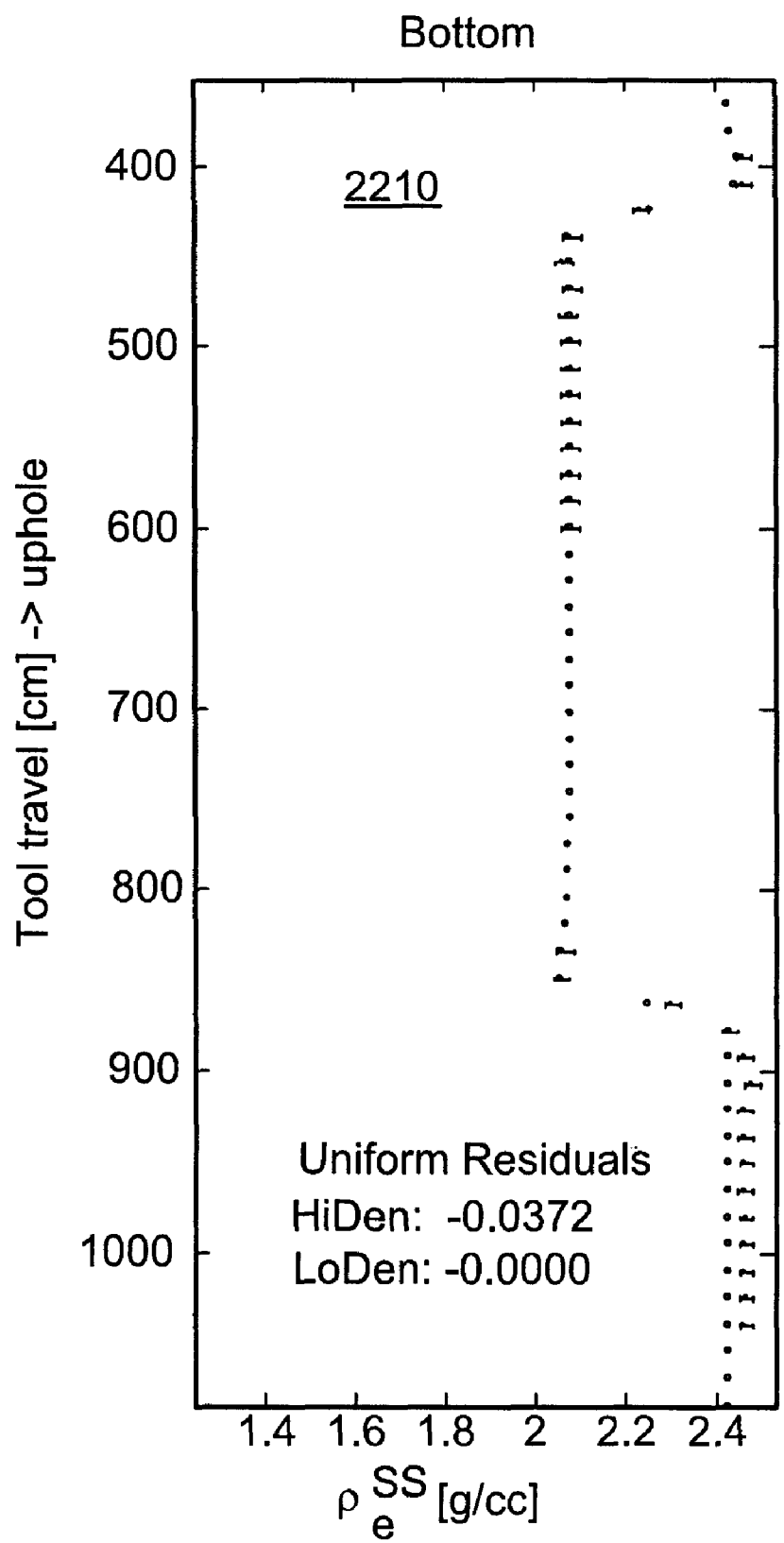
Figure 23A:
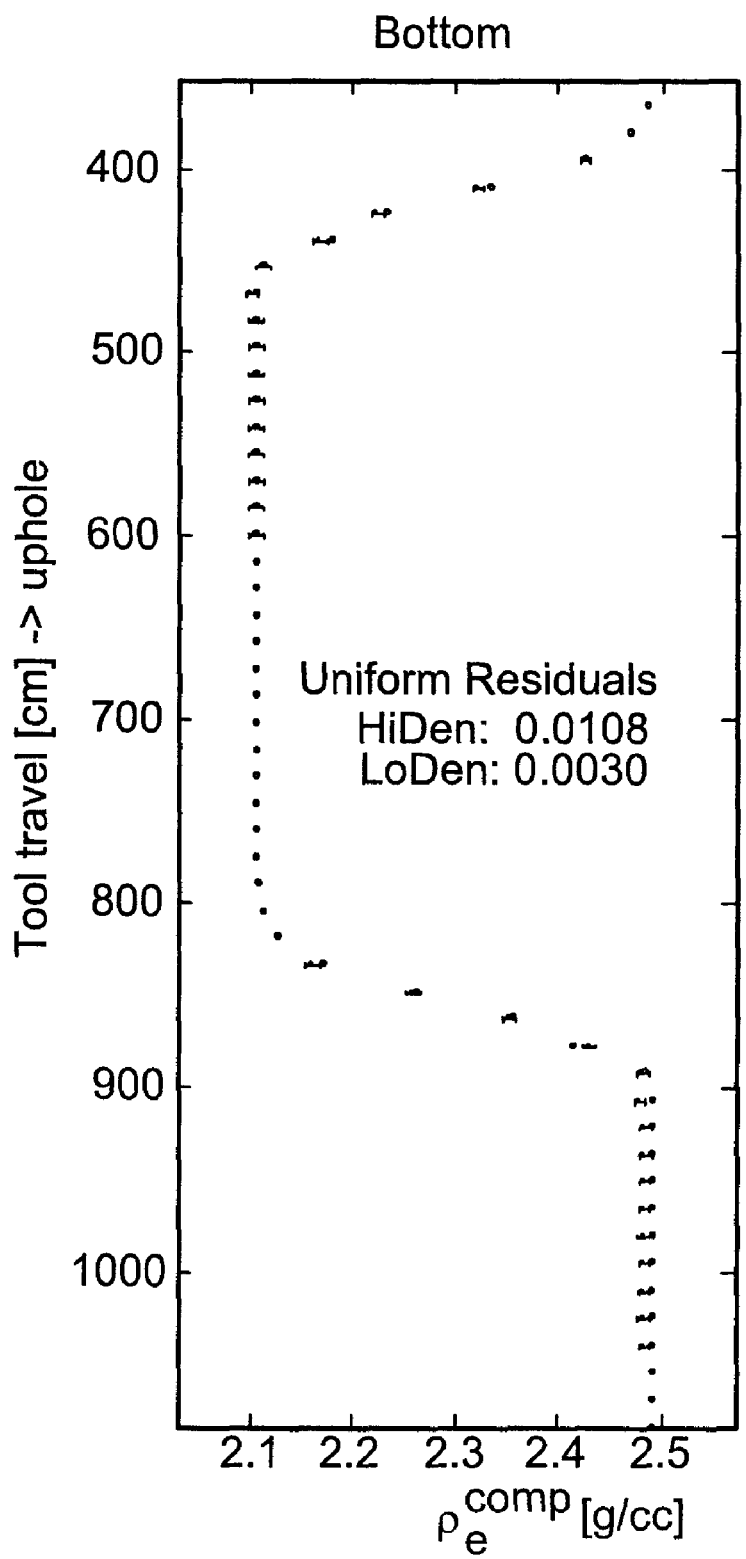
Figures 23B, 23C:
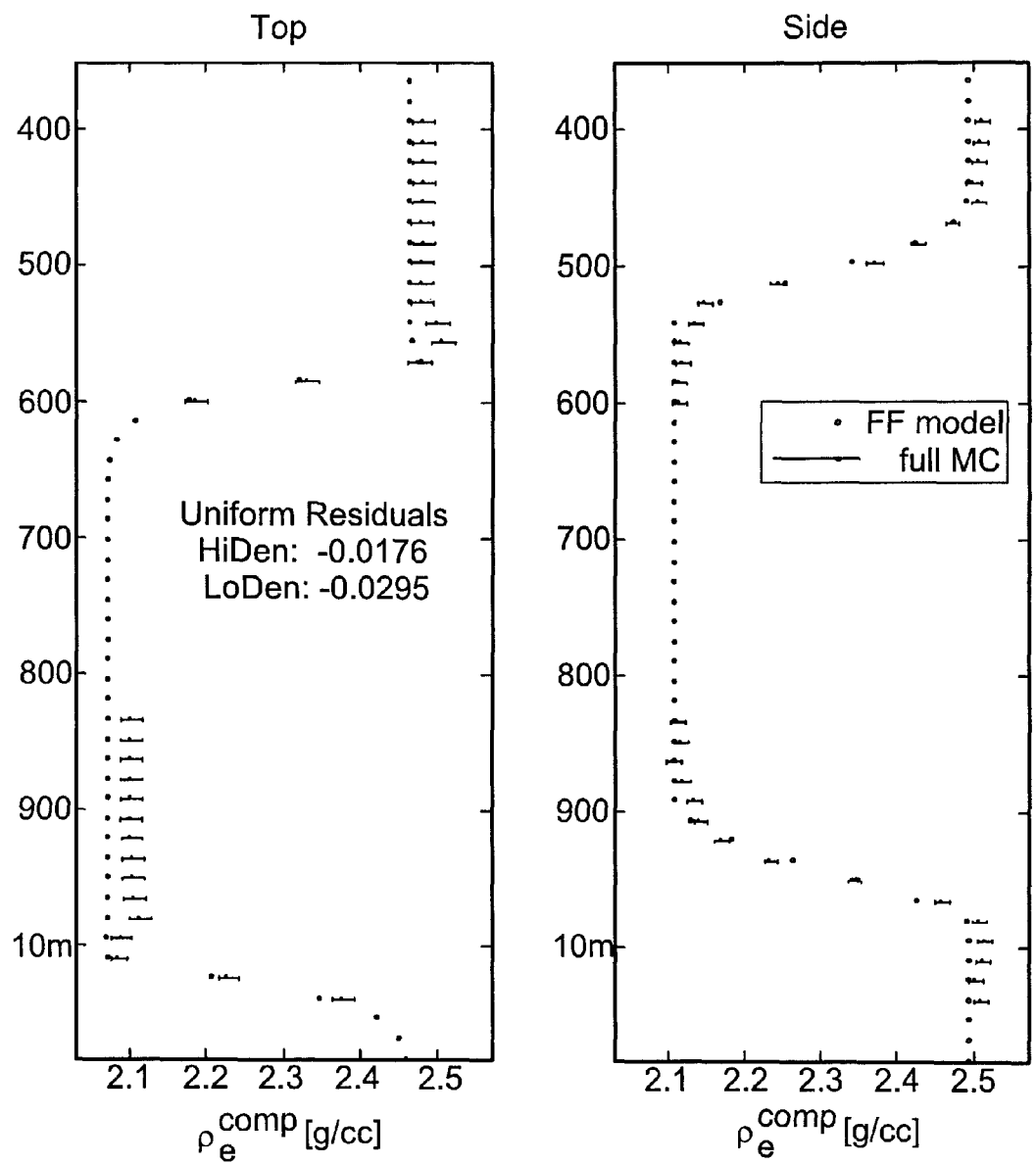

The ability to predict logs and images with modest standoff is an important feature of the FF model. Density logs are extracted from the images by plotting the density variation at a fixed orientation. We study the FF performance in HA/HZ geometries with ¾" of water at the top of the borehole in order to probe the upper end of realistic standoffs. FIGS. 21*a-c*, 22*a-c* and 23*a-c* show the logs for the LS, SS, and compensated densities for a dip angle of 80° and the standoff noted above, according to embodiments of the invention. FIGS. 21*a-c* are logs of apparent LS density in the sandstone beds with an 80 degree dip angle and ¾" of water standoff on top. Logs 2110, 2120 and 2130 represent measurements from the bottom, top and side of the tool respectively. FIGS. 22a-c are logs of apparent SS density in the sandstone beds with an 80 degree dip angle and ¾" of water standoff on top. Logs 2210, 2220 and 2230 represent measurements from the bottom, top and side of the tool respectively. FIGS. 23a-c are logs of compensated density in the sandstone beds with an 80 degree dip angle and ¾" of water standoff on top. Logs 2310, 2320 and 2330 represent measurements from the bottom, top and side of the tool respectively. Within each figure, the density axes are fixed to the same limits and are set to accommodate the full range of standoff and no-standoff tool orientations. The accuracy of the FF model in the uniform regions with and without standoff is excellent and is well within the upper limits observed in the initial calibration (0.02 g/cc for LS, 0.05 g/cc for SS). The figures explicitly list the residuals between the model and the Monte Carlo predictions, with the "HiDen" and "LoDen" labels indicating the residuals averaged over five points in each of the constant upper and lower density regions. The accuracy of the transition regions is also good and is consistent with the results of the FF calibration with standoff. In this case, the transition appears as a variable wedge of high-density standoff material. The agreement in the transition regions also supports that the axial dependence of the sensitivity maps is correct. The FF model does reasonably well even in predicting the "overshoots" in short-spacing density at the beginning or end of the transition regions, which are due to the addition of a higher- or lower-density material in the single back-scattering region of the SS detector. We can therefore conclude that the negative lobe of the SS $1^{st}$-order Compton map is a necessary feature of the model. The "top" logs for the apparent densities clearly show the influence of the water standoff, particularly for the SS case. The transitions are modeled with the same quality as in the no-standoff regions, and the overshoots due to the SS response are still captured by the FF predictions. The "bottom" log for each figure is effectively identical to those that would be observed in a no-standoff geometry. It should be noted that, for reasons of computational speed, the spatial grid for this version of the FF model neglects the borehole size effect in bottom logs for wells of any realistic diameter, but this effect could be readily included with a finer spatial mesh; since the small effect of the borehole is inherent in the MCNP calculations, these bottom logs show that our approach is completely sufficient.

Figure 24A:
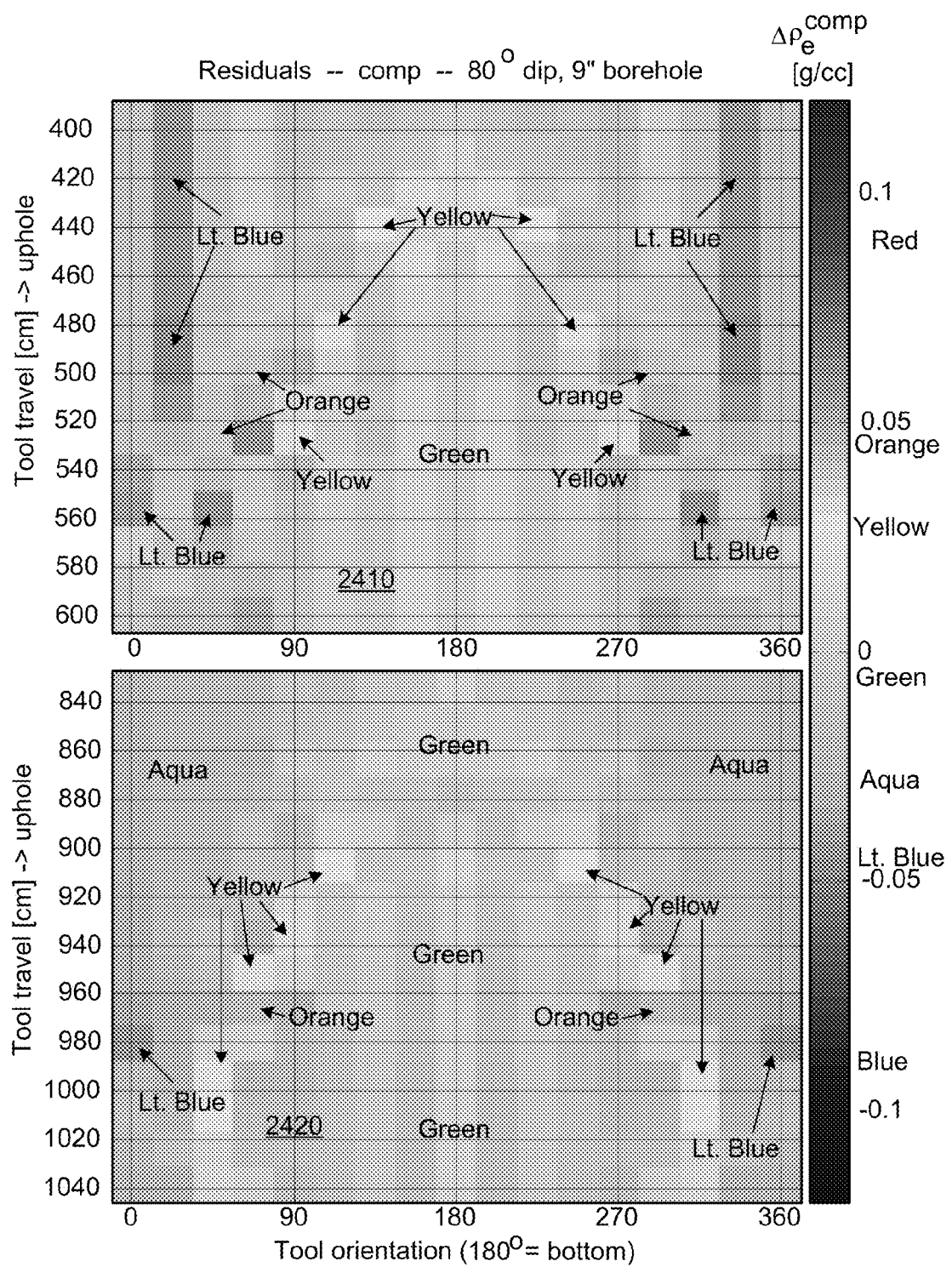
FIG. 24a are temperature plots showing the residuals that correspond to the compensated density images of FIGS. 20a-b.
Figure 24B:
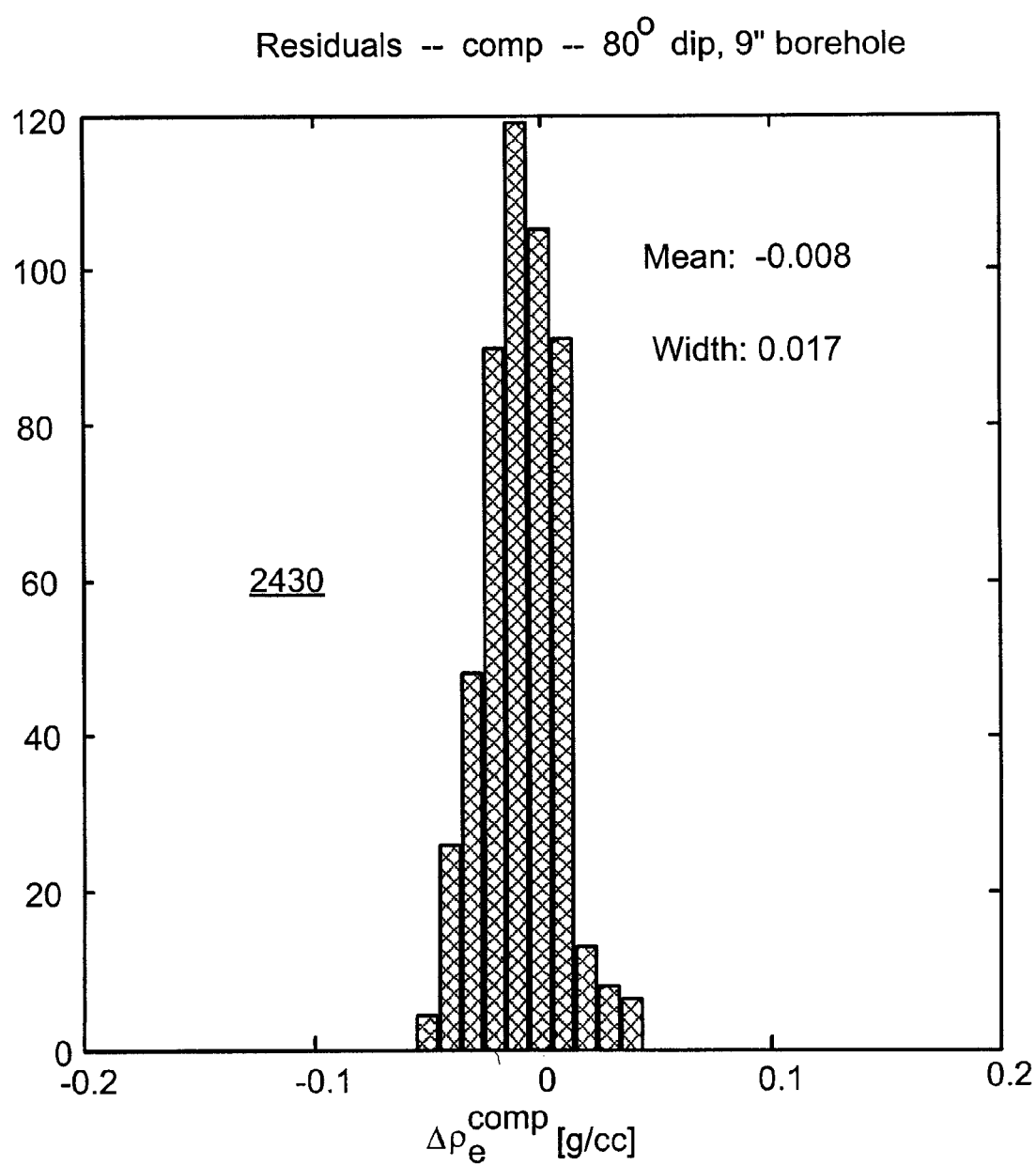

It is cumbersome to examine each log individually for every database combination, and the images cannot be compared by eye. A more comprehensive comparison of the FF model performance is available in the difference between each pair of FF and Monte Carlo images. FIG. 24a are temperature plots showing the image residuals that correspond to the compensated density logs of FIGS. 23a-c. The residuals plots 2410 and 2420 illustrate that the transition region for each tool orientation is the source of a modest deviation while the agreement in the uniform regions is excellent. FIG. 24b is a histogram showing the overall distribution of residuals shown in the image of FIG. 24a. Histogram 2430 has a mean of −0.008 g/cc and a standard deviation of 0.017 g/cc. These values demonstrate that the FF model is unbiased and accurate in this HA/HZ geometry. The central peak indicates the excellent agreement in the uniform regions, and the short tails show the accuracy of the transitions. The transition residuals are within 0.05 g/cc for the compensated density. The performance of the FF model is virtually identical for higher dip angles, as indicated in Table 5.

TABLE 5

| Mean/Width [g/cc] | | 80° dip | | 85° dip | | 89° dip | |
|---|---|---|---|---|---|---|---|
| No-standoff | LS | +0.002 | 0.006 | +0.002 | 0.008 | +0.002 | 0.012 |
|  | SS | −0.009 | 0.026 | −0.010 | 0.026 | −0.009 | 0.027 |
|  | Comp | +0.005 | 0.012 | +0.005 | 0.011 | +0.005 | 0.013 |
| ¾" water standoff | LS | −0.006 | 0.010 | −0.005 | 0.011 | −0.005 | 0.013 |
|  | SS | −0.004 | 0.023 | −0.004 | 0.026 | −0.004 | 0.028 |
|  | Comp | −0.008 | 0.017 | −0.007 | 0.017 | −0.007 | 0.018 |

Table 5 shows the mean and standard deviation of FF electron density residuals [g/cc] for all sandstone bed images, showing unbiased and accurate predictions. The model performance is largely independent of dip angle and standoff within this range.

Simple logs through interfaces of Anhydrite and porous limestone were used to test of the model performance in high-contrast HA/HZ transitions. As outlined in Table 4, these top and bottom logs are benchmarked for the same dip angles as the sandstone beds but with only the case of no standoff. As expected, the uniform regions have excellent accuracy within the range observed in the FF model calibration and in the sandstone beds above. The transitions are also of similar quality as noted above, with the SS overshoots well described by the model. Much like in the sandstone beds, this performance is mirrored in all of the inspected dip angles.

Further detail on the FF model's applicability to experimental data will now be provided along with a derivation of a further version of the fast and accurate forward model for use in the field, according to embodiments of the invention. To assess whether the model will achieve comparable accuracy in a less idealized environment than Monte Carlo, its predictions are benchmarked against experimental measurements taken at an experimental test facility. The Monte Carlo model itself has previously been benchmarked to experimental data, and the overall agreement of the simulation results are good enough to justify the use of the Monte Carlo to derive the sensitivity maps shown above. Nevertheless, we have observed minor discrepancies that indicate the need for a specific calibration of the Fast Forward model for application to experimental data.

Table 6 lists the formation materials and mudcakes that comprise the experimental database. The full dataset includes formations with 9⅞" and 12¼" diameters. However, we use only the 9⅞" subset for this calibration because it has the most comprehensive data. The 12¼" data is used later for the final benchmarking of the forward model. Duplicate points are included when available, with the exception of one outlier point. As is visible in the fan charts discussed below, the Magnesium, sandstone, and Aluminum alloy formations are combined with the various mudcakes. Due to practical constraints, the maximum available standoff for any 9⅞" borehole configuration is ⅝.

TABLE 6

|  | Electron Density g/cc | Pef |
|---|---|---|
| Formation materials |  |  |
| Magnesium | 1.752 | 2.40 |
| Berea sandstone | 2.355 | 2.04 |
| Limestone 15 pu | 2.471 | 4.78 |
| Aluminum alloy | 2.696 | 5.70 |
| Limestone | 2.711 | 5.08 |
| Dolomite | 2.843 | 3.24 |

TABLE 6-continued

| | Electron Density g/cc | Pef |
|---|---|---|
| Diabase Mudcake composition | 3.030 | 4.30 |
| Hycar rubber | 1.259 | 1.61 |
| 33.6% Quartz | 1.511 | 1.67 |
| 20% Bar, 6.5% Qu | 1.480 | 48.0 |
| 53% Barite | 1.847 | 141.5 |
| 30.5% Bar, 30.5% Qu | 1.887 | 74.0 |

According to embodiments of the invention, the FF model coefficients are further modified by a fit to the experimental data. As in the calibration with Monte Carlo, the new LS and SS coefficient fits include standoff data. Due to the limited range available here, all the data are used. Additionally, to address an observed difference in spatial sensitivity of the SS experimental response, we perform a different modification to its $1^{st}$-order Compton map. As before, we neglect any change in the photoelectric and 2nd-order Compton maps. All sensitivity maps for the LS response remain the same as shown and described above.

The SS map modification follows the same procedure as before: we scale all positive elements of the radial sensitivity by a factor, effectively changing the importance of the first 1.5", and then we renormalize the entire map. Whereas for the Monte Carlo calibration the scale factor is 0.9, thus accentuating the effect of the negative lobe, the experimental data prefers a factor that suppresses this single-scattering region. Because the model is not very sensitive to factors much greater than 1, and because it would not be prudent to completely suppress the negative lobe when there is no deep-standoff data available that would probe the effect of doing so, we use a scale factor of 4.0 for the experimental FF model.

Figure 25A:
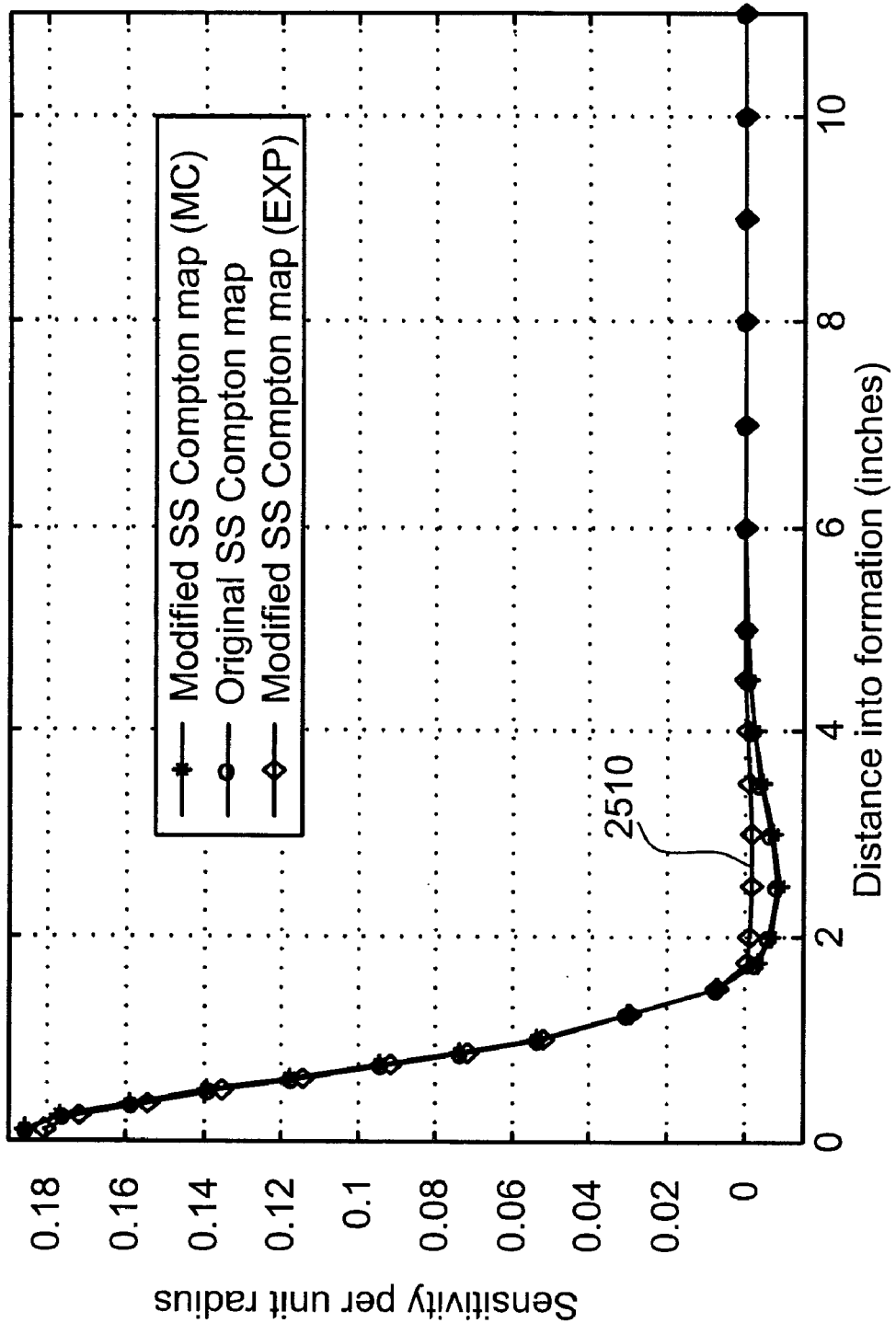
FIGS. 25a-b are plots showing the effect of these modifications on the radial sensitivity of the $1^{st}$-order SS Compton map.
Figure 25B:
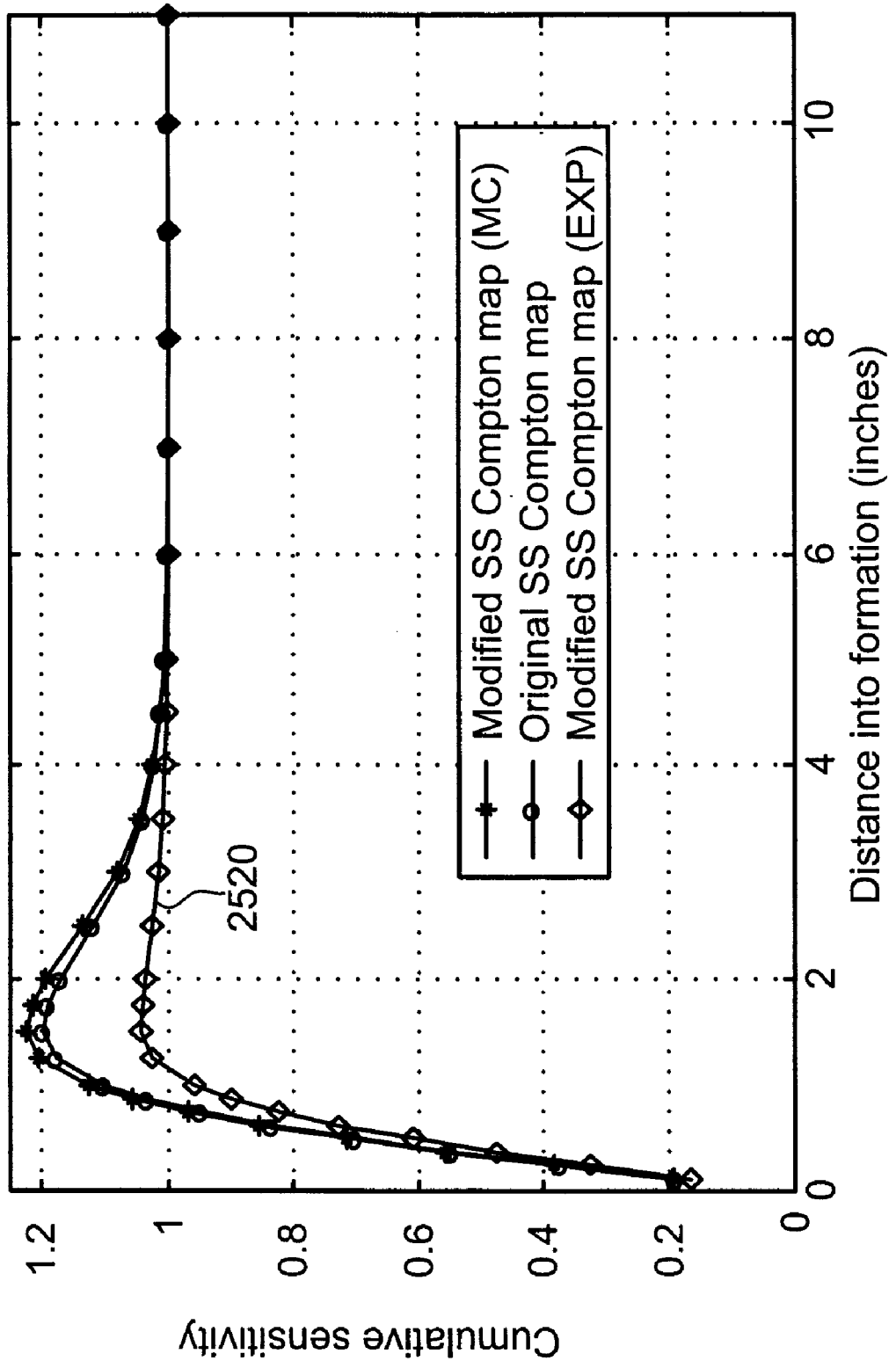

FIGS. 25a-b are plots showing the effect of these modifications on the radial sensitivity of the $1^{st}$-order SS Compton map. In FIG. 25a, curve 2510 is the sensitivity per unit radius (integrated in the axial direction) for the newly modified SS Compton map along with curves for the original and previously modified SS Compton maps. In FIG. 25b, curve 2520 is the cumulative radial sensitivity for the newly modified SS Compton map along with curves for the original and previously modified SS Compton maps. Note that the experimentally modified model suppresses the negative lobe which accounts for single back-scattering.

Table 8 compiles the fitted FF coefficients for the experimental database with the modified SS map included. The relative differences between these parameters and the values from Monte Carlo calibration are also listed. The change in weight for the dominant Compton component is less than a few percent, and the only major shifts are in the small coefficients of the correction terms with large uncertainties. The photoelectric term for the LS response is given moderately increased weight.

Figure 26A:
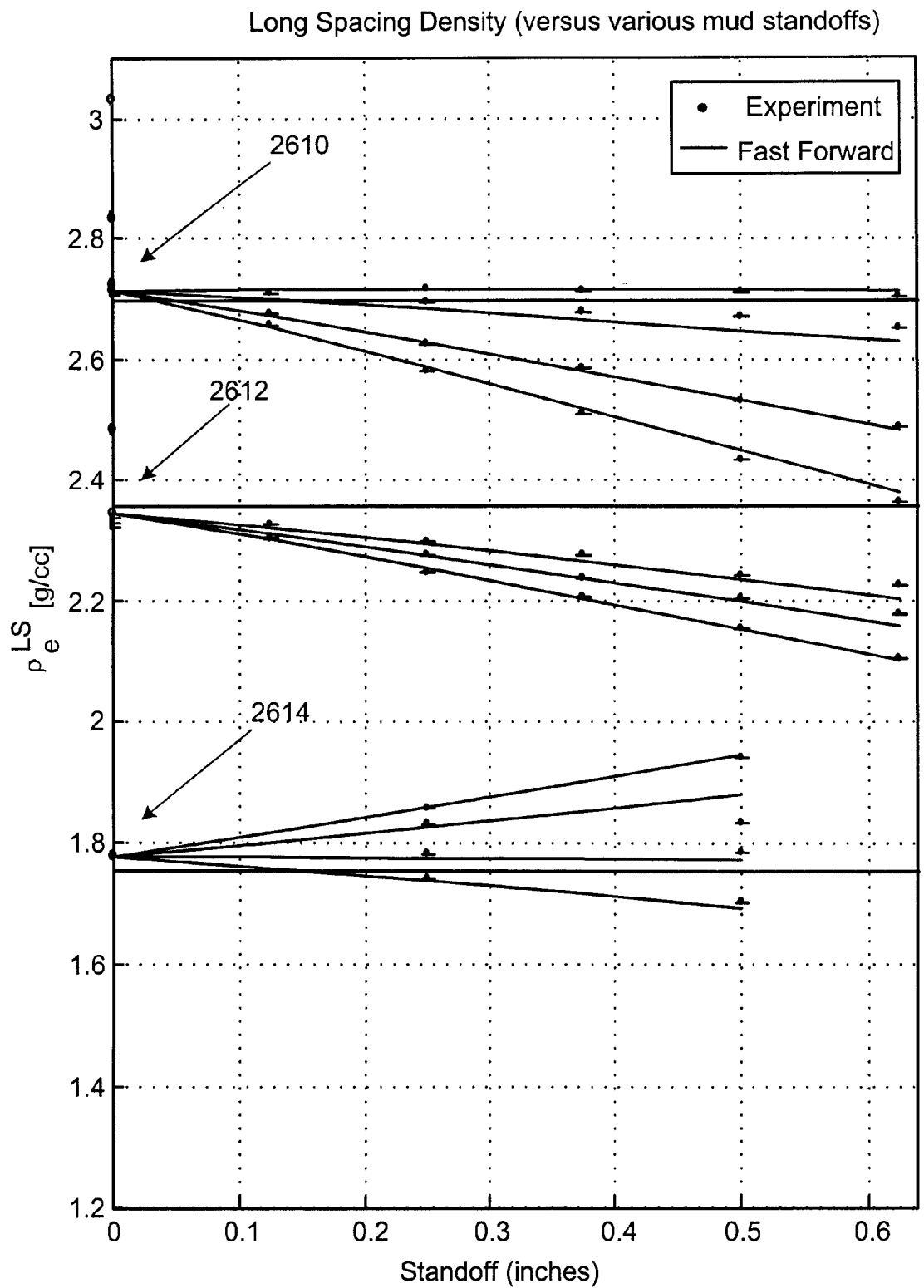
FIGS. 26a and 26b are fan charts comparing the predictions of the experimental FF model, which is calibrated experimentally, to the experimental densities for the LS and SS detectors.
Figure 26B:
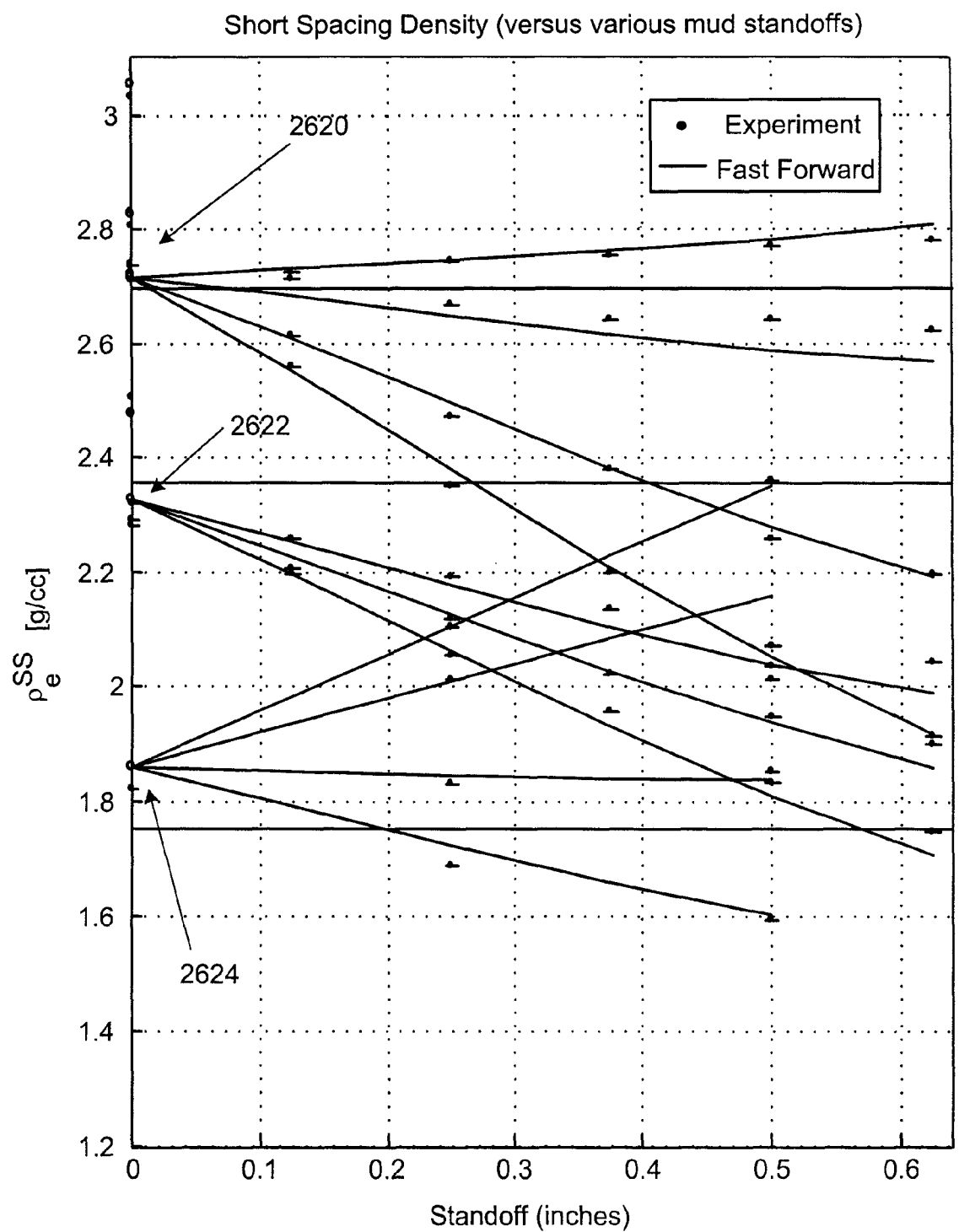
Figure 27A:
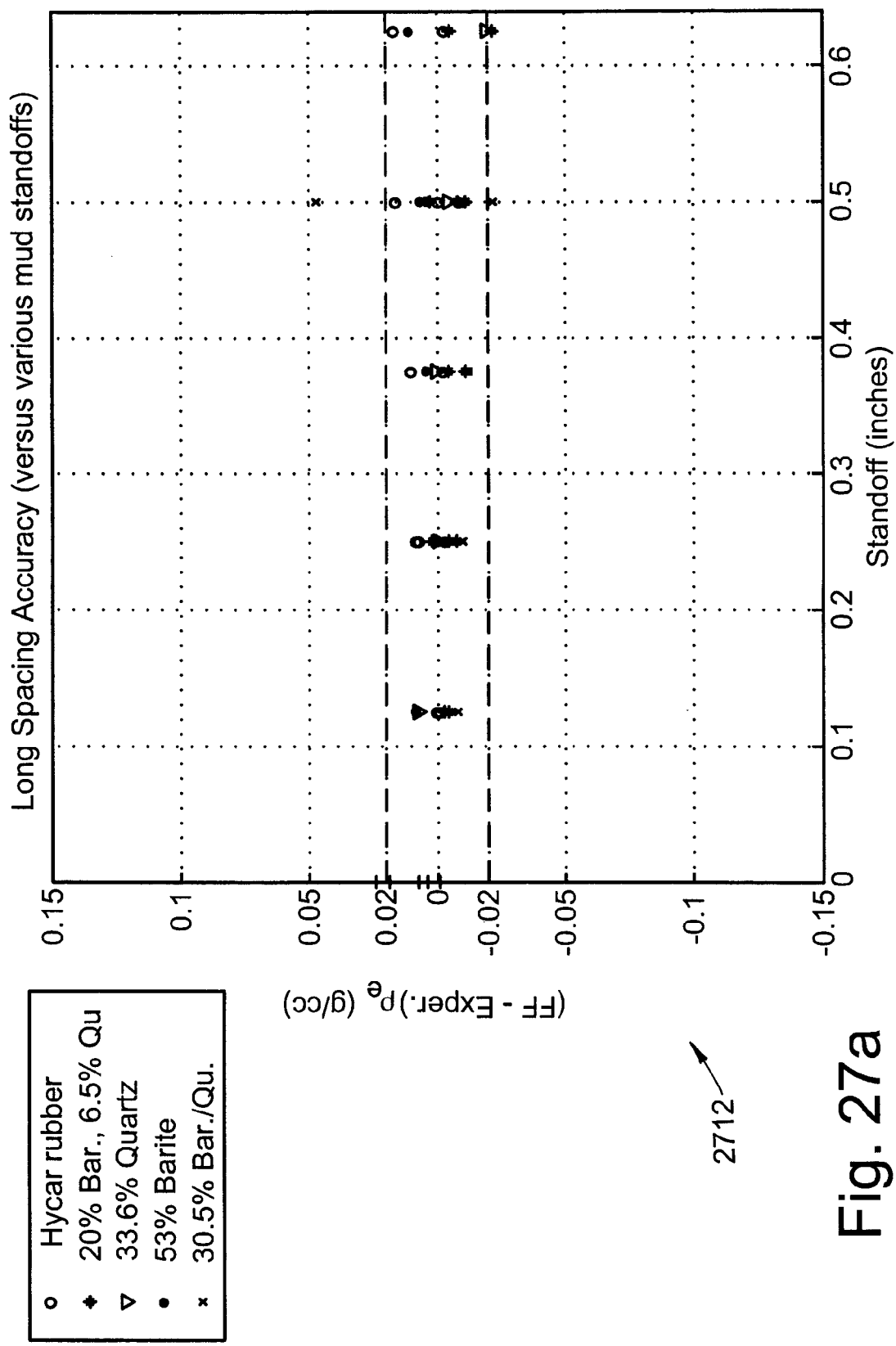
FIGS. 27a-c are plots summarizing the accuracy of the FF model, according to embodiments of the invention, taken as its residuals with respect to the densities in the fan charts shown in FIGS. 26a-b.
Figure 27B:
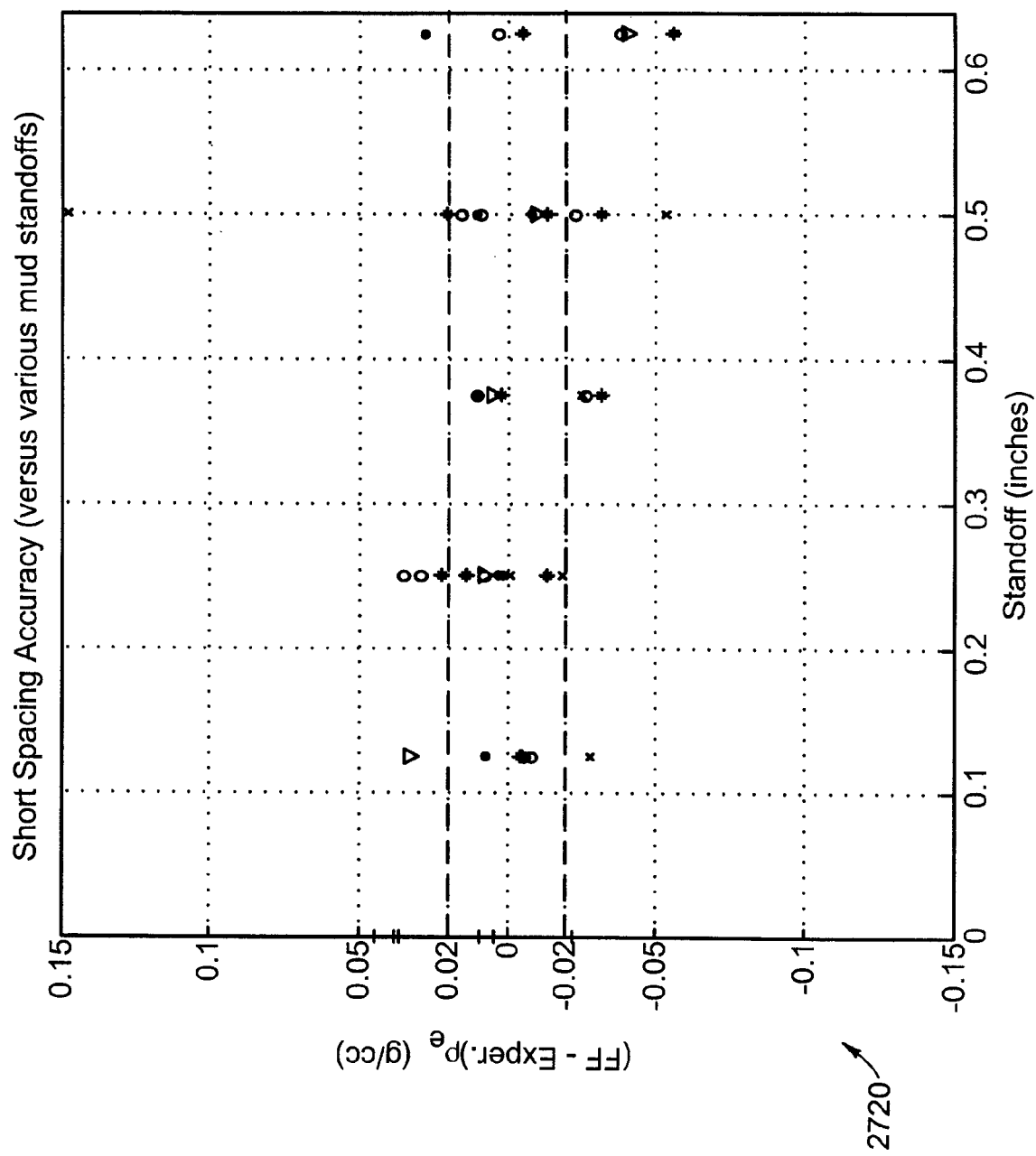
Figure 27C:
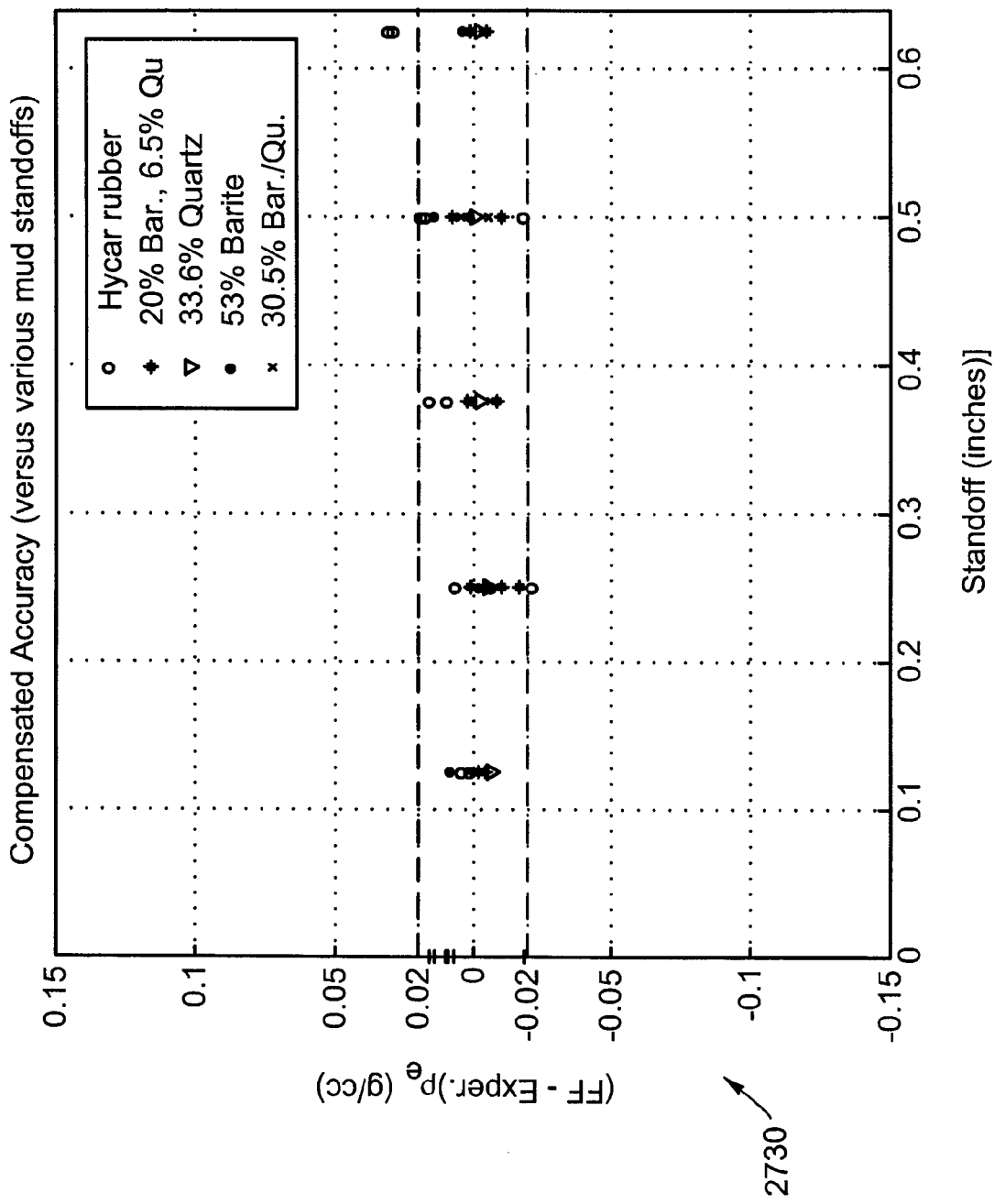

FIGS. 26a and 26b are fan charts comparing the predictions of the experimental FF model to the experimental densities for the LS (FIG. 26a) and SS (FIG. 26b) detectors. In FIG. 26a, the curves and associated points diverging from point 2610 represent Aluminum/Copper alloy, the curves and associated points diverging from point 2612 represent Berea sandstone, and the curves and associated points diverging from point 2614 represent Magnesium, all with various mudcakes described in Table 6. In FIG. 26b, the curves and associated points diverging from point 2620 represent Aluminum/Copper alloy, the curves and associated points diverging from point 2622 represent Berea sandstone, and the curves and associated points diverging from point 2624 represent Magnesium, all with various mudcakes described in Table 6. Also instructive are the associated accuracy plots of FIGS. 27a-c. FIGS. 27a-c are plots summarizing the accuracy of the FF model, according to embodiments of the invention, taken as its residuals with respect to the densities in the fan charts shown in FIGS. 26a-b. The various mud types are shown by the symbols according to the chart 2712. Furthermore, the data plotted in FIGS. 27a-c represent different formation materials, namely, Mg, Berea sandstone, and Al/Cu alloy. Chart 2710 of FIG. 27a indicates the accuracy that the LS accuracy reaches the 0.02 g/cc level, comparable to what is achieved in the initial Monte Carlo calibration. Each of the LS and SS plots contains a single outlier point at 0.05 g/cc and 0.15 g/cc respectively for ½" Barite mud; this experimental point also disagrees with a full Monte Carlo calculation, and we consider it an unrepresentative outlier. Chart 2720 in FIG. 27b plots the accuracy of the FF model for the short spacing detector. The SS results have a small standoff-dependent bias, but the accuracy is within 0.06 g/cc, only slightly worse than in the Monte Carlo results.

TABLE 8

| | LS | | SS | |
|---|---|---|---|---|
| FF coeff | Value | Δ [%] | Value | Δ [%] |
| $a_1$ | 0.9411 ± 0.0075 | −1.0 | 0.7777 ± 0.0166 | −2.0 |
| $a_2$ | 0.0040 ± 0.0001 | +39 | 0.0063 ± 0.0003 | −5.3 |
| $a_3$ | 0.0732 ± 0.0203 | −17 | −0.0696 ± 0.0347 | −253 |
| $a_4$ | −0.0522 ± 0.0232 | −28 | 0.2472 ± 0.0386 | +4.1 |
| $r_0$ | 2.0879 ± 0.0031 | +0.6 | 2.1137 ± 0.0086 | +1.7 |

The compensated density performance is shown in chart 2730 of FIG. 27c, and it mirrors the SS density behavior in that the compensation algorithm is responding to the small inaccuracy of the SS predictions. However, the accuracy of the FF model remains within the 0.03 g/cc level for all points, slightly better than in the initial calibration. We note that for both versions of the FF model, the most troublesome combination is for the high-contrast interface between a limestone-like formation and a light mud/water; this is consistent with the perturbation limits of the underlying forward model approximation.

Figure 28:
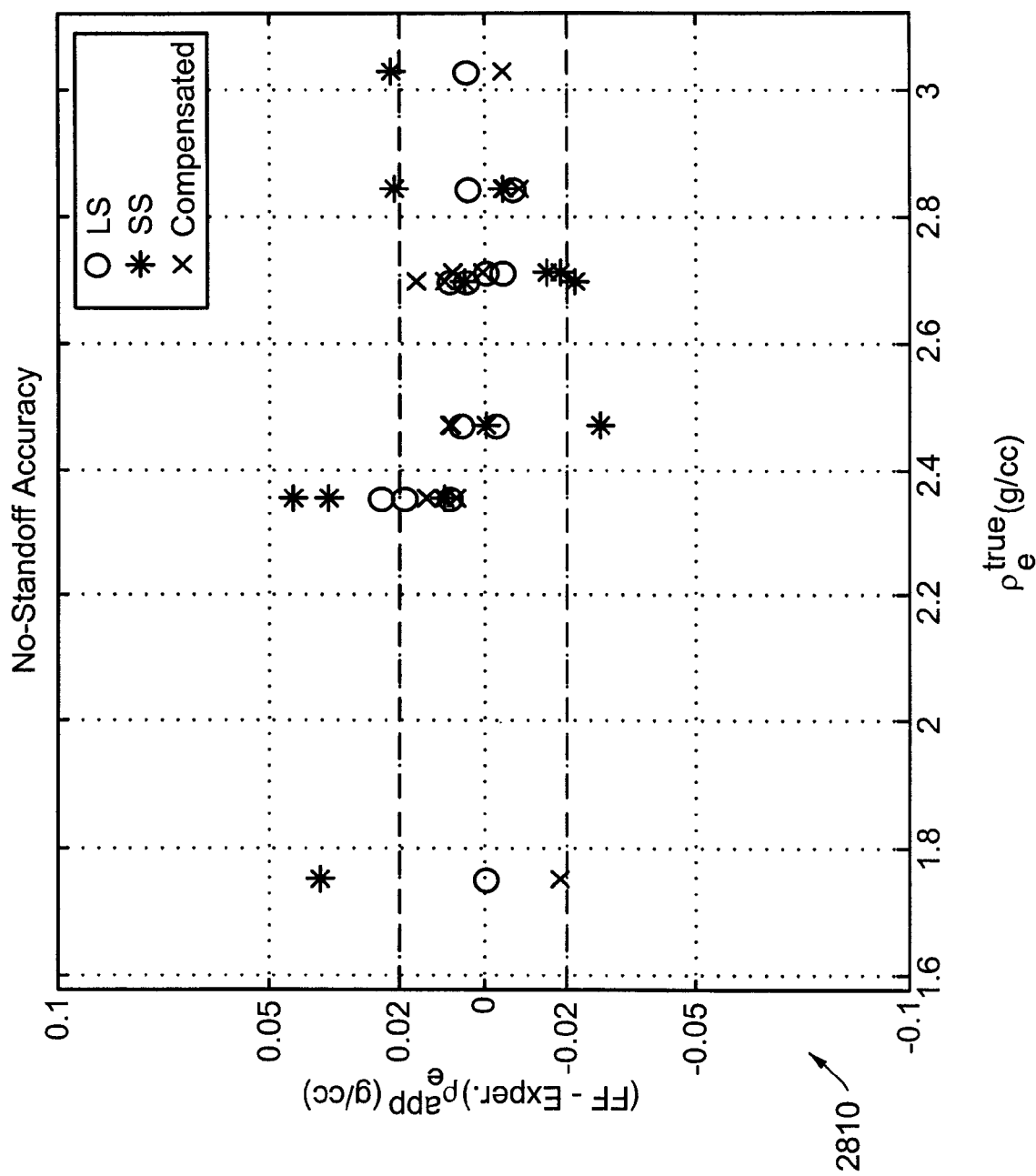
FIG. 28 is a plot summarizing the no-standoff accuracy of the apparent and compensated densities, according to embodiments of the invention.

FIG. 28 is a plot summarizing the no-standoff accuracy of the apparent and compensated densities, according to embodiments of the invention. Chart 2810 shows that the LS and compensated accuracies remain excellent at 0.02 g/cc. The SS accuracy is somewhat degraded, such that we can claim only 0.04 g/cc accuracy. Table 9 lists the overall accuracies of the final fast forward model in the experimental database.

TABLE 9

| | Accuracy [g/cc] | |
|---|---|---|
| Density | Standoff ≦ ⅝" | No Standoff |
| LS | 0.02 | 0.02 |
| SS | 0.06 | 0.04 |
| Compensated | 0.03 | 0.02 |

Further details of benchmarking in independent experimental data will now be provided. As a final test of the FF model, we apply the version calibrated in 9⅞" borehole experimental data to an independent experimental dataset with 12¼" borehole formations. The 12¼" dataset consists of the same three main formations as the first, but it uses larger standoff values that begin at ⅝", which is the maximum of the calibration data. This benchmark therefore serves two purposes: to simply test the calibrated model in independent data, and to simultaneously probe the model performance in more extreme standoffs than the range for which it is optimized.

TABLE 10

| Density | Accuracy [g/cc] | |
| --- | --- | --- |
| | Standoff ≦ 1" | No Standoff |
| LS | 0.02 | 0.02 |
| SS | 0.06 | 0.06 |
| Compensated | 0.04 | 0.02 |

Table 10 summarizes the overall performance of the experimental FF model in this independent dataset. These accuracies are extracted from plots of the same type as shown in the previous subsection. Although only limited data is available, for the majority of measurement points we observe that the model's accuracy is comparable to what is achieved in the calibration sample, which itself is only moderately less accurate than in the idealized Monte Carlo studies. In quoting accuracies for this FF model version, we combine the performance in this large-standoff data with the performance in the more realistic standoff range of the calibration data.

In this detailed description, a fast forward (FF) model has been described for gamma-gamma density response of tools such as the EcoScope tool from Schlumberger with an 8¼" stabilizer. The model is based on the technique of density sensitivity functions, which we expand to a $2^{nd}$-order approximation. The spatially dependent sensitivity maps take into account the dominant gamma-ray interactions of Compton scattering and photoelectric absorption, and the $2^{nd}$-order structure includes the correlation of density sensitivities among different spatial elements. In comparison to the simple linear technique, this model provides advantages in accuracy, versatility, and simplicity, with negligible loss of computational speed. Large density images can be produced on the order of one second, a gain of at least 4 orders of magnitude over equivalent Monte Carlo.

The model is calibrated in full Monte Carlo simulations for a wide range of formations, borehole fluids, and standoff conditions. For standoff values up to 1", the model achieves accuracies of 0.02 g/cc for the long-spacing (LS) apparent electron density, 0.05 g/cc for the short-spacing (SS) density, and 0.04 g/cc for compensated density. For the condition of no standoff, which is the most prevalent LWD environment, the accuracy of the FF model is within 0.02 g/cc for all apparent and compensated densities. The model is benchmarked against Monte Carlo simulations of various high-angle well geometries, including the possibility of large water standoff. The expected accuracy from the calibration is confirmed, and the model predicts the density response even in the bed interface regions. These images of limited size require less than one second of computing time.

A separate calibration of the model is provided for use with experimental data. Benchmarking of Monte Carlo simulation against real data from the experimental facility shows that a different FF model version is justified. The FF model is calibrated in the experimental database and tested against independent data. The model achieves overall accuracies of 0.02 and 0.04 g/cc for the LS and compensated densities respectively, close to the initial performance in Monte Carlo. The SS density accuracy is degraded somewhat to 0.06 g/cc both with or without mudcake standoff.

In combination with a model inversion framework that provides hypotheses of formation geometry and composition, the model is useful for log interpretation in the environment of highly deviated wells. By following the procedure discussed herein, the $2^{nd}$-order fast forward model can be adapted for any other gamma-gamma density tool.

Based on an initial guess of formation geometry and composition, an inversion framework can use a forward model which is both fast and accurate to predict the tool response and compare it with the actual measured tool response for a dataset consisting of some range of positions and/or orientations. If the predictions and measurements do not match, the given geometry and composition parameters can be varied within predetermined realistic limits. For each such iteration, new predictions of the tool response must be calculated. If the system is converging after some number of iterations, the difference between the predicted and measured datasets will have become smaller than a preset threshold and the inversion process can be deemed complete. The formation geometry and composition hypothesized for the final step is the solution to the inversion. The speed and accuracy of the forward model are essential in that these factors determine how quickly the system converges and how accurate the final answer is.

Whereas many alterations and modifications of the present invention will no doubt become apparent to a person of ordinary skill in the art after having read the foregoing description, it is to be understood that the particular embodiments of the invention shown and described by way of illustration are in no way intended to be considered limiting. Further, the invention has been described with reference to particular preferred embodiments, but variations within the spirit and scope of the invention will occur to those skilled in the art. It is noted that the foregoing examples have been provided merely for the purpose of explanation and are in no way to be construed as limiting of the present invention. While the present invention has been described with reference to exemplary embodiments, it is understood that the words, which have been used herein, are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method of predicting a response of a gamma ray measurement tool located in a borehole surrounded by a formation comprising:
   calculating the response of the measurement tool according to one or more properties at a plurality of spatial locations in relation to the measurement tool using a forward model that assumes a non-linear relationship between the one or more properties at the plurality of spatial locations and the corresponding response of the measurement tool.

2. The method according to claim 1, wherein the plurality of spatial locations includes a plurality of locations in the formation surrounding the borehole.

3. The method according to claim 1, wherein the one or more properties includes one or more properties selected from the group consisting of one of: a formation density, a formation photoelectric factor, a standoff thickness, a mud density, or a mud photoelectric factor.

4. The method according to claim 3, wherein the one or more properties includes formation density for a plurality of formation bed layers each having different densities.

5. The method according to claim 4, wherein the one or more properties includes one or more properties selected from the group consisting of one of: a dipping angle of the borehole with respect to the plurality of formation bed layers, a number of formation bed layers, or a thicknesses for one or more of the formation bed layers.

6. The method according to claim 1, wherein the forward model includes one or more $2^{nd}$-order dependences for density.

7. The method according to claim 6, wherein at least one $2^{nd}$-order dependence is approximated by $1^{st}$-order dependences of the forward model.

8. The method according to claim 6, wherein at least one $2^{nd}$ order dependence is at least in part derived using a perturbation feature of a Monte Carlo N-Particle Transport Code.

9. The method according to claim 1, further comprising:
generating gamma radiation using a gamma ray source mounted on the measurement tool located in the borehole;
detecting gamma radiation using one or more gamma ray detectors mounted on the measurement tool; and
iteratively performing the step of calculating such that one or more of the properties for at least some of the plurality of spatial locations is estimated in accordance with the detected gamma radiation.

10. The method according to claim 9, further comprising:
drilling in the formation with a drill bit to extend the borehole according to a predetermined drilling trajectory; and
altering the predetermined drilling trajectory based at least in part on the estimated properties.

11. The method according to claim 1, wherein the step of calculating a response of the measurement tool is performed in less than about 1 second.

12. The method according to claim 1, wherein the step of calculating is accurate within about 0.05 g/cc for density at about 2.2 g/cc formation density, about ½ inch of standoff and non-Barite mud.

13. The method according to claim 1, wherein the measurement tool is a wireline tool.

14. The method according to claim 1, further comprising moving the measurement tool to a new position in the borehole and wherein the step of calculating a response of the measurement tool is repeated for the new position of the measurement tool.

15. A system for estimating properties of a formation surrounding a borehole using a gamma ray source mounted on a tool deployable in the borehole, the system comprising:
adapting and positioning the gamma ray source on the tool to transmit gamma radiation into the formation;
mounting one or more gamma ray detectors on the tool, each at a predetermined spacing from the gamma ray source, the one or more detectors adapted and positioned to detect gamma radiation; and
a processing system adapted to receive data representing radiation detected by the one or more detectors, the processing system configured and programmed to calculate a response of the tool according to one or more properties at a plurality of spatial locations in relation to the tool using a forward model that assumes a non-linear relationship between the one or more properties at the plurality of spatial locations and the corresponding response of the tool.

16. The system according to claim 15, wherein the one or more properties includes one or more properties selected from the group consisting of one of: a formation density, a photoelectric factor, a standoff thickness, a mud density, or a mud photoelectric factor.

17. The system according to claim 16, wherein the one or more properties includes formation density for a plurality of formation bed layers each having different densities.

18. The system according to claim 17, wherein the one or more properties includes one or more properties selected from the group consisting of one of: a dipping angle of the borehole with respect to the plurality of formation bed layers, a number of formation bed layers, or a thicknesses for one or more of the formation bed layers.

19. The system according to claim 15, wherein the forward model includes one or more $2^{nd}$-order dependences for density.

20. The system according to claim 19, wherein at least one $2^{nd}$-order dependence is approximated by $1^{st}$-order dependences of the forward model.

21. The system according to claim 15, wherein the processing system is further programmed and configured to iteratively perform the tool response calculations such that one or more of the properties for at least some of the plurality of spatial locations is estimated in accordance with the detected gamma radiation.

22. The system according to claim 21, further comprising a directional drilling system adapted to extend the borehole using a drill bit according to a predetermined drilling trajectory; wherein the predetermined drilling trajectory is altered based at least in part on the estimated properties.

23. The system according to claim 15, wherein the processing system is programmed such that the calculation of a response of the tool is carried out in less than about 1 second.

24. The system according to claim 15, wherein the processing system is programmed such that the response calculation is accurate to within about 0.05 g/cc for density at about 2.2 g/cc formation density, about ½ inch of standoff and non-Barite mud.

25. A method of estimating properties of a subterranean formation surrounding a borehole using a gamma ray source mounted on a tool, the method comprising:
generating gamma radiation using the gamma ray source mounted on the tool located in the borehole;
detecting gamma radiation using one or more gamma ray detectors mounted on the tool each at a predetermined spacing from the gamma ray source; and
calculating a response of the tool according to one or more properties at a plurality of spatial locations in relation to the tool using a forward model, wherein a single response calculation is performed in less than about 1 second, and wherein the response calculation is accurate to within about 0.05 g/cc for density at about 2.2 g/cc formation density, about ½ inch of standoff and non-Barite mud.

26. The method according to claim 25, wherein the single response calculation is performed in less than about 3 milliseconds.

27. The method according to claim 25, wherein the response calculation for a detector spaced equal to or greater than about 15 inches from the gamma ray source is accurate to within about 0.02 g/cc over a density range of about 1-3 g/cc, a standoff range from about 0 to about 1 inch, and a mud having a photoelectric factor range between about 0 and about 150.

28. The method according to claim 25, wherein the response calculation for a detector spaced equal to or less than about 7 inches from the gamma ray source is accurate to within about 0.06 g/cc over a density range of about 1-3 g/cc, a standoff range from about 0 to about 1 inch, and a mud having a photoelectric factor range between about 0 and about 150.

29. The method according to claim 25, further comprising iteratively performing the step of calculating such that one or more of the properties for at least some of the plurality of spatial locations is estimated in accordance with the detected gamma radiation.

30. The method according to claim 29, further comprising:
drilling in the formation with a drill bit to extend the borehole according to a predetermined drilling trajectory; and
altering the predetermined drilling trajectory based at least in part on the estimated properties.

31. The method according to claim 25, wherein the forward model assumes a non-linear relationship between the one or more properties at the plurality of spatial locations and the corresponding response of the tool.

32. A system for estimating properties of a formation surrounding a borehole using a gamma ray source mounted on a tool deployable in the borehole, the system comprising:
adapting and positioning the gamma ray source on the tool to transmit gamma radiation into the formation;
mounting one or more gamma ray detectors on the tool, each at a predetermined spacing from the gamma ray source, the one or more detectors adapted and positioned to detect gamma radiation; and
a processing system adapted to receive data representing radiation detected by the one or more detectors, the processing system configured and programmed to calculate a response of the tool according to one or more properties at a plurality of spatial locations in relation to the tool using a forward model such that a single response calculation for is performed in less than about 1 second, and wherein the response calculation is accurate to within about 0.05 g/cc for density at about 2.2 g/cc formation density, about ½ inch of standoff and non-Barite mud.

33. The system according to claim 32, wherein the response calculation is performed in less than about 3 milliseconds.

34. The system according to claim 32, wherein the response calculation for a detector of the one or more detectors is spaced equal to or greater than about 15 inches from the gamma ray source is accurate to within about 0.02 g/cc over a density range of about 1-3 g/cc, a standoff range from about 0 to about 1 inch, and mud having a photoelectric factor range between about 0 and about 150.

35. The system according to claim 32, wherein the response calculation for a detector of the one or more detectors is spaced equal to or less than about 7 inches from the gamma ray source is accurate to within about 0.06 g/cc over a density range of about 1-3 g/cc, a standoff range from about 0 to about 1 inch, and mud having a photoelectric factor range between about 0 and about 150.

36. The system according to claim 32, wherein the processing system is further configured and programmed to iteratively perform the response calculation such that one or more of the properties for at least some of plurality of spatial locations is estimated in accordance with the detected gamma radiation.

37. The system according to claim 36, further comprising a directional drilling system adapted to extend the borehole using a drill bit according to a predetermined drilling trajectory; wherein the predetermined drilling trajectory is altered based at least in part on the estimated properties.

38. The system according to claim 32, wherein the tool is a wireline tool.

39. A method of estimating properties of a subterranean formation surrounding a borehole using a gamma ray source mounted on a tool located in the borehole, the method comprising:
drilling into the subterranean formation with a drill bit to extend the borehole according to a predetermined drilling trajectory;
generating gamma radiation using the gamma ray source mounted on the tool located in the borehole;
detecting gamma radiation using one or more gamma ray detectors mounted on the tool;
iteratively calculating a response of the tool according to one or more properties at a plurality of spatial locations in relation to the tool using a forward model, such that one or more of the properties for at least some of the plurality of spatial locations is estimated in accordance with the detected gamma radiation; and
altering the predetermined drilling trajectory based at least in part on the estimated properties.

40. The method according to claim 39, wherein the forward model assumes a non-linear relationship between the one or more properties at the plurality of spatial locations and the corresponding response of the tool.

41. The method according to claim 39, wherein the one or more properties includes one or more properties selected from the group consisting of one of: a formation density, a photoelectric factor, a standoff thickness, a mud density, or a mud photoelectric factor.

42. The method according to claim 41, wherein the response calculation is accurate within about 0.05 g/cc for density at about 2.2 g/cc formation density, about ½ inch of standoff and non-Barite mud.

43. The method according to claim 39, wherein the response calculations is preformed at a rate of greater than about 1 second per response calculation.

44. The method according to claim 39, wherein the step of iteratively calculating is performed on the surface and the trajectory is altered manually by drilling personnel.

45. The method according to claim 39, wherein the step of iteratively calculating is performed downhole and the trajectory is altered automatically downhole.

46. A system for estimating properties of a formation surrounding a borehole using a gamma ray source mounted on a tool deployable in the borehole, the system comprising:
adapting and positioning the gamma ray source on the tool to transmit gamma radiation into the formation;
mounting one or more gamma ray detectors on the tool, each at a predetermined spacing from the gamma ray source, the one or more detectors adapted and positioned to detect gamma radiation; and
a processing system adapted to receive data representing radiation detected by the one or more detectors, the processing system configured and programmed to iteratively calculate a response of the tool according to one or more properties at a plurality of spatial locations in relation to the tool using a forward model such that one or more of the properties for at least some of the plurality of spatial locations is estimated in accordance with the detected gamma radiation; and a directional drilling system adapted to extend the borehole using a drill bit according to a predetermined drilling trajectory; wherein the predetermined drilling trajectory is altered based at least in part on the estimated properties.

47. The system according to claim 46, wherein the forward model assumes a non-linear relationship between the one or more properties at the plurality of spatial locations and the corresponding response of the tool.

48. The system according to claim 46, wherein the one or more properties includes one or more properties selected from the group consisting of one of: a formation density, a photoelectric factor, a standoff thickness, a mud density, or a mud photoelectric factor.

49. The system according to claim 48, wherein the processing system is programmed such that the response calculation is accurate within about 0.05 g/cc for density at about 2.2 g/cc formation density, about ½ inch of standoff and non-Barite mud.

50. The system according to claim 46, wherein the processing system is programmed such that the response calculations are performed at a rate of greater than about 1 second per response calculation.

* * * * *